United States Patent
Dice et al.

(10) Patent No.: US 8,694,706 B2
(45) Date of Patent: Apr. 8, 2014

(54) SYSTEM AND METHOD FOR NUMA-AWARE LOCKING USING LOCK COHORTS

(75) Inventors: David Dice, Foxboro, MA (US); Virendra J. Marathe, Florence, MA (US); Nir N. Shavit, Cambridge, MA (US)

(73) Assignee: Oracle International Corporation, Redwood City, CA (US)

( * ) Notice: Subject to any disclaimer, the term of this patent is extended or adjusted under 35 U.S.C. 154(b) by 147 days.

(21) Appl. No.: 13/458,871

(22) Filed: Apr. 27, 2012

(65) Prior Publication Data

US 2013/0290583 A1     Oct. 31, 2013

(51) Int. Cl.
*G06F 12/00* (2006.01)

(52) U.S. Cl.
USPC .......................................... 710/200; 718/106

(58) Field of Classification Search
USPC ................... 710/200, 240–244; 718/102–108
See application file for complete search history.

(56) References Cited

U.S. PATENT DOCUMENTS

| | | | |
|---|---|---|---|
| 6,289,369 B1 | 9/2001 | Sundaresan | |
| 6,480,918 B1 | 11/2002 | Mckenney et al. | |
| 6,965,961 B1 | 11/2005 | Scott | |
| 6,985,984 B2 | 1/2006 | Radovic et al. | |
| 7,318,128 B1 | 1/2008 | Dice | |
| 7,487,279 B2 | 2/2009 | Su | |
| 7,529,844 B2 | 5/2009 | Radovic et al. | |
| 7,979,617 B2 | 7/2011 | Mckenney et al. | |
| 7,984,444 B1 | 7/2011 | Shavit et al. | |
| 2003/0195920 A1 | 10/2003 | Brenner et al. | |
| 2009/0125548 A1 | 5/2009 | Moir et al. | |
| 2010/0333096 A1 | 12/2010 | Dice et al. | |
| 2012/0311606 A1 | 12/2012 | Marathe et al. | |

FOREIGN PATENT DOCUMENTS

WO     9706484     2/1997

OTHER PUBLICATIONS

"NUMA-Aware locking routines—design and implementation in Linux" downloaded from http://sc.tamu.edu/whitepapers/altix/numalocks.pdf, pp. 1-10.
S. Blagodurov, S. Zhuravlev, M. Dashti, A. Fedorova, "A case for NUMA-aware contention management on multicore systems" in Proceedings of USENIX Annual Technical Conference 2011, pp. 1-15.
A. Agarwal and M. Cherian. "Adaptive backoff synchronization techniques". SIGARCH Comput. Archit. News, 17:396-406, Apr. 1989.

(Continued)

*Primary Examiner* — Clifford Knoll
(74) *Attorney, Agent, or Firm* — Robert C. Kowert; Meyertons, Hood, Kivlin, Kowert & Goetzel, P.C.

(57) ABSTRACT

The system and methods described herein may be used to implement NUMA-aware locks that employ lock cohorting. These lock cohorting techniques may reduce the rate of lock migration by relaxing the order in which the lock schedules the execution of critical code sections by various threads, allowing lock ownership to remain resident on a single NUMA node longer than under strict FIFO ordering, thus reducing coherence traffic and improving aggregate performance. A NUMA-aware cohort lock may include a global shared lock that is thread-oblivious, and multiple node-level locks that provide cohort detection. The lock may be constructed from non-NUMA-aware components (e.g., spinlocks or queue locks) that are modified to provide thread-obliviousness and/or cohort detection. Lock ownership may be passed from one thread that holds the lock to another thread executing on the same NUMA node without releasing the global shared lock.

20 Claims, 26 Drawing Sheets

(56) References Cited

OTHER PUBLICATIONS

T. Craig. "Building FIFO and priority-queueing spin locks from atomic swap". Technical Report TR 93-02-02, University of Washington, Dept of Computer Science, Feb. 1993. pp. 1-29.

D. Dice and A. Garthwaite. "Mostly Lock Free Malloc". In Proceedings of the 3rd International Symposium on Memory Management, pp. 163-174, 2002.

D. Dice, V. Marathe, and N. Shavit. "Flat Combining NUMA Locks". In Proceedings of the 23rd ACM Symposium on Parallelism in Algorithms and Architectures, 2011. pp. 1-10.

D. Hendler, I. Incze, N. Shavit, and M. Tzafrir. "Flat Combining and the Synchronization-Parallelism Tradeoff". In Proceedings of the 22nd ACM Symposium on Parallelism in Algorithms and Architectures, pp. 355-364, 2010.

J. Mellor-Crummey and M. Scott. "Algorithms for scalable synchronization on shared-memory multiprocessors". ACM Trans. Computer Systems, 9(1):21-65, 1991.

M. Pohlack and S. Diestelhorst. "From Lightweight Hardware Transactional Memory to LightWeight Lock Elision". In Proceedings of the 6th ACM SIGPLAN Workshop on Transactional Computing, 2011. pp. 1-7.

Z. Radovic and E. Hagersten. "Hierarchical Backoff Locks for Non-uniform Communication Architectures". In HPCA-9, pp. 241-252, Anaheim, California, USA, Feb. 2003. p. 1-12.

M. Scott and W. Scherer. "Scalable queue-based spin locks with timeout". In Proc. 8th ACM SIGPLAN Symposium on Principles and Practices of Parallel Programming, pp. 44-52, 2001.

M. L. Scott. "Non-blocking timeout in scalable queue-based spin locks." In Proceedings of the twenty-first annual symposium on Principles of distributed computing, PODC '02, pp. 31-40, New York, NY, USA, 2002. ACM.

Victor Luchangco and Dan Nussbaum and Nir Shavit. "A Hierarchical CLH Queue Lock". In Proceedings of the 12th International Euro-Par Conference, pp. 801-810, 2006.

Oyama, Taura, Yonezawa. "Executing Parallel Programs with Synchronization Bottlenecks Efficiently". University of Tokyo, 1998. Downloaded from http://web.yl.is.s.u-tokyo.ac.jp/~oyama/publications/OyamaPDSIA99.pdf. pp. 1-23.

Yossi Lev, Victor Luchangco, and Marek Olszewski. "Scalable Reader-Writer Locks." SPAA 2009. pp. 1-10.

John M. Mellor-Crummey, and Michael L. Scott. "Scalable Reader-Writer Synchronization for Shared-Memory Multiprocessors." PPoPP 1991. pp. 1-8.

John M. Mellor-Crummey, and Michael L. Scott. "Synchronization without contention" ASPLOS 1991. pp. 1-10.

P. J. Courtois, F. Heymans. and D. L. Parnas. "Concurrent Control with 'readers' and 'writers'" CACM 1971. pp. 1-9.

W. C. Hsieh, and W. E. Weihl. "Scalable reader-writer locks for parallel systems." IPPS 1992. pp. 1-22.

O. Krieger, M. Stumm, R. Unrau, and J. Hanna. "A fair fast scalable reader-writer lock" ICPP 1993. pp. 1-4.

D. Dice and N. Shavit. "TLRW: Return of the Read-Write Lock." SPAA 2010. pp. 1-9.

F. Ellen, Y. Lev, V. Luchangco, and M. Moir. "SNZI: Scalable Non-Zero Indicators". PODC 2007. pp. 1-10.

U.S. Appl. No. 13/458,868, filed Apr. 27 2012, Irina Calciu et al.

SYSTEM AND METHOD FOR NUMA-AWARE LOCKING USING LOCK COHORTS

BACKGROUND

1. Field of the Disclosure

This disclosure relates generally to hierarchical locks, and more particularly to systems and methods for implementing NUMA-aware hierarchical locks.

2. Description of the Related Art

In a multiprocessor environment with threads and preemptive scheduling, threads can participate in a mutual exclusion protocol through the use of lock or "mutex" constructs. A mutual exclusion lock can either be in a locked state or an unlocked state, and only one thread can hold or own the lock at any given time. The thread that owns the lock is permitted to enter a critical section of code protected by the lock or otherwise access a shared resource protected by the lock. If a second thread attempts to obtain ownership of a lock while the lock is held by a first thread, the second thread will not be permitted to proceed into the critical section of code (or access the shared resource) until the first thread releases the lock and the second thread successfully claims ownership of the lock.

Queue locks, such as CLH locks and MCS-style queue locks, have historically been the algorithms of choice for locking in many high performance systems. These locks have been shown to reduce overall invalidation traffic in some high performance systems by forming queues of threads, each spinning on a separate memory location as they await their turn to access a critical section of code or shared resource protected by a shared lock.

Current trends in multicore architecture design imply that in coming years, there will be an accelerated shift away from simple bus-based designs towards distributed non-uniform memory-access (NUMA) and cache-coherent NUMA (CC-NUMA) architectures. Under NUMA, the memory access time for any given access depends on the location of the accessed memory relative to the processor. Such architectures typically consist of collections of computing cores with fast local memory (as found on a single multicore chip), communicating with each other via a slower (inter-chip) communication medium. In such systems, the processor can typically access its own local memory, such as its own cache memory, faster than non-local memory. In some systems, the non-local memory may include one or more banks of memory shared between processors and/or memory that is local to another processor. Access by a core to its local memory, and in particular to a shared local cache, can be several times faster than access to a remote memory (e.g., one located on another chip). Note that in various descriptions herein, the term "NUMA" may be used fairly broadly. For example, it may be used to refer to non-uniform communication access (NUCA) machines that exhibit NUMA properties, as well as other types of NUMA and/or CC-NUMA machines.

On large cache-coherent systems with Non-Uniform Memory Access (CC-NUMA, sometimes shortened to just NUMA), if lock ownership migrates frequently between threads executing on different nodes, the executing program can suffer from excessive coherence traffic, and, in turn, poor scalability and performance. Furthermore, this behavior can degrade the performance of other unrelated programs executing in the system.

Recent papers show that performance gains can be obtained on NUMA architectures by developing hierarchical locks, i.e., general-purpose mutual-exclusion locks that encourage threads with high mutual memory locality to acquire the lock consecutively, thus reducing the overall level of cache misses when executing instructions in a critical section of code protected by the lock. For example, one paper describes a hierarchical back-off lock (referred to herein as an HBO lock). The HBO lock is a test-and-test-and-set lock augmented with a back-off scheme to reduce contention on the lock variable. The hierarchical back-off mechanism of the HBO lock allows the back-off delay to be tuned dynamically, so that when a thread notices that another thread from its own local cluster owns the lock, it can reduce its delay and increase its chances of acquiring the lock consecutively. However, because the locks are test-and-test-and-set locks, they incur invalidation traffic on every modification of the shared global lock variable, which is especially costly on NUMA machines. Moreover, the dynamic adjustment of back-off delay time in the lock introduces significant fairness issues. For example, it becomes likely that two or more threads from the same cluster will repeatedly acquire a lock while threads from other clusters starve.

Another paper describes a hierarchical version of the CLH queue-locking algorithm (referred to herein as an HCLH lock). The HCLH algorithm collects requests on each chip into a local CLH style queue, and then allows the thread at the head of the queue to integrate each chip's queue into a single global queue. This avoids the overhead of spinning on a shared location and prevents starvation issues. However, the algorithm forms the local queues of waiting threads formed by having each thread perform an atomic register-to-memory-swap (SWAP) operation on the shared head of the local queue. These SWAPs to a shared location cause a bottleneck and introduce significant overhead. For example, the thread merging the local queue into the global queue must either wait for a long period of time or merge an unacceptably short local queue into the global queue. Furthermore, the HCLH mechanism includes complex condition checks along its critical execution path in order to determine if a thread must perform the operations of merging local CLH queues with the global queue.

More recently, it has been shown that the synchronization overhead of HCLH locks can be overcome by collecting local queues using a flat-combining technique, and then splicing the local queues into the global queue. The resulting NUMA-aware locks (sometimes referred to as FC-MCS locks) can outperform HCLH type locks by a factor of two and can outperform HBO type by a factor of four or more, but they use significantly more memory than those other locks.

Reader-writer locks are an important category of locks that help programmers overcome the scalability issues that are common with traditional mutual exclusion locks for workloads that include a significant percentage of read-only critical sections of code. At any given time, a reader-writer lock allows one or more reader threads to own a lock in a read-only mode or just one writer thread to own the lock in a write mode. With reader-writer locks, this permission persists until it is explicitly surrendered using an unlock operation. Past research has shown that even though these locks can scale well for workloads with very high reader volumes (e.g., on the order of 99-100% reader threads), the performance quickly drops off with even a modest number of writer threads (e.g. 5-10%) competing for the lock. This drop-off can be expected to be even worse on cache-coherent NUMA architectures, where the writer threads can introduce significant inter-connect traffic and latencies to access remotely situated lock metadata and data that is accessed in a related critical section of code. A reader-writer lock might provide better performance than a traditional mutex, as the reader-writer lock can admit multi-reader (reader-reader) parallelism. However, any actual benefit would be contingent on the workload of the executing application, the availability of true parallelism, and the specific implementation of the reader-writer lock.

SUMMARY

As noted above, the ongoing growth of multicore machines is likely to shift the multiprocessor design space in the NUMA and CC-NUMA direction. As a result, there is a growing need to develop concurrent algorithms and synchronization mechanisms that will adapt well to these emerging machines. The system and methods described herein may in some embodiments implement NUMA-aware locks that employ lock cohorting. The cohort locks and lock cohorting techniques described herein may reduce the rate of lock migration by relaxing the order in which the lock schedules the execution of critical sections of code by various threads, allowing lock ownership to remain resident on a single NUMA node for a longer period than would be the case under strict FIFO ordering. In some embodiments, this may reduce coherence traffic and improve aggregate performance.

In some embodiments, a NUMA-aware cohort lock may be implemented as a composite lock that includes a top-level lock (i.e. a global shared lock) that is thread-oblivious, and multiple node-level or cluster-specific locks that provide cohort detection. For example, a NUMA-aware cohort lock may be constructed from non-NUMA-aware components that provide (or have been modified to provide) thread-obliviousness and/or cohort detection. The composite lock may be implemented such that ownership of the lock may be passed by direct or indirect succession from a thread that holds the lock to another thread in its cohort (e.g., another thread executing on a processor on the same NUMA node or in the same cluster of processor cores as the lock owner).

In some embodiments, a thread of a multithreaded application executing on a given processor core in a cluster of processor cores that share a memory may acquire the global shared lock, and may access a critical section of code or shared resource that is protected by the lock. Subsequently, the thread may determine whether any other threads of the application that are executing on a processor core in the same cluster of processor cores (i.e. cohort threads) are waiting to access the critical section of code or shared resource, and, if so, may pass ownership of a cluster-specific lock that is associated with the critical section of code or shared resource to another such thread, without releasing the global shared lock. The other thread may then access the critical section of code or shared resource. If there are still other cohort threads waiting to acquire the lock, the other thread may pass ownership of the cluster-specific lock to yet another thread of the application that is executing on a processor core in the same cluster of processor cores without releasing the global shared lock. If no there are no other cohort threads waiting to acquire the lock, the other thread may release the cluster-specific lock and the global shared lock. Subsequently, a thread executing on a processor core in another cluster of processor cores may acquire the global shared lock and access the critical section of code or shared resource.

In some embodiments, prior to acquiring the global shared lock, a thread may first acquire ownership of the cluster-specific lock for the cluster on which it executes, after which it is permitted to attempt to acquire the global shared lock. In some embodiments, acquiring the global shared lock may include attempting to acquire the global shared lock, and in response to failing to acquire the global shared lock, acquiring ownership of the cluster-specific lock and repeating its attempt to acquire the global shared lock one or more times until an attempt to acquire the global shared lock is successful.

In some embodiments, passing the ownership of the lock may include updating an indicator to indicate that the other thread is the owner of the cluster-specific lock. In some embodiments, passing the ownership of the lock may include passing ownership of the cluster-specific lock to a thread that was waiting in an active queue at the time that the global shared lock was acquired, while threads that began waiting for the global shared lock subsequent to the thread acquiring the global shared lock may be added to a passive queue.

As previously noted, the global shared lock and the one or more cluster-specific locks may include one or more non-NUMA-aware locks that collectively implement a NUMA-aware composite lock usable to manage access to the critical section of code or shared resource. For example, in various embodiments, the global shared lock and/or the cluster-specific locks may include a spin-type lock, a ticket-based lock, a queue-based lock, a test-and-test-and-set lock, a back-off lock, or, in general, any other type of blocking or non-blocking locks.

The performance of cohort locks has been compared with all prior NUMA-aware and classic NUMA-oblivious locks on synthetic micro-benchmarks, as well as on a real world key-value store application. The results demonstrated that cohort locks may perform as well or better than known locks across most of the concurrency spectrum when the load is low, may significantly out-perform them as the load increases, and in various scenarios, may significantly boost the performance of these applications.

Figure 1:
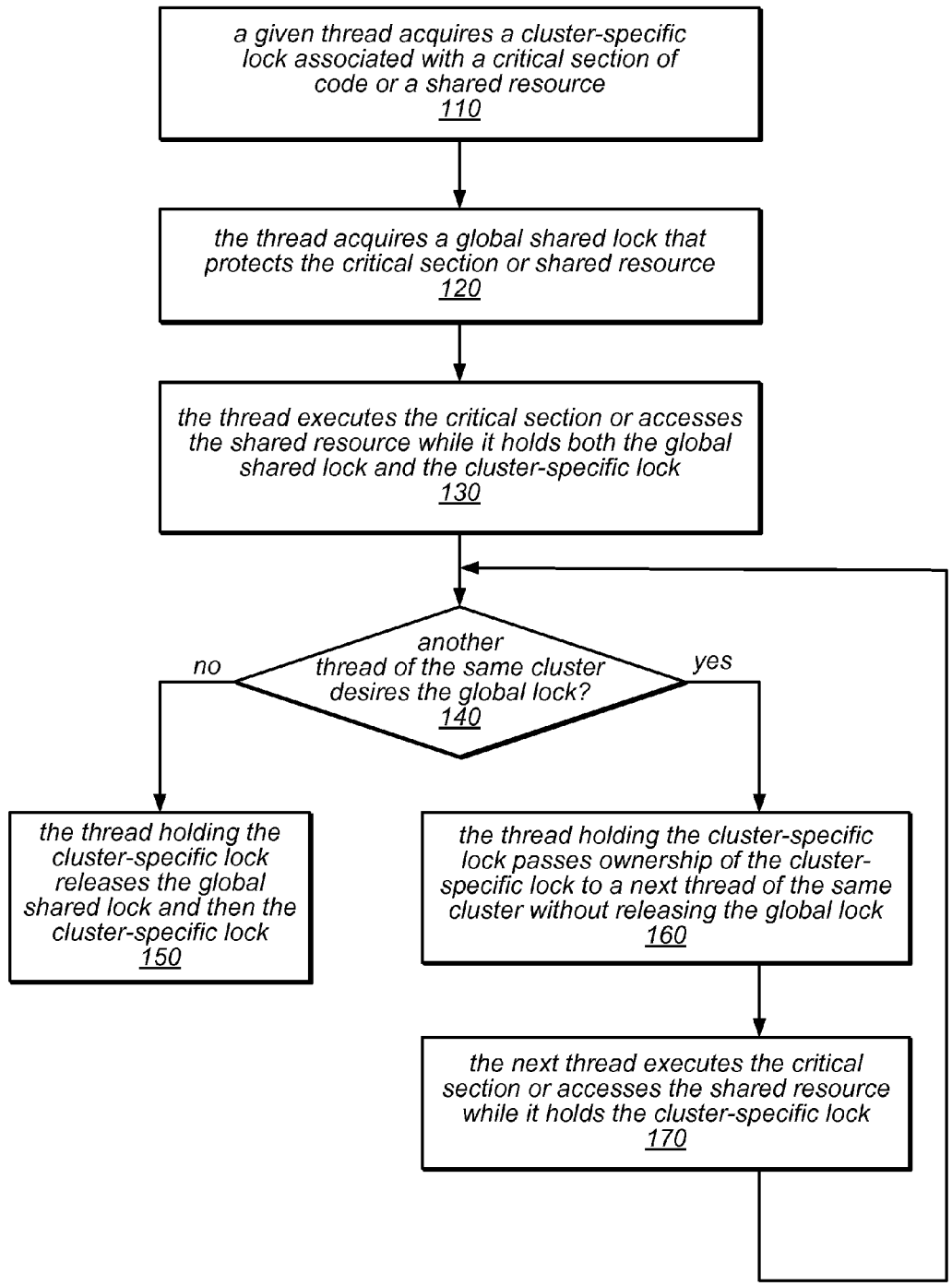
FIG. 1 is a flow diagram illustrating one embodiment of a method for implementing NUMA-aware lock cohorting, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Multicore machines are growing in size, and accordingly shifting from simple bus-based designs to NUMA and CC-NUMA architectures. With this shift, scalable hierarchical locking algorithms (e.g., NUMA-aware locking algorithms that take into account the non-uniform memory and caching hierarchy of the machines on which they execute) may contribute to improved system and/or application performance. The systems and methods described herein may in various embodiments be used to implement NUMA-aware lock cohorting. In addition, techniques for designing NUMA-aware locks using non-NUMA-aware components are described.

Modern computing systems may use caches to exploit the temporal locality that is found in many applications. For example, a short reuse distance may result in higher cache hit rates and better performance. However, lock management based on strict first-in-first-out (FIFO) lock fairness (in which the arrival order for threads that wish to acquire a lock corresponds to the order in which they are granted the lock) can result in longer reuse distances relative to lock management scheduling that is less fair. For example, there may be a benefit realized in scheduling a pending lock request from a thread T1 ahead of a pending request from a thread T2, regardless of arrival order, if thread T1 happened to have acquired the lock more recently than T2. In this case, T1 may be more apt to have residual cache affinity for the data accessed in a critical section of code executed by the thread. Furthermore, T1 may also benefit from residual cache residency for data accessed in non-critical sections, particularly in environments that have a shared last-level cache. In general, there may be different trade-offs to be made between strict FIFO lock fairness and performance for applications and workloads of different types.

On large modern systems it is commonly the case that multiple processors on a NUMA node will share a memory, e.g., a last-level cache (LLC). In such NUMA systems, there may be a performance benefit realized by scheduling a pending request for a lock L from a thread executing on a node N1 ahead of a request for lock L from a thread executing on a node N2 if a thread on node N1 happened to have acquired lock L more recently than any thread executing on node N2. In this case, coherence misses (e.g., misses that require transfers between the LLCs of the two nodes), as opposed to capacity misses, may be reduced.

As used herein, the term "lock migration" may be used to describe what occurs when a thread executing on a processor on a node N1 acquires a lock and the next thread to acquire that same lock is executing on a processor that resides on a different node, e.g., a node N2. In one example, if critical sections of code executed by the two threads happen to write to common shared data protected by that lock, then when the thread executing on a processor on node N2 acquires the lock it may incur coherence misses and coherence traffic when it attempts to access data written previously by the thread executing on a processor on node N1. To maintain coherence, data may have to be transferred from the LLC of node N1 to the LLC of node N2. Typically, the coherent interconnect has moderately high latency. In addition, the bandwidth of that interconnect is typically bounded, i.e. it may be a fixed shared resource. In some cases, channel contention may arise from excessive lock migration, which may further increase latency and impede scaling.

The cohort locks and lock cohorting techniques described herein may in some embodiments reduce the rate of lock migration by introducing and leveraging intentional "unfairness". In other words, these techniques may exploit a trade-off between fairness and locality in an attempt to reduce lock migration. By relaxing the order in which the lock schedules the execution of critical sections of code by various threads (e.g., if the lock is granted to those threads in a manner that is relaxed from a strict FIFO ordering), lock ownership may remain resident on a single NUMA node for a longer period than would be the case under strict FIFO ordering. In turn, this may reduce coherence traffic and improve aggregate performance. In some embodiments, the degree of "unfairness" applied to the order in which threads are granted the lock may be a configurable policy parameter. Note that, in general, there may be an inverse relationship between fairness and potential performance.

In some embodiments, the lock cohorting techniques described herein may allow any lock algorithm in which a thread holding the lock can detect whether there is (or is not)

any other successor thread attempting to access it to be transformed into a scalable NUMA-aware lock. For example, these cohorting techniques may allow NUMA-aware versions of various types of spin-locks or spin-then-block locks, test-and-test-and-set backoff (BO), CLH, MCS, and/or ticket-based locks, to be created, to name a few. In some embodiments, the techniques described herein may allow the creation of a cohort abortable CLH lock, e.g., a NUMA-aware queue lock that supports abortability. In general, the techniques described herein may be used to turn one or more non-NUMA-aware locks into a NUMA-aware lock that allows sequences of threads that are local to a given NUMA node or processor cluster to execute consecutively with little overhead. For example, in some embodiments such a NUMA-aware lock may reduce the frequency of lock migration by reordering or rescheduling contending lock critical sections of code so that those originating from the same node are more likely to run back-to-back or "batched" together in time. The aggregate performance of the multithreaded program that includes those critical sections of code may thus benefit from improved temporal locality.

In some embodiments, a NUMA-aware lock may be implemented as a composite lock that consists of a single top-level lock (e.g., an exponential back-off spin lock, or another type of lock), and an array of underlying sub-locks (one for each NUMA node or processor cluster that shares a memory in the system). In general, such a NUMA-aware lock may be considered locked if and only if the top-level lock is locked. In one such embodiment, MCS locks may be used for the node-level (or processor cluster-specific) locks. In one example, there may be a thread T running on a NUMA node A. To acquire a NUMA-aware lock, thread T may first acquire a node-level MCS lock associated with the NUMA node on which thread T is currently executing (i.e. NUMA node A). After having acquired that node-level lock, thread T may contend for the top-level lock. Eventually, after having acquired the top-level lock, thread T may gain ownership of the composite NUMA-aware lock and may enter a critical section of code that is protected by the lock (or access a shared resource that is protected by the lock). In this example, when thread T no longer requires the NUMA-aware lock and is ready to release it, thread T may preferentially try to pass ownership of the top-level lock to the next thread, if any, that is enqueued trying to acquire the node-level lock associated with NUMA node A. If no such thread exists (e.g., if no other thread is enqueued waiting to acquire the MCS lock associated with A), T may simply release the top-level lock.

One embodiment of a method for NUMA-aware lock cohorting is illustrated by the flow diagram in FIG. 1. In this example, access to the critical section of code or shared resource may be protected by a NUMA-aware lock structure that includes a top-level lock (sometimes referred to herein as a "global shared lock", or merely a "global lock") and multiple lower-level locks (sometimes referred to herein as "cluster-specific locks"), each of which contributes to the management of accesses to the critical section of code or shared resource for threads executing on a respective cluster of processor cores (e.g., a respective NUMA node). As illustrated at 110, in this example, the method may include a thread acquiring a cluster-specific lock that is associated with a critical section of code or a shared resource (e.g., a lower-level lock for use in managing access to the critical section of code or shared resource by threads executing on the same cluster as the given thread). After acquiring the cluster-specific lock, the thread may acquire a global shared lock (i.e. a top-level lock) that protects the critical section of code or shared resource (e.g., that manages access to the critical section of code or shared resource by any and all of the threads executing on the clusters in the system, as in 120. The method may include the given thread executing the critical section of code or accessing the shared resource while it holds both the global shared lock and the cluster-specific lock, as in 130.

Once the given thread exits the critical section of code or no longer requires access to the shared resource, rather than merely releasing one or more of the locks it holds, the given thread may determine whether there is another thread executing on the same cluster as the given thread that desires the global shared lock (e.g., a thread that wishes to execute the critical section of code or access the shared resource that is protected by the global shared lock), as in 140. If so, shown as the positive exit from 140, the method may include the thread that holds the cluster-specific lock passing ownership of the cluster-specific lock to a next thread of the same cluster without releasing the global shared lock, as in 160. The next thread may then execute the critical section of code or access the shared resource while it holds the cluster-specific lock, as in 170. If there is no other thread executing on the same cluster as the given thread that wished to acquire the global shared lock, shown as the negative exit from 140, the method may include the thread holding the cluster-specific lock (in this case, the given thread) releasing the global shared lock and then the cluster-specific lock, as in 150.

Once the next thread exits the critical section of code or no longer requires access to the shared resource, the method may (in some embodiments) include repeating the operations illustrated at 140-170 indefinitely, e.g., determining whether there is yet another thread executing on the same cluster as the given thread and the next thread that desires the global shared lock, and (if so) passing ownership of the cluster-specific lock to one or more additional threads of the same cluster in succession without releasing the global shared lock. In other embodiments, including some described below, there may be limits on the number of threads to which the cluster-specific lock is passed before the global shared lock is released. In the example illustrated in FIG. 1, once there are no additional threads executing on the same cluster as the given thread that desires access to the critical section of code or shared resource protected by the global shared lock, shown as the negative exit from 140, the method may include the thread holding the cluster-specific lock releasing the global shared lock and then the cluster-specific lock, as in 150. In this case, the thread holding the cluster-specific lock may be the next thread, or one of the additional threads, if any, to which ownership of the cluster-specific lock was passed. In other words, the global shared lock may (in some embodiments and under some circumstances) be released by a thread other than the thread that acquired it, but that is executing on the same cluster as the thread that acquired it.

In many of the examples described herein, it may be assumed that the computer system is organized into clusters of computing cores, each of which has a large cache that is shared among the cores local to that cluster. In such embodiments, inter-cluster communication may be significantly more expensive than intra-cluster communication. As used herein, the term "cluster" may be used to refer to a collection of processor cores, and to make clear that this collection of cores could include cores on a single multicore chip, or cores on a collection of multicore chips that have proximity to the same memory or caching structure, depending on the size of the NUMA machine implemented in the system. In these examples, it may also be assumed that each cluster has a unique cluster id known to all threads on the cluster.

Figure 2A:
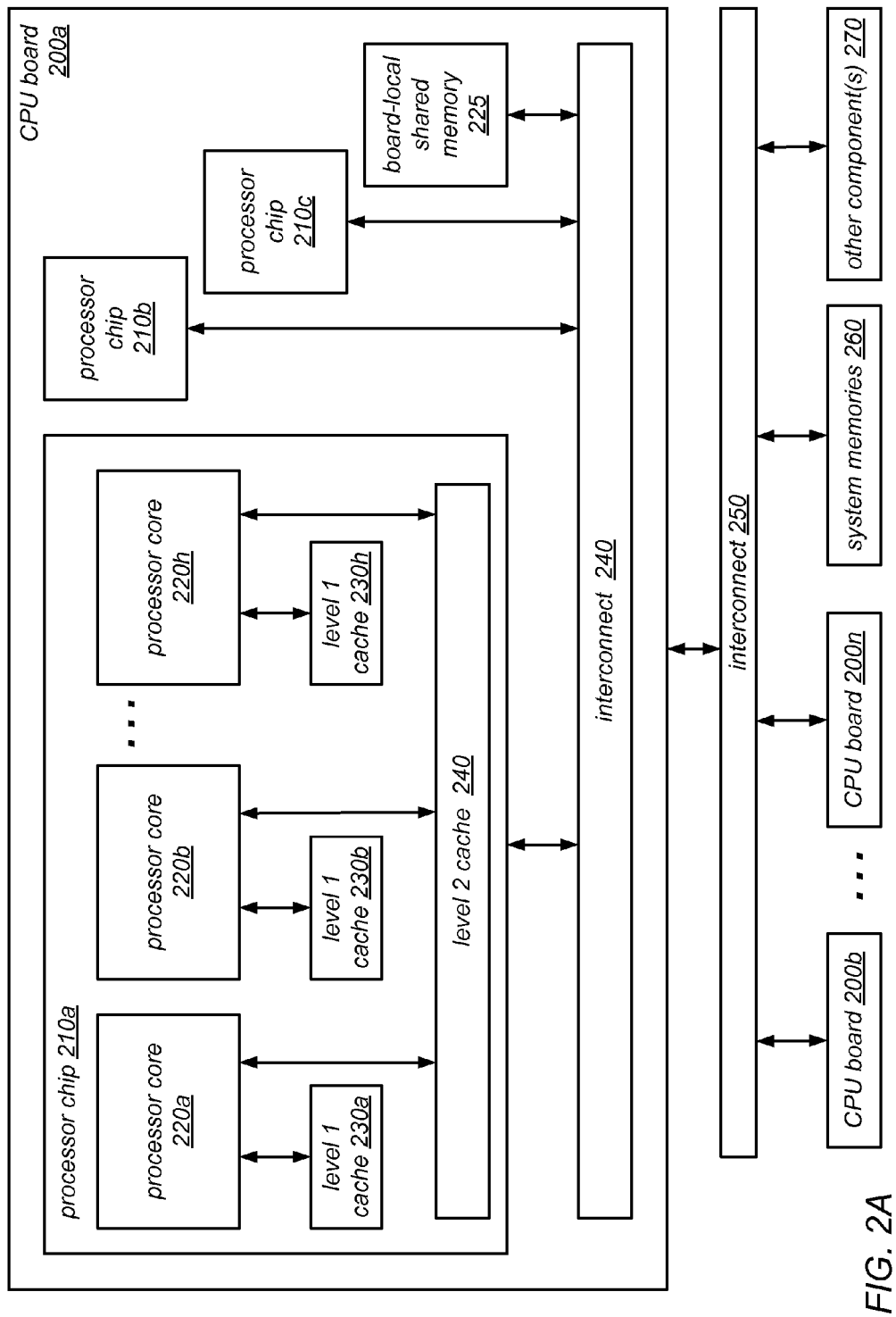
FIGS. 2A and 2B are block diagrams illustrating a portion of a computer system that implements a NUMA style memory architecture, according to different embodiments.
Figure 2B:
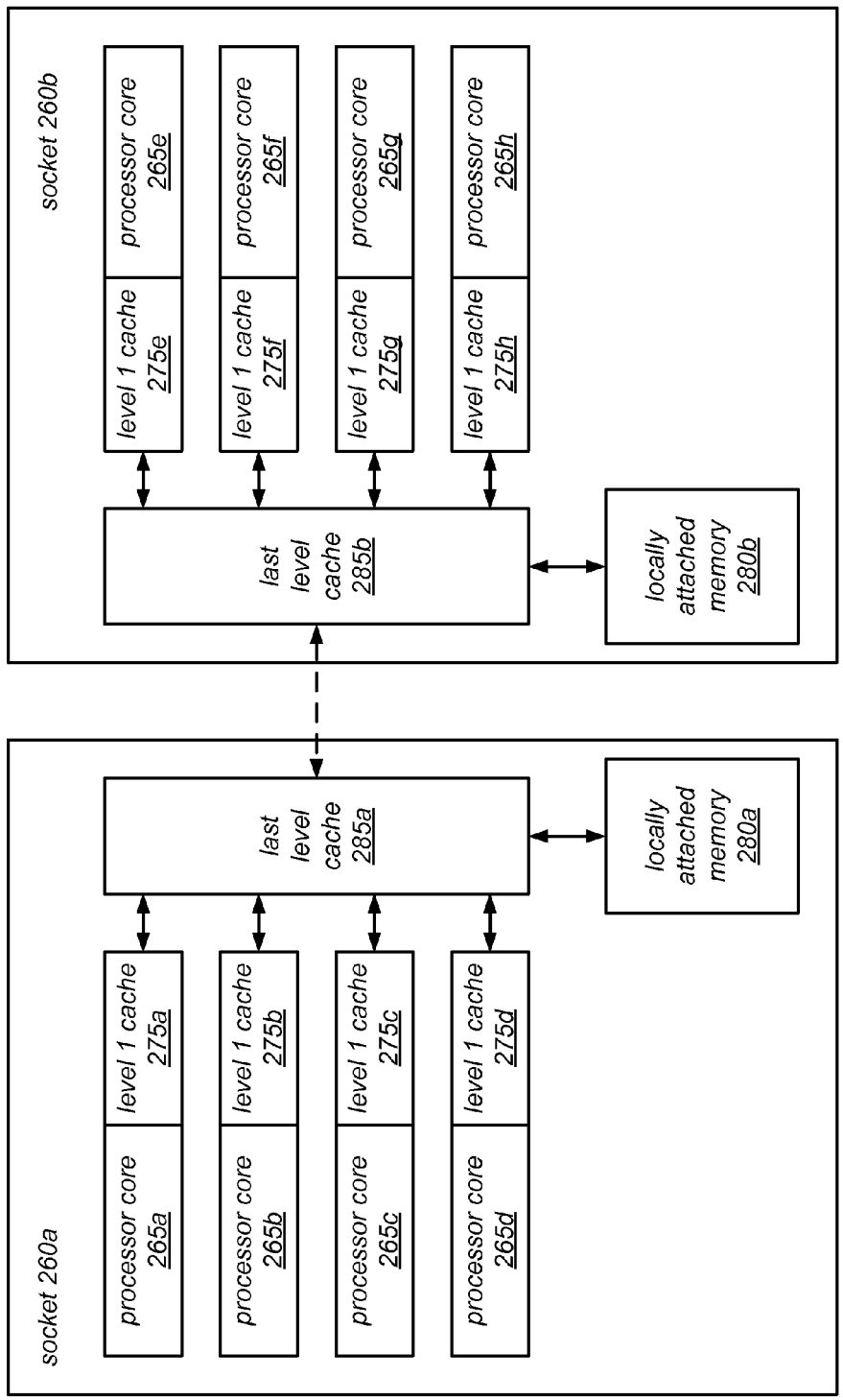

FIGS. 2A-2B are block diagrams illustrating portion of a computer system that implements a NUMA style memory architecture, according to different embodiments. For example, the computer system illustrated in FIG. 2A includes multiple CPU boards 200 (shown as 200a-200n) that communicate with each other over interconnect 250. In this example, each of the CPU boards (which share a board-local memory 225) may be considered a node in the NUMA system, while in other embodiments, each node of a NUMA system may be a socket or die that includes multiple processor cores that share memory. One of these CPU boards (200a) is illustrated in more detail than the others. In some embodiments, each of the CPU boards 200 may include the same or a similar architecture as that illustrated for CPU board 200a. In other embodiments, each of the CPU boards may include a different number and/or arrangement of processor cores, caches, etc. As illustrated in FIG. 2A, the computer system may also include one or more system memories 260 and/or other components 270. In this example, CPU board 200a includes three processor chips (shown as processor chips 210a-210c), one of which is illustrated in more detail, that communicate with each other and with shared memory 225 over interconnect 240. In this example, it is assumed that the processor chips 210b-210c include an architecture similar to that of processor chip 210a.

In the example illustrated in FIG. 2A, processor chip 210a includes eight processor cores (shown as 220a-220h), and each processor core has a respective (dedicated) level 1 (L1) cache (shown as 230a-230h). Each processor core may be a multi-threaded core, in some embodiments. For example, in one embodiment each processor core may be capable of concurrently executing eight hardware threads. The threads executing on a given processor core 220 may share the level 1 cache 230 for that processor core 220, and accesses to this level 1 cache, which may be considered local to the processor core 220 and its hardware threads, may be extremely fast. In addition, the eight processor cores 220 may share the level 2 (L2) cache 240 for processor chip 210a, and accesses to this level 2 cache may also be fast, although not as fast as those to each processor core's own level 1 cache. In this example, accesses to caches of a different processor chip 210 on the same CPU board 200, to caches of a processor chip 210 on a different CPU board 200, to a board-local shared memory 225 on a different CPU board 200, and/or to various system memories 260 (all of which may be considered remote accesses with respect to a hardware thread executing a particular processor core 220 of processor chip 210a) may exhibit increasingly higher latency, when compared to accesses to the level 1 and level 2 caches that are local to that hardware thread.

In another example, FIG. 2B illustrates a portion of a typical two-node NUMA system in which each of the two sockets 260 (shown as socket 260a and socket 260b) is considered to be a NUMA node. In some embodiments, the two sockets 260 may be resident on the same CPU board, while in other embodiments, they may be resident on different CPU boards. Although not illustrated in FIG. 2B, the system may also include one or more system memories and/or other components, such as the system memories 260 and/or other components 270 illustrated in FIG. 2A. In this example, socket 260a includes four processor cores (shown as processor cores 265a-265d), each of which is associated with (or includes) a respective dedicated level 1 cache 275 (shown as level 1 caches 275a-275d). The four processor cores 265 of socket 260a share a last level cache 285a. In the example illustrated in FIG. 2B, socket 260b includes four processor cores (shown as processor cores 265e-265h), each of which is associated with (or includes) a respective dedicated level 1 cache 275 (shown as level 1 caches 275e-275h). The four processor cores 265 of socket 260b share a last level cache 285b.

In the example illustrated in FIG. 2B, each processor core 265 may be a multi-threaded core, in some embodiments. For example, in one embodiment each processor core may be capable of concurrently executing eight hardware threads. The threads executing on a given processor core 265 may share the level 1 cache 275 for that processor core 265, and accesses to this level 1 cache, which may be considered local to the processor core 265 and its hardware threads, may be extremely fast. In addition, the four processor cores 265 in each socket 260 may share a last level cache 285 for the socket 260, and accesses to this last level cache may also be fast, although not as fast as those to each processor core's own level 1 cache. In this example, accesses by a given hardware thread to the last level cache 285 of a different socket 260 and/or to various system memories (not shown) may exhibit increasingly higher latency, when compared to accesses to the level 1 and last level caches that are local to that hardware thread.

In some embodiments, performance gains may be obtained on NUMA architectures by employing hierarchical locks that encourage threads with high mutual memory locality to acquire the lock consecutively, thus reducing the overall level of cache misses when executing instructions in a critical section of code protected by the lock. The systems and methods described herein for implementing NUMA-aware lock cohorting may result in such high memory locality, since this algorithm encourages batches of lock acquisition requests from threads in a single cluster (e.g., threads that share a level 1 or level 2 cache) to be executed sequentially.

As previously noted, lock migration may occur when a lock is acquired by some thread T on NUMA node N and the lock is subsequently acquired by some thread S on a different NUMA node. In such situations, the data protected by the lock may be accessed by threads executing on different processors. If a critical section of code executed by thread T wrote to data protected by the lock, and thread S attempts to access the data, off-chip remote cache invalidation may occur, which may increase coherence traffic over the interconnect. In addition, these interconnect messages may give rise to increased latency for the accessing thread (e.g., thread S), and decreased performance of the system as a whole (since the interconnect itself is a shared fixed resource). In some cases, coherence traffic arising from one program on a system can slow down or impede the performance of completely unrelated concurrently running programs (or even threads on unrelated nodes) because of bandwidth and queuing delays arising from the interconnect due to the increased coherence traffic.

Note that, even if a critical section of code does not write to the shared data protected by the lock, multiple threads reading the shared data (e.g., the values of shared variables) may cause replication over multiple caches. This may displace other useful data that would have been accessed again in the near future and may pollute the cache with unnecessary redundant replicas. Finally, assuming a snoop-based cache coherence protocol, if these replicas exist in a large number of caches, as might be the case when there is frequent lock migration, if the shared locations are eventually written, the invalidation mechanism may have to invalidate a large number of cache lines. For example, in some systems, invalidation may be more costly if the cache line to be invalidated exists in a valid state in multiple caches.

In some embodiments, the techniques described herein may reduce the frequency of lock migration by "batching up" the execution of pending critical sections of code so that multiple invocations will tend to run back-to-back on the same node, to the extent possible given the number of contending threads and given reasonable fairness constraints. In some embodiments, a NUMA-aware lock may include a top-level spin-lock (G) of a type that is thread-oblivious (i.e. a spin-lock that allows the acquiring thread to differ from the releasing thread), and one or more other node-level or cluster-specific spin-locks (S) of a type that includes a cohort detection property (i.e. the property that a thread releasing the node-level or cluster-specific lock can detect whether it has a non-empty cohort of threads concurrently attempting to acquire the node-level or cluster-specific lock).

Figure 3A:
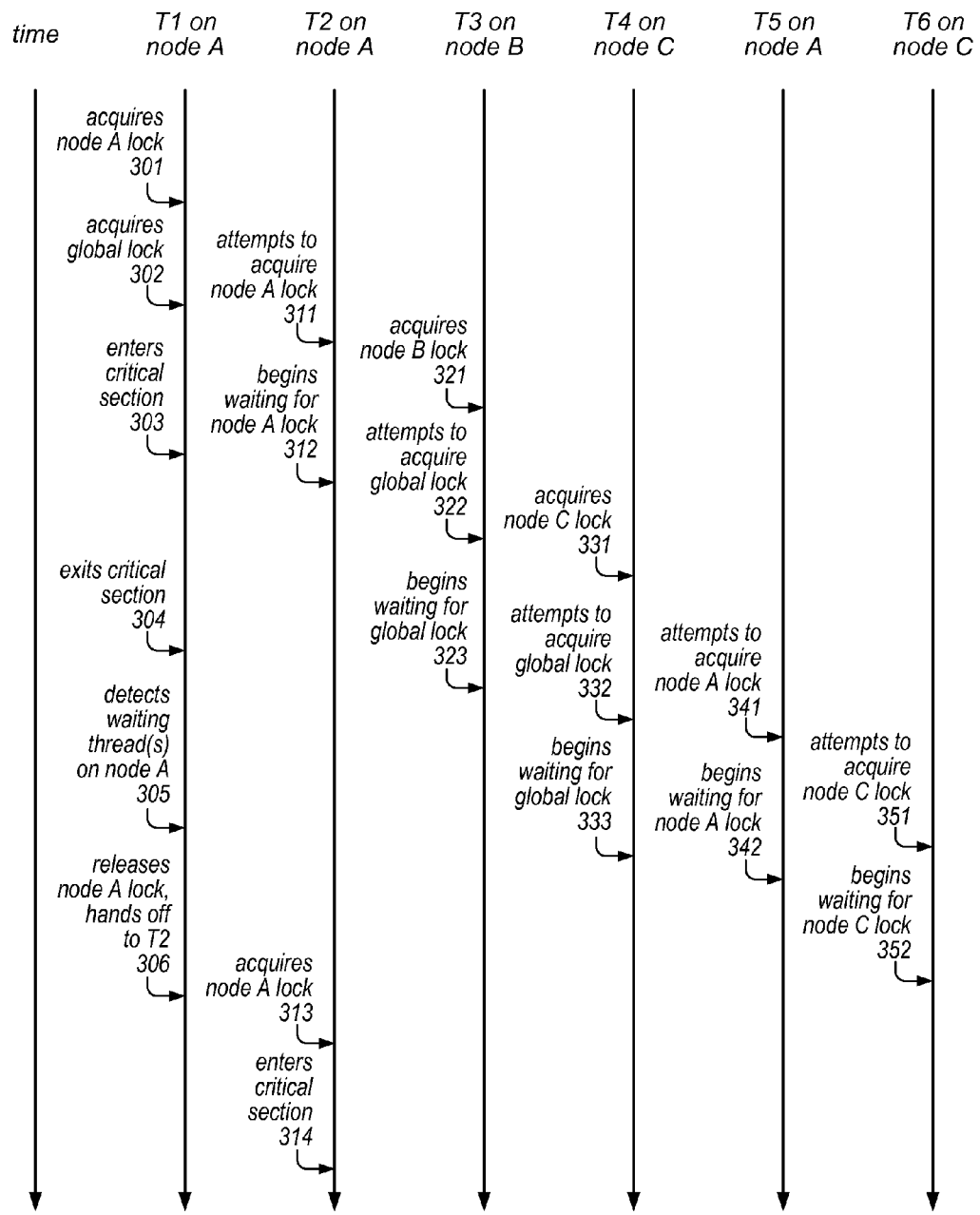
FIGS. 3A-3B illustrate actions taken by multiple threads over time to acquire and/or release a global shared lock and multiple cluster-specific locks associated with a critical section of code or shared resource, according to one embodiment.
Figure 3B:
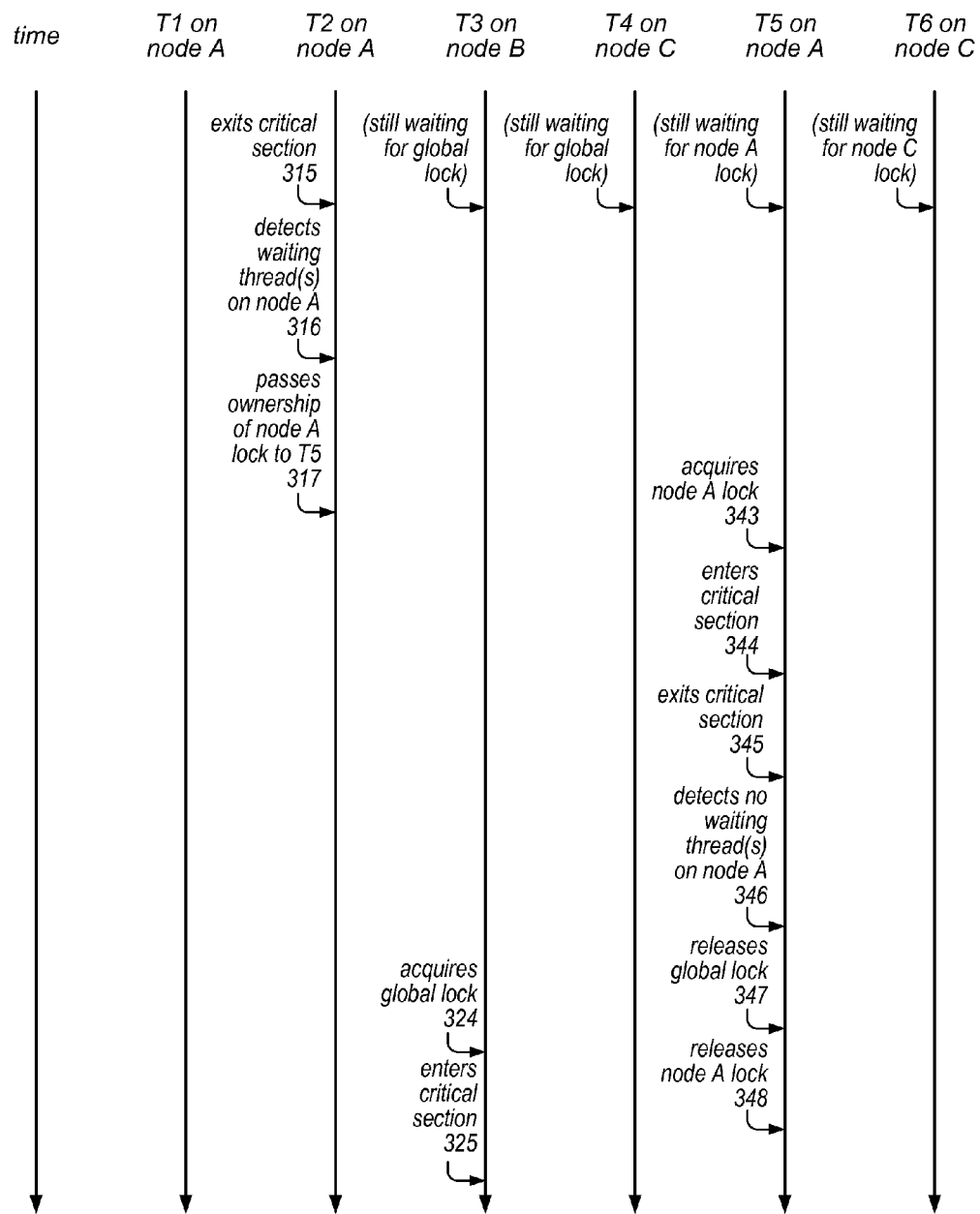

The techniques described herein for implementing lock cohorting may be further illustrated using a timeline. For example, FIGS. 3A-3B illustrate timelines of example actions taken by multiple threads on several different NUMA nodes to acquire and/or release a global shared lock (i.e. a top-level lock) and multiple cluster-specific locks (e.g., node-level locks) associated with a critical section of code, according to one embodiment. In this example, it is assumed that the top-level lock (which may be implemented as an exponential back-off spin lock or any other type of spin lock) and the node-level locks (which may be implemented as MCS-style locks) are initially idle. In this example, at time 301, a thread T1 that is executing on node A attempts to acquire the node-level lock for node A (e.g., a NUMA-aware MCS lock for node A), and is successful. Having acquired that lock, thread T1 then succeeds in its attempt to acquire the top-level lock (at time 302), and enters the critical section of code protected by the lock (at time 303).

In this example, at some point after time 302 (shown as time 311 in FIG. 3A), thread T2 executing on node A attempts to acquire the node-level lock for node A. However, since the node-level lock for node A is held by T1, T2 enqueues on the node-level lock and waits for it to be released (beginning at time 312). In the meantime, thread T3 executing on node B attempts to acquire the node-level lock for node B and succeeds (at time 321). At time 322, thread T3 attempts to acquire the top-level lock, but is unsuccessful (since the top-level lock is held by T1). Therefore, T3 spins while waiting to acquire the top-level lock (beginning at time 323). Similarly, thread T4 executing on node C attempts to acquire the node-level lock for node C and succeeds (at time 331). At time 332, thread T4 attempts to acquire the top-level lock, but is unsuccessful (since the top-level lock is held by T1). Therefore, T4 spins while waiting to acquire the top-level lock (beginning at time 333).

At some point (shown as time 341), thread T5 executing on node A attempts to acquire the node-level lock for node A. However, since the node-level lock for node A is held by T1, T5 enqueues on the node-level lock and waits for it to be released (beginning at time 342). Similarly, thread T6 executing on node C attempts to acquire the node-level lock for node C (at time 351). However, since the node-level lock for node C is held by T4, T6 enqueues on the node-level lock and waits for it to be released (beginning at time 352). At this point, T1 holds the top-level lock and the node-level lock for node A, T2 and T5 are waiting for the node-level lock for node A, T3 owns the node-level lock for node B, T4 owns the node-level lock for node C, T6 is waiting for the node-level lock for node C, and T3 and T4 are contending for the top-level lock.

At some point, in this example, T1 exits the critical section of code (shown in FIG. 3A at time 304). At time 305, T1 checks the node-level lock on its "home" node (i.e. node A, on which it is executing), and sees that the node-level lock for node A is populated (i.e. that other threads on node A are enqueued on the lock). Therefore, T1 effects a node-local hand-off of the node-level lock for node A at time 306. For example, T1 hands off or passes ownership of the node-level NUMA-aware lock to T2, effectively dequeuing T2 from the node-level lock for node A, without releasing the top-level lock. Therefore, the top-level lock remains held. As illustrated in FIG. 3A, as a result of the hand-off from T1, T2 acquires the node-level lock for node A (at time 313) and enters the critical section of code (at time 314).

As illustrated in FIG. 3B, T2 eventually exits the critical section of code (at time 315), detects that other threads are waiting for the node-level lock for node A (at time 316), and passes ownership of the node-level lock for node A to waiting thread T5 (at time 317). Here again, the top-level lock remains held. As a result of the hand-off from T2, T5 acquires the node-level lock for node A (at time 343) and enters the critical section of code (at time 344). In this example, when T5 subsequently exits the critical section of code (at time 345), it determines that there are no other threads waiting for the node-level lock for node A (at time 346). Therefore, T5 releases the top-level lock (at time 347), and then releases the node-level lock for node A (at time 348). In this example, one of threads contending for the top-level lock (i.e. thread T3) subsequently acquires the top-level lock (at time 324), and enters the critical section of code (at time 325). Alternatively, T4, which was also contending for the top-level lock, could have acquired the top-level lock at any point after time 347, but before the top-level lock was acquired by another thread (e.g., T3). In this example, when T3 eventually exits the critical section of code, it may preferentially pass ownership of the node-level lock for node B to a thread that is local to node B (while still holding the top-level lock), or if there are no such threads, may release the top-level lock.

As illustrated in this example, the techniques described herein reordered lock succession so that the lock (and the data protected by the lock) remained resident on node A for a longer period than would have been the case if the data were protected by a lock that employed a strict FIFO succession policy. More specifically, these techniques may promote prolonged residency of a lock and the data it protects in the caches of a given NUMA node or processor cluster.

Various descriptions herein may include the following terminology relating to lock fairness (e.g., in terms of progress and liveness):

R-Bounded-waiting: With this type of waiting, if a given thread T1 is trying to acquire a lock L, there may be a bound R on the number of times any other given thread T2 (arriving subsequent to the arrival of thread T1) is able to acquire lock L before T1 does so. In other words, thread T2 cannot "pass" or "overtake" thread T1 more than R times on lock L during one lock acquisition episode (e.g., attempt) made by thread T1.

Linear waiting: This type of waiting may be thought of as R-bounded-waiting, where R=1. With type of waiting, no thread can acquire a lock twice while some other thread is kept waiting.

FIFO: This type of waiting may be thought of as R-bounded-waiting, where R=0. With type of waiting, a lock is a completely fair lock. Standard MCS and CLH locks may be considered FIFO locks, for example. In some cases, the term FIFO and the terms first-come-first-served (FCFS) or first-in-first-enabled may be considered to be interchangeable.

R-Fairness: With this type of fairness, a waiting thread T may be able to acquire the lock L before all other threads that arrive subsequent to the arrival of thread T are able collectively to acquire the lock L R+1 times.

Completely unfair: In this extreme case (which may be thought of as infinite-bounded waiting), a thread may starve indefinitely waiting for a lock while other threads dominate the lock. This condition may also be referred to as a "lockout" condition.

Note that fairness is typically defined over some interval. For example, fairness may be defined as a function of the number of successful acquisitions, or over a particular time period. In general, an algorithm or lock may be said to provide livelock-freedom if the fact that a thread T is trying to acquire lock L implies that some thread will eventually acquire the lock. A stronger progress property may be starvation-freedom, which implies that if a thread T is trying to acquire lock L, then thread T will eventually acquire L.

In some embodiments, the NUMA-aware locks described herein may not strictly FIFO, and thus may not be strictly fair. As previously noted, there is a tension and trade-off between aggregate throughput over the lock (i.e. overall performance) and fairness. For example, assuming uniformly random arrivals, a completely fair FIFO lock may tend to exhibit extreme lock migration, and thus poor performance. By relaxing the fairness properties of the lock, lock migration may be reduced and performance may be improved.

In general, a lock cohorting transformation may be applied to existing and/or familiar non-NUMA-aware locks to create composite locks of various types that are NUMA-aware. This may allow programmers to enhance the performance of their locks (e.g., by improving locality of reference, as enabled by the NUMA-awareness property of cohort locks), while preserving many of the original properties of the locks that their existing applications use.

In the following descriptions, it may be assumed that the system is organized into clusters of computing cores, each of which has a large cache that is shared among the cores local to that cluster, so that inter-cluster communication is significantly more expensive than intra-cluster communication. As used herein, the term "cluster" refers to a collection of computing cores, which may in various embodiments be processor cores on a single multicore chip, or processor cores on a collection of multicore chips (nodes) that have proximity to the same memory or caching structure, depending on the size of the NUMA machine at hand. In these and other descriptions, it may also be assumed that each cluster has a unique cluster identifier (or cluster id) known to all threads running on processor cores in the cluster.

In various examples described herein, lock cohorting is illustrated in the context of spin-locks, although it may be applied to other types of locks, including blocking-locks. These examples may also assume a standard model of shared memory based on execution histories. Note that if both the top-level and underlying locks are abortable (e.g., if the locks at both levels support a timeout), then the composite form may also be abortable. Note also that simple spin locks are typically abortable.

In the descriptions included herein, a lock may be implemented as an object that provides mutual exclusion using lock and unlock methods, that is implemented in shared memory, and that includes various common safety and liveness properties. In some embodiments, the locks considered suitable for construction of NUMA-aware composite locks may be required to provide mutual exclusion and to be deadlock-free. In general, the only requirements for implementing NUMA-aware cohorting may be that the component of the NUMA-aware composite locks exhibit the following properties:

1. Thread-obliviousness: The top-level lock must support asymmetric usage in that it must allow one thread to acquire the lock and another thread to subsequently release the lock. For example, a lock x may be considered thread-oblivious if, in a given execution history, a lock method call of lock x executed by a given thread allows the matching unlock method call (the next unlock of lock x that follows in the execution history) to be executed by a different thread.
2. Cohort detection: The underlying (node-level or cluster-specific) locks must embody the concept of a "next" field for succession. In other words, the owner of a node-level (or cluster-specific) lock must be able to detect the existence of a successor. In some embodiments, a lock x may be said to provide cohort detection if a new predicate method referred to as "alone?" can be added to lock x that in any execution history returns true if there is no other thread concurrently executing a lock method on lock x.

Note that in some embodiments, the underlying locks may also be able to pass ownership to and, if necessary, dequeue a successor. For example, in some embodiments, the lock may allow succession by direct handoff from the current owner to some next owner that was waiting for the lock to become available or may employ any of a variety of indirect succession mechanisms, some of which are described herein. In other words, the type of succession policy employed by the underlying locks (e.g., direct succession or otherwise) may be arbitrary.

In some embodiments, the underlying (node-level or cluster-specific) locks may include existing (i.e. native) metadata fields that can be examined to provide the cohort detection property described above. In other embodiments, the underlying locks may be of an opaque or unknown type that does not include a cohort detection property and/or that does not contain any lock metadata that can be accessed for use in detecting a successor. In some such embodiments, each of the underlying locks may be augmented with a counter that is atomically incremented before each call to acquire the lock and that is decremented when that call returns. For example, the lock( ) call may be "wrapped" with these increment and decrement operations. In such embodiments, the "alone?" operator may fetch and examine the value of the counter, returning "true" of the value is greater than zero, and returning "false" if the value is zero.

In some embodiments, a NUMA-aware lock may be constructed by implementing a local instance $S_i$ of a cluster-specific lock that has the cohort detection property described above in each cluster i in the NUMA machine, and implementing an additional shared thread-oblivious global lock G. In some embodiments, locks $S_i$ (where i∈{1 . . . n}, and where n is the number of clusters in the NUMA system), and lock G may be of different types. For example, each of the locks $S_i$ may be implemented by applying modifications to MCS-style queue-locks and lock G may be implemented as a simple test-and-test-and-set backoff lock (BO), in one embodiment. In some embodiments, in order to access a critical section of code (or shared resource) protected by the cohort lock, a thread must hold both the local lock $S_i$ of its cohort, and the global lock G. However, given the special properties of locks $S_i$ and G, once a given thread in a cohort acquires lock G, control of the critical section of code (or shared resource) may be passed in a deadlock-free manner from one thread in the cohort to the next thread in the cohort using the local lock $S_i$, without releasing the global lock G. To maintain fairness, the global lock G may at some point be released by some thread in the cohort (not necessarily the thread that acquired it), allowing a cohort of threads from another cluster specific lock $S_j$ to take control of the cohort lock.

FIGS. 4A-4E are block diagrams illustrating the use of NUMA-aware locks to implement lock cohorting, according to one embodiment. In this example, a NUMA-aware lock structure includes a top-level lock that is a test-and-test-and-set backoff lock (i.e. a global BO lock), and an MCS type queue lock for each of two clusters. In this example, a thread spins if its node state is "busy", and a thread can enter a critical section of code protected by the NUMA-aware lock if the state is "local release". A thread can attempt to acquire the global BO lock if it sees that the state is set to "global release" or if the thread is added as the first thread in the MCS queue for its node (e.g., by setting a null tail pointer to its own record in the MCS queue).

Figure 4A:
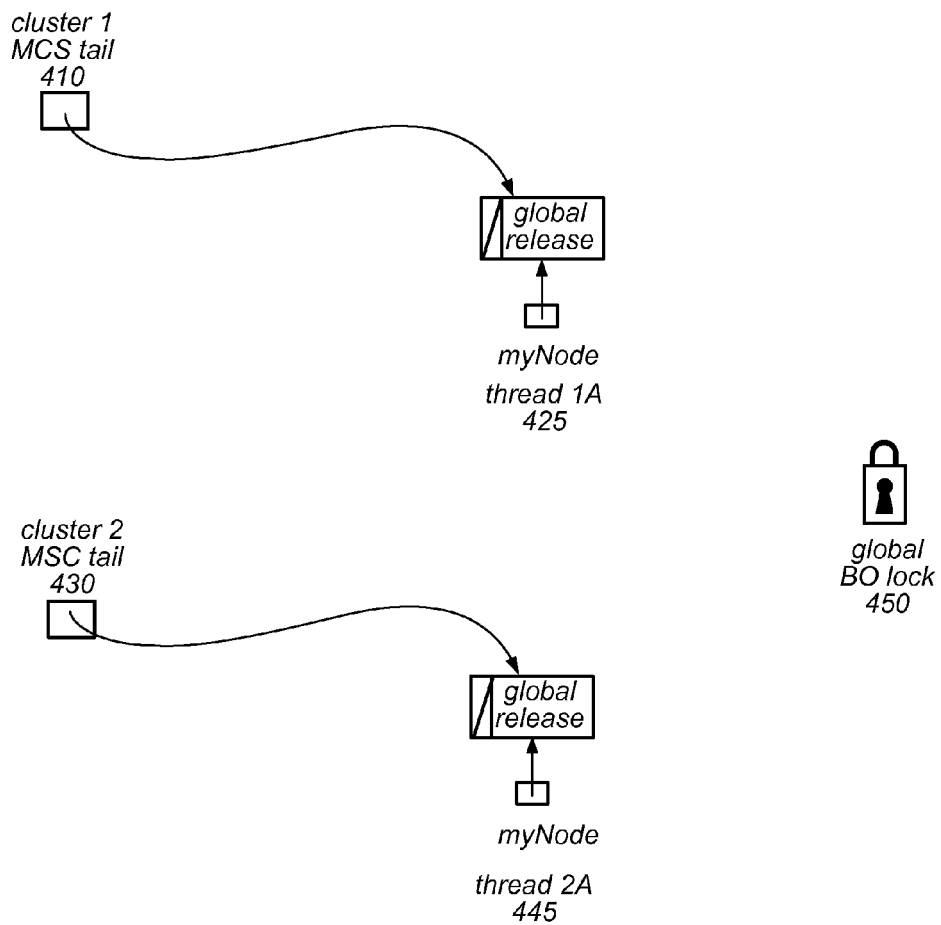
FIGS. 4A-4E are block diagrams illustrating the use of NUMA-aware locks to implement lock cohorting, according to one embodiment.

In this example, thread 1A (illustrated in FIG. 4A as 425) acquires its local MCS lock, e.g., by setting tail pointer 410 to point to its record. Thread 1A (which is executing on cluster 1) sees that it is the cluster master (it being the only thread in the MCS lock queue for cluster 1, and its state being "global release"). Therefore, it attempts to acquire global BO lock 450, and is successful. Thread 2A (which is executing on cluster 2 and is illustrated in FIG. 4A as 445) acquires its local MCS lock, determines that the cluster 2 tail pointer 430 was null, and attempts to acquire global BO lock 450 (which is held by thread 1A) by spinning on global BO lock 450 until it is released.

Figure 4B:
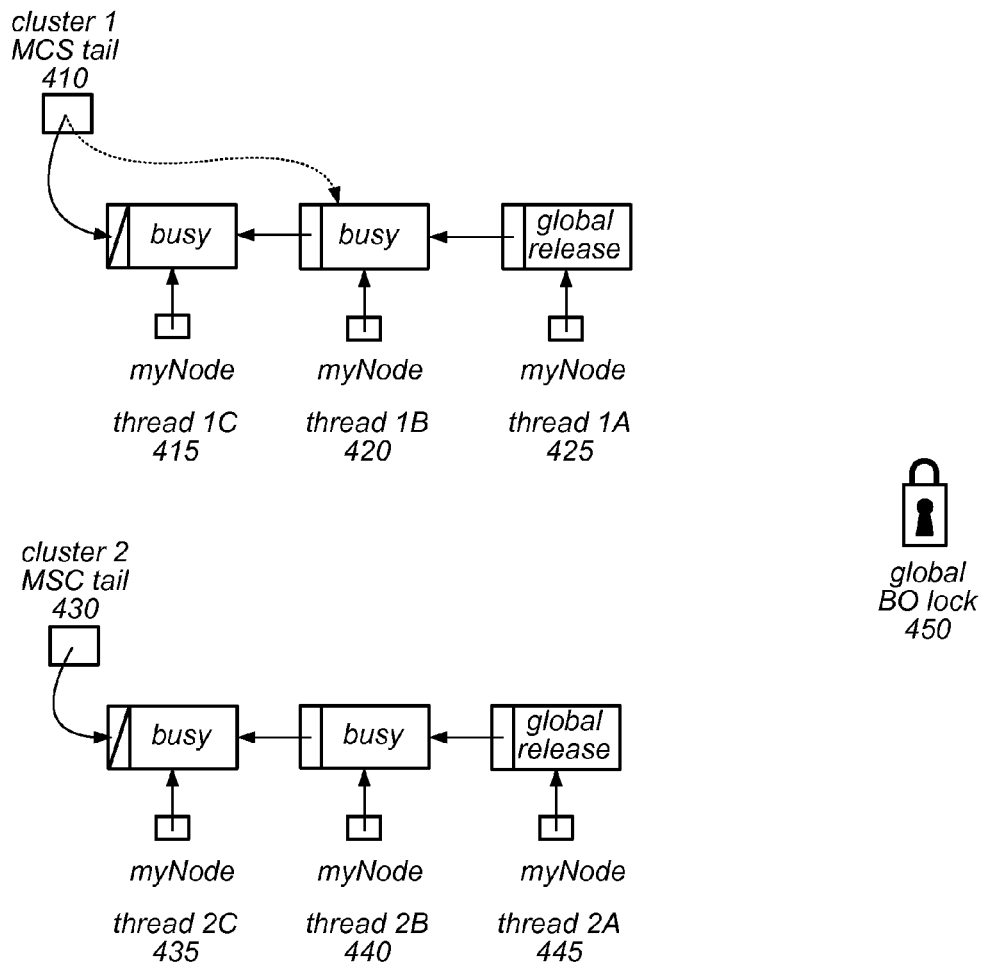

In this example, threads 1B (420) and 1C (415) add themselves to the local MCS queue for cluster 1 by first swapping tail pointer 410 to point to the record for thread 1B (illustrated in FIG. 4B by the dashed line from tail pointer 410 in FIG. 4B), and then swapping tail pointer 410 to point to the record for thread 1C (illustrated in FIG. 4B by the solid line from tail pointer 410). Similarly, threads 2B (440) and 2C (435) add themselves to the local MCS queue for cluster 2, such that tail pointer 430 points to the record for thread 2C (as shown in FIG. 4B).

Figure 4C:
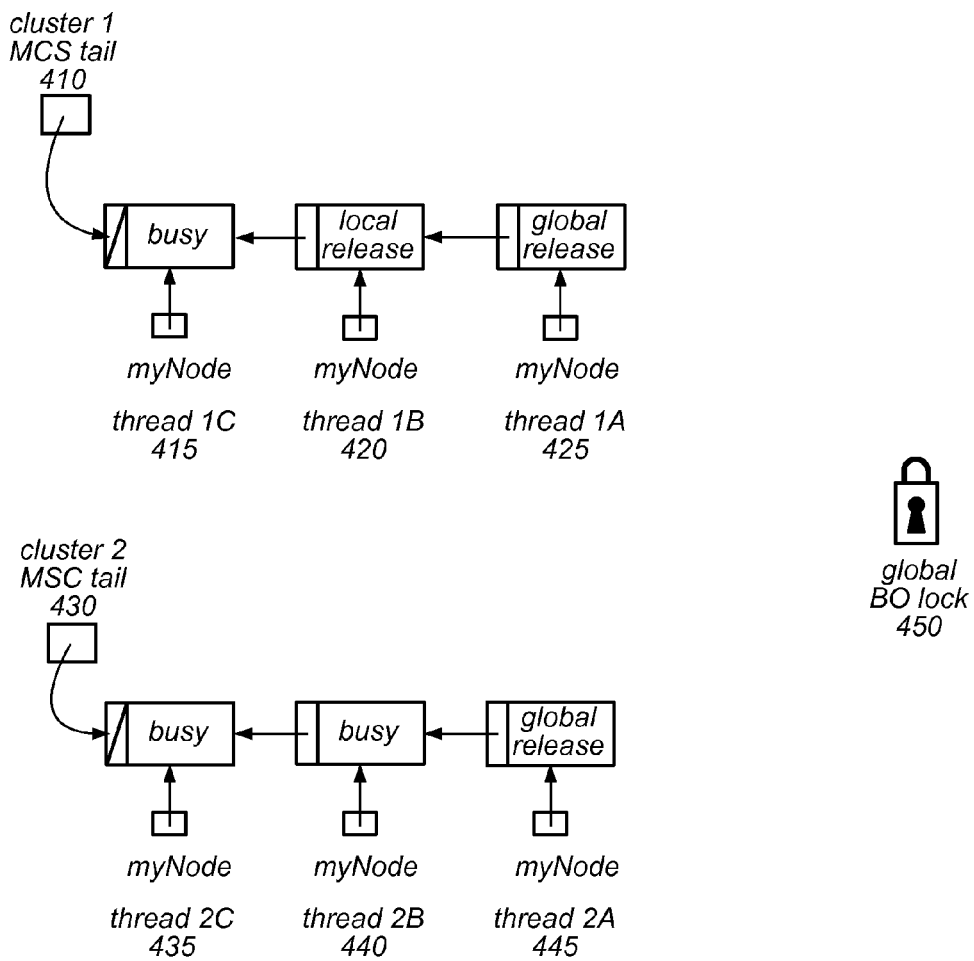
Figure 4D:
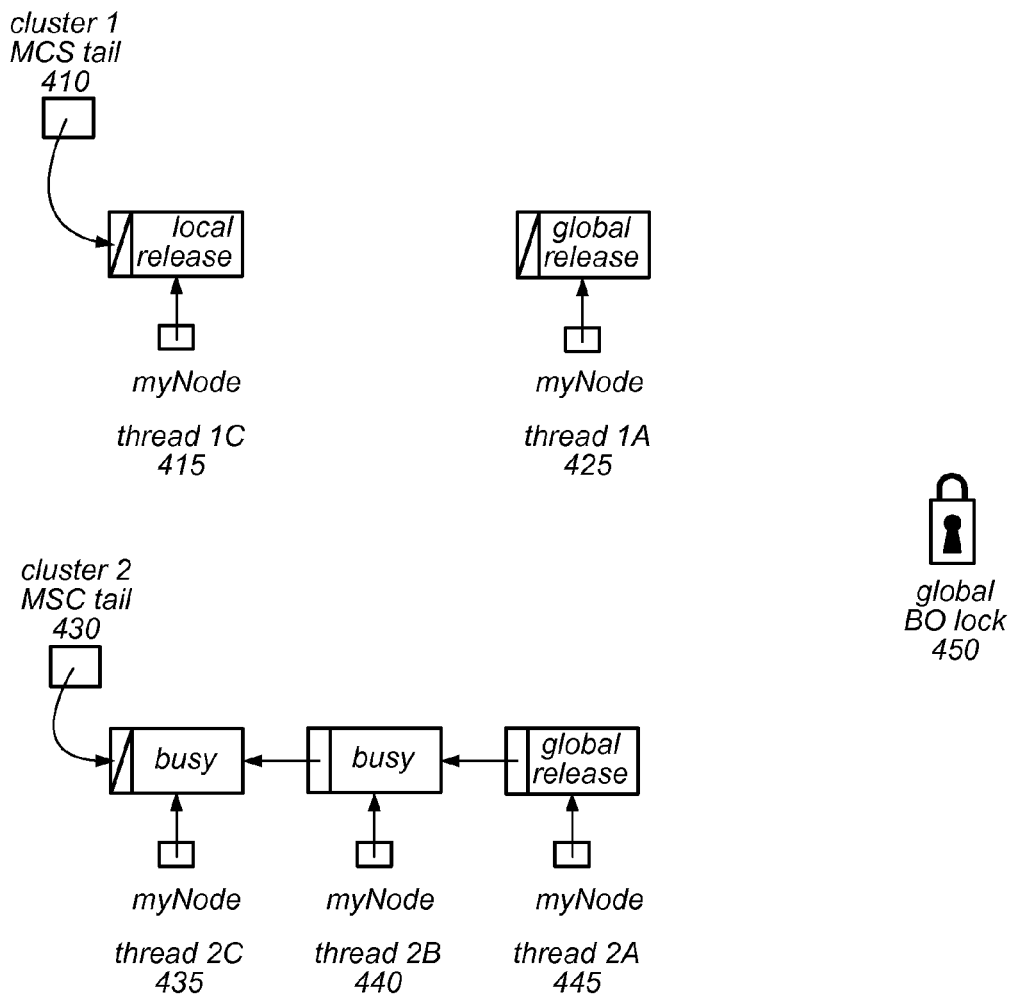

At some point, thread 1A exits the critical section of code and no longer requires the lock(s). In this example, thread 1A determines that its record points to successor thread 1B. Therefore, as illustrated in FIG. 4C, thread 1A releases the local MCS lock for cluster 1, passes ownership of the local MCS lock for node 1 to thread 1B by setting the node state for thread 1B to "local release" (which allows thread 1B to enter the critical section of code), and returns. Thread 1A does not, however, release global BO lock 450. Subsequently, thread 1B will release the local MCS lock for cluster 1 and pass ownership of the local MCS lock for cluster 1 to thread 1C by setting the node state for thread 1C to "local release" (allowing thread 1C to enter the critical section of code). This is illustrated in FIG. 4D.

Figure 4E:
Figure 4E:
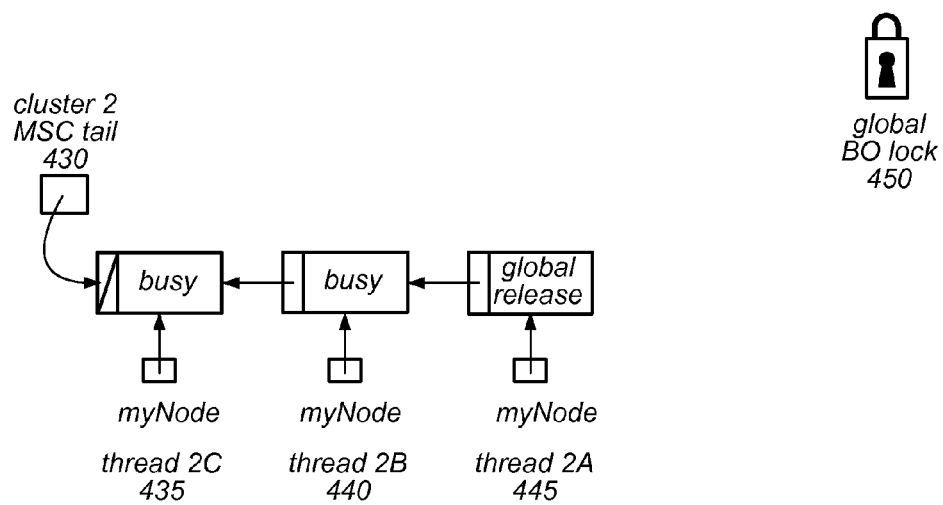

In this example, once thread 1C exits the critical section of code and no longer requires the lock(s), thread 1C releases global BO lock 450 and the local MCS lock for node 1, there being no other threads in the MCS queue for the local MCS lock. This is illustrated in FIG. 4E. In this example, thread 2A, which has been spinning on global BO lock 450, will acquire global BO lock 450 upon its release by thread 1A, and then may pass ownership of the local MCS lock for cluster 2 to threads 2B and 2C in succession, without releasing global BO lock 450.

In some embodiments, the lock method called by a thread in cluster i for a cohort lock may operate as follows. The state of the lock $S_i$ may be modified so that it has a different detectable state indicating whether it has a local release or a global release. The thread may call lock on the lock $S_i$ (i.e. the cluster-specific lock for its cluster). If, upon acquiring the cluster-specific lock $S_i$, the lock method detects that the state of the cluster-specific lock $S_i$ is local release, the thread may proceed to enter the critical section of code that is protected by the cohort lock. However, if, upon acquiring the cluster-specific lock $S_i$, the lock method detects that the state of the cluster-specific lock $S_i$ is global release, the thread may proceed to call the lock method of the global (top-level) lock G. Once the thread acquires lock G, it may enter the critical section of code that is protected by the cohort lock.

In some embodiments, a special may-pass-local predicate may be defined on the local locks $S_i$ and the global lock G. In such embodiments, the may-pass-local predicate may indicate whether the lock state is such that the global lock should be released. This predicate could, for example, be based on a timer on the global lock, on a count of the number of times the local lock was acquired in succession in a local release state, or on any other suitable criteria for determining whether the global lock should be released. In some embodiments, such a predicate may be used to define a tradeoff between fairness and performance. For example, typically, as the successive access time granted to a given cohort decreases, so does the performance benefit realized due to locality of reference in accessing the critical section of code.

In some embodiments that include a may-pass-local predicate, the unlock method called by a thread in cluster i for a cohort lock may operate as follows. The thread may call the alone? method described above and the may-pass-local predicate on $S_i$ (i.e. the cluster-specific lock for its cluster). If both return false, the thread may call the unlock method of $S_i$, and may set the release state to local release. Thereafter, the next owner of $S_i$ may directly enter the critical section of code protected by the cohort lock. Otherwise (e.g., at least one of the alone? method and the may-pass-local predicate return true), the thread may call the unlock method of the global lock G. Once lock G is released, the thread may call the unlock method of $S_i$, and may set the release state to global release.

As described above, the state of the cluster-specific lock $S_i$ upon release may indicate to the next local thread that acquires $S_i$ (i.e. the next thread executing in the same cluster i that acquires $S_i$) whether it must acquire the global lock G or not. In some embodiments, this may allow a chain of local lock acquisitions to be performed without the need to access the global lock. In some embodiments, sequences of local threads accessing the lock may be formed in this way at a very low cost. This is because once a thread in a cluster has acquired the global lock, control may be passed among the threads executing in the cluster with the efficiency of a local lock. This may reduce the overall cross-cluster communication and may increase the locality of reference when accessing the critical section of code, in some embodiments.

As previously noted, each thread executing in a cluster i and attempting to enter a critical section of code protected by a NUMA-aware lock may first acquire its local lock $S_i$, and, based on the state of the local lock, determine whether it can immediately enter the critical section of code or must compete for G (the shared global lock). In some embodiments, a thread leaving the critical section of code may first determine whether it has a non-empty cohort (e.g., it may determine whether there is at least one local thread waiting on the lock $S_i$). If so, the thread may release the local lock $S_i$ without releasing G (e.g., it may set the release state of $S_i$ to indicate that this is a local release). On the other hand, if the local cohort is empty, the thread leaving the critical section of code may release the global lock G and then release the cluster-specific lock $S_i$, setting the release state of the local lock $S_i$ to indicate that the global lock has been released (e.g., by setting its release state to global release). This may indicates to the next local thread that acquires $S_i$ that it must re-acquire the global lock G before it can enter the critical section of code protected by the NUMA-aware lock.

Figure 5:
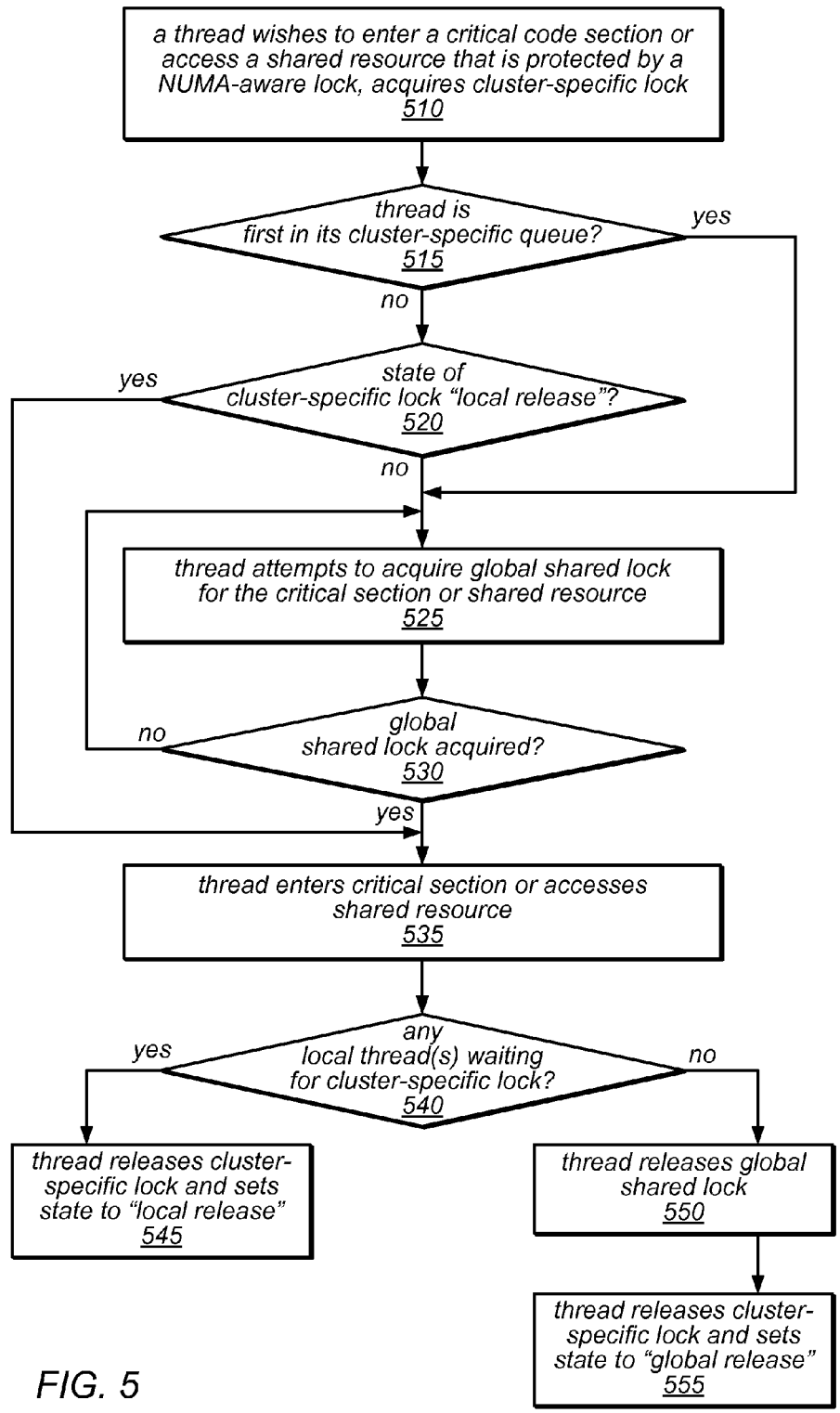
FIG. 5 is a flow diagram illustrating the use of NUMA-aware lock cohorting, according to one embodiment.

The techniques described herein for implementing NUMA-aware lock cohorting may be further illustrated by the flow diagram in FIG. 5, according to one embodiment. As illustrated at 510, in this example, a thread wishing to enter a critical code section or access a shared resource that is protected by a NUMA-aware lock may acquire a cluster-specific lock associated with the critical code section or shared resource. If the thread is the first thread to be included in the queue for its cluster-specific lock, shown as the positive exit from 515, it may attempt to acquire the global shared lock for the critical section of code or shared resource, as in 525. Similarly, if the thread is not the first thread to be included in the queue for its cluster-specific lock, shown as the negative exit from 515, and if the state of the cluster-specific lock is not "local release" (i.e. if it is "global release"), shown as the negative exit from 520, the thread may attempt to acquire the global shared lock for the critical section of code or shared resource, as in 525.

If the attempt to acquire the global shared lock is successful, shown as the positive exit from 530, the thread may enter the critical section of code or access the shared resource, as in 535. If the attempt is not successful, the thread may repeat its attempt to acquire the global shared lock until it is successful (with or without a backoff, in different embodiments). For example, the method may include the thread waiting or spinning until the global shared lock is released by a thread from another cluster. This is illustrated in FIG. 5 by the feedback from the negative exit of 530 to 525. On the other hand, if the thread is not the first thread to be included in the queue for its cluster-specific lock, shown as the negative exit from 515, and if the state of the cluster-specific lock is "local release", shown as the positive exit from 520, the thread may enter the critical section of code or access the shared resource, as in 535, without acquiring the global shared lock.

In this example, once the thread no longer requires the lock(s), if there are any other local thread(s) waiting for the cluster-specific lock (shown as the positive exit from 540), the thread may release the cluster-specific lock and set its state to "local release", as in 545. On the other hand, if there are no other local thread(s) waiting for the cluster-specific lock (shown as the negative exit from 540), the thread may release the global shared lock (as in 550). Subsequently, the thread may release the cluster-specific lock and set its state to "global release" (as in 555).

In some embodiments, the cohort detection property described above may prevent a deadlock situation in which a thread leaves the local lock without releasing the global lock, but there is no subsequent thread in the cohort, meaning that the global lock may never be released. The overall fairness of the cohort lock may be controlled by controlling the criteria for determining when a cohort gives up the global lock. For example, this decision may be taken locally by defining a static number of allowed consecutive local accesses, in some embodiments. In other embodiments, the decision may be based on a more dynamic limit, which may be application and/or workload dependent.

As previously noted, the lock cohorting approach described herein may allow for the formation of sequences of local threads accessing the lock at a very low cost, because once a thread in a cohort has acquired the global lock, control may be passed among the cohort threads with the efficiency of a local lock. In other words, the common path to entering the critical section of code may be the same as a local version of the lock of type S. In some embodiments, fairness may be controlled by limiting the number of consecutive local lock transfers allowed. This contrasts sharply with the complex coordination mechanisms, sensitive starvation prevention mechanisms, and/or global contention of some previous locks.

One embodiment of a NUMA-aware lock that employs lock cohorting, as described herein, may be illustrated using the following example pseudo-code. Note that for the purposes of illustration, this example implements a simple exponential back-off lock as the top-level lock and employs MCS-style queue locks as the underlying per-node locks. In general, however, different top-level and underlying locks may be composed in a hierarchical fashion from arbitrary lock types, in other embodiments. Note also that this example includes a fast path, which is described in more detail below.

```
class NMCSLock {          // NUMA MCS Lock
private:
  struct MCSLock ;
  struct MCSNode {
    double padA [8] ;
    MCSNode * volatile Next ;
    volatile int Lock ;
    volatile int ByPass ;    MCSLock * Assoc ;    // Home NodeLock
    double padB [8] ;
  } ALIGN(64) ;
  struct MCSLock {
    MCSNode * volatile Tail ;
    MCSNode * volatile Owner ;
    int pad [14] ;
  } ALIGN(64) ;
  enum { NNodes = 4, } ;
  // Instance fields ...
  double padA [8] ;
  volatile int TopLock ;
  double padB [8] ;
  MCSLock * TopOwner ;
  double padC [8] ;
  MCSLock NodeLocks [NNodes] ;
  double padD [8] ;
  int WorkBound ;
public:
// here, sccpu( ) returns the ID of the CPU on which the calling thread is
// running. The code below has been specialized for a 256-way 4-socket
// multicore machine in which the CPUIDs are assigned geographically
// and bits [7:6] of the CPU ID identify the socket, which is a NUMA
// node. Alternatively if explicit thread:cpu binding is in use, then that
// mapping may be used to identify the processor on which the thread is
// running
void NMCSAcquire (MCSNode * Self) {
  Self->Next = NULL ;
  Self->Lock = 1 ;
  Self->ByPass = 0 ;
  MCSLock * L = &NodeLocks [(sccpu( ) >> 6) & (NNodes−1)] ;
  Self->Assoc = L ;
  if (L->Tail == NULL) {
    // Node-local MCS lock is unlocked
    // optional fast path for low contention case - which may improve
    latency
    if (SWAPN (&TopLock, 1) == 0) {
      Self->ByPass = 1 ;
      ASSERT (TopLock != 0) ;
      return ;
    }
  }
  // slow path - typical for contention
  // Locking protocol :
  // -- Doorway/entry phase : ideally constant-time
  // -- waiting phase
  MCSNode * const prv = (MCSNode *) SWAPN (&L->Tail, Self) ;
  if (prv != NULL) {
    ASSERT (prv->Next == NULL) ;
    prv->Next = Self ;
    while (Self->Lock != 0) Pause( ) ;
    // Acquired from contended state
    // The toplock is acquired implicitly - using succession by handoff
    // That is, the ownership of the top-lock is passed/delegated to
```

-continued

```
      // this thread by the previous owner.
      ASSERT (TopLock != 0) ;
      return ;
    }
    // The node lock is acquired from uncontended state
    // Acquire the top-level lock
    for (;;) {
      if (SWAPN (&TopLock, 1) == 0) break ;
      while (TopLock != 0) Pause( ) ;
      ApplyExponentialBackOff( ) ;
    }
    ASSERT (TopLock != 0) ;
  }
  void NMCSRelease (MCSNode * Self) {
    ASSERT (TopLock != 0) ;
    if (Self->ByPass != 0) {
      TopLock = 0 ;
      return ;
    }
    // Preferentially pass ownership to a thread on the same node
    // If no such thread exists, abdicate the top-level lock.
    MCSLock * L = Self->Assoc ;
    Self->Assoc = NULL ;
    ASSERT (L != NULL) ;
    MCSNode * nxt = Self->Next ;
    if (nxt == NULL) {
      if (CASN (&L->Tail, Self, NULL) == Self) {
        // Node-local queue is empty - release the top-level lock
        // Competitive succession
        TopLock = 0 ;
        return ;
      }
      for (;;) {
        nxt = Self->Next ;
        if (nxt != NULL) break ;
        Pause( ) ;
      }
    }
    // Delegate - Pass or transfer ownership to thread associated with nxt
    // Grant the lock to nxt
    // Succession by direct handoff
    // Pass the baton to nxt
    ASSERT (nxt->Lock != 0) ;
    nxt->Lock = 0 ;
  }
} ALIGN(64) ;
```

As previously noted, when a thread releases a lock, it must provide for succession, ensuring that other contending threads, if any, eventually acquire the lock. In various embodiments, the lock implementations described herein may use direct succession (in which the current owner simply passes the lock to the next contending thread that is waiting for the lock), or competitive succession (in which the current lock holder simply releases the lock and allows contending threads to compete for ownership). Hybrid forms that combine both succession policies may also be implemented, in some embodiments. In the example pseudo-code above, the top-level lock uses competitive succession and the node-level locks use succession by direct handoff.

Note that threads that acquire a common lock may be expected to exhibit high mutual memory locality. That is, they may be likely to access many of the same data locations. As such, contending for and/or acquiring a lock may be an excellent predictor of future memory accesses.

Note that locality-preserving locks, i.e. locks that attempt to reduce lock migration (including the cohort locks described herein), often perform the best relative to standard locks when the lock is moderately or highly contended, as this increases the odds that node-local threads are available to take the lock next. In some embodiments, in the case of low levels of contention, the techniques described here may add a small but measurable overhead as threads must acquire both a node-local lock and the top-level lock. To address this potential performance issue, the cohort lock may in some embodiments be augmented with a "fast-path" mechanism that first attempts to acquire the top-level lock (as shown in the example pseudo-code above). If that attempt is successful, the thread may hold the NUMA-aware lock and may enter the critical section of code. In this example, if the top-level lock was held and the attempt to acquire it failed, the thread may simply revert to the usual NUMA MCS locking protocol, as illustrated in the example pseudo-code above. Note that the example timelines in FIGS. 3A-3B reflect the operation of a cohort lock in which no such fast-path is enabled.

Figure 6:
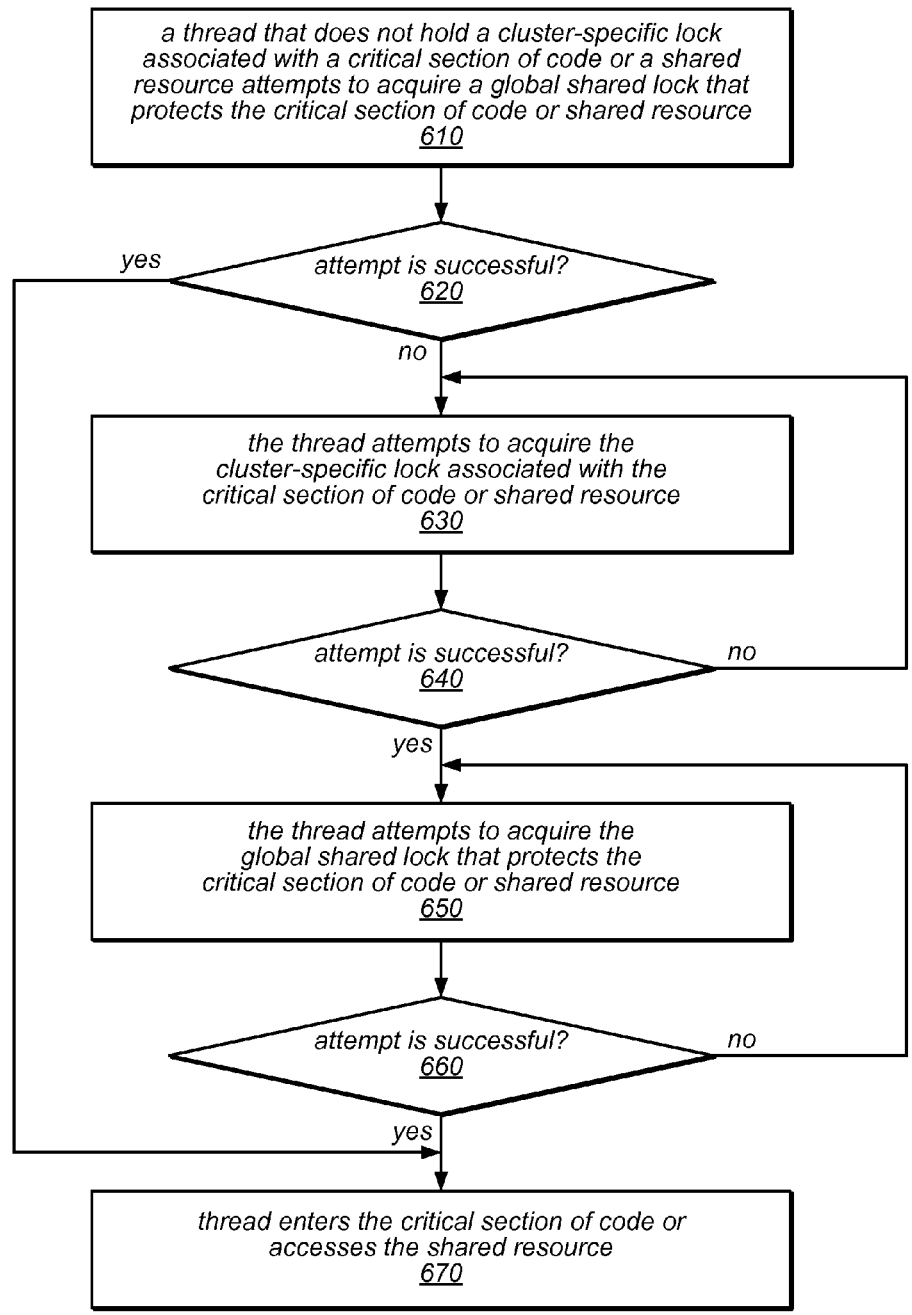
FIG. 6 is a flow diagram illustrating one embodiment of a method for managing access to a critical section of code or a shared resource using a NUMA-aware lock.

One embodiment of a method for managing access to a critical section of code or a shared resource using a NUMA-aware lock is illustrated by the flow diagram in FIG. 6. In this example, the method includes both a "fast path" option and a "slow path" option, such as those included in the example pseudo-code listing above. As illustrated at 610, the method may include a thread that does not hold a cluster-specific lock associated with a critical section of code or a shared resource attempting to acquire a global shared lock that protects the critical section of code or shared resource. If the attempt to acquire the global shared lock is successful, shown as the positive exit from 620, the thread may enter the critical section of code or access the shared resource (as in 670) without having to acquire a corresponding cluster-specific lock associated with the critical section of code or shared resource.

If the attempt to acquire the global shared lock is not successful, shown as the negative exit from 620, the method may include the thread attempting to acquire the cluster-specific lock associated with the critical section of code or shared resource (as in 630). In other words, in this example, the thread may only need to acquire the cluster-specific lock that manages access to the critical section of code or shared resource by threads executing on the same cluster as the one on which the thread executes if the thread is unable to acquire the global shared lock directly. In this example, if the attempt to acquire the cluster-specific lock associated with the critical section of code or shared resource is not successful, shown as the negative exit from 640, the method may include the thread repeating the attempt to acquire the cluster-specific lock (which may include spinning on the cluster-specific lock, with or without a backoff, or enqueuing on the cluster-specific lock, in various embodiments). Once the thread succeeds in acquiring the cluster-specific lock, shown as the positive exit from 640, the method may include the thread again attempting to acquire the global shared lock that protects the critical section of code or shared resource, as in 650.

If this later attempt to acquire the global shared lock is not successful, shown as the negative exit from 660, the method may include the thread repeating the attempt to acquire the global shared lock (which may include spinning on the global lock, with or without a backoff, or enqueuing on the global shared lock, in various embodiments). Once the thread succeeds in acquiring the global shared lock, shown as the positive exit from 660, the method may include the thread entering the critical section of code or accessing the shared resource, as in 670.

Some existing lock implementations use non-FIFO queue disciplines that are unfair over the short term. These policies attempt to keep "hot" threads running and resident on the CPU where the data they are expected to access is likely resident, reducing stress and load on the interconnect which improves multiprocessor cache coherence.

As illustrated in the example pseudo-code above, the NUMA-aware cohort locks described herein may in some embodiments provide unbounded starvation, in which one node could dominate a lock. In some embodiments, to avoid such unbounded starvation, a counter may be added to the lock structure that is set to a pre-determined value (e.g., 1000) when the top-level lock is acquired. The counter may be decremented every time the owner of the top-level lock hands ownership of the lock off to a "nearby" or proximal thread on the same NUMA node. If and when the counter reaches 0, instead of passing ownership to another thread on the same NUMA node, the thread that holds the lock may instead release the top-level lock. In some embodiments, the thread may also wake up a thread from its local MCS queue (i.e. a thread waiting on its node-local lock), allowing that thread to contend for the top-level lock.

Figure 7:
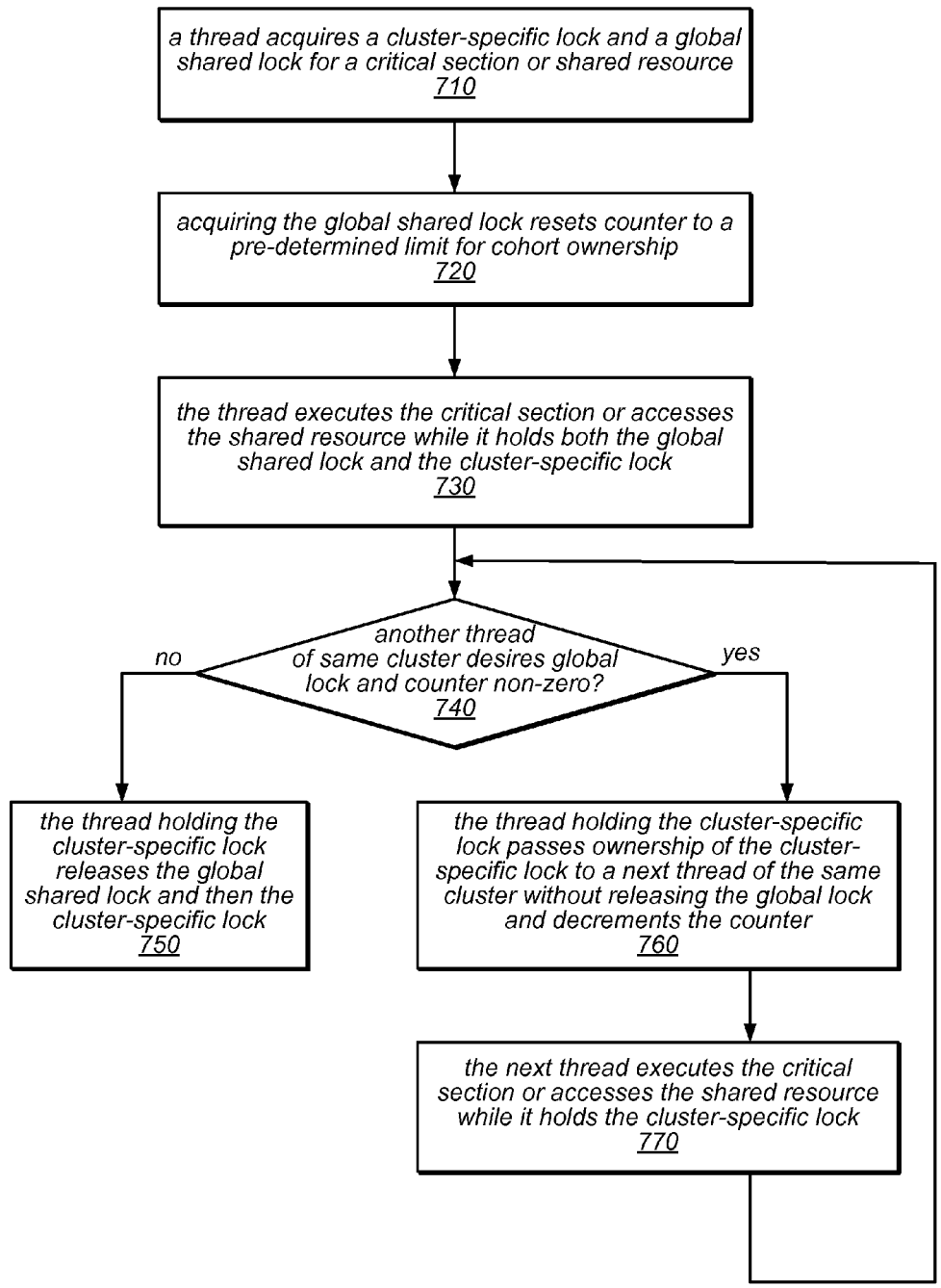
FIG. 7 is a flow diagram illustrating one embodiment of a method for managing access to a critical section of code or a shared resource using a NUMA-aware lock that includes a counter.

One embodiment of a method for managing access to a critical section of code or a shared resource using a NUMA-aware lock that includes such a counter is illustrated by the flow diagram in FIG. 7. As illustrated in this example, the method may include a thread acquiring a cluster-specific lock and a global shared lock for a critical section of code or shared resource, as in 710. In response to having acquired these locks (or as part of acquiring one or both of them), the method may include resetting a counter to a pre-determined limit for cohort ownership, as in 720. In other words, the method may include resetting the value of a counter that is associated with the global shared lock to a value that represents a pre-determined maximum number of threads from a single cluster that are allowed to access the critical section of code or shared resource (in succession) without releasing the global shared lock.

As illustrated at 730, in this example, the method may include the thread executing the critical section of code or accessing the shared resource while it holds both the global shared lock and the cluster-specific lock. If another thread executing on the same cluster wishes to acquire the global shared lock and the counter is non-zero (shown as the positive exit from 740), the method may include the thread holding the cluster-specific lock passing ownership of the cluster-specific lock to a next thread of the same cluster without releasing the global shared lock, and decrementing the counter associated with the global shared lock, as in 760. The method may then include the next thread executing the critical section of code or accessing the shared resource while it holds the cluster-specific lock, as in 770. In this example, the operations illustrated at 740, 760, and 770 may be repeated to pass ownership of the cluster-specific lock to other threads executing in the same cluster without releasing the global shared lock (e.g., zero or more times) until the counter reaches a value of zero. A value of zero may indicate that the pre-determined limit on the number of threads from a single cluster that are allowed to access the critical section of code or shared resource (in succession) without releasing the global shared lock has been reached. This is illustrated in FIG. 7 by the feedback from 770 to 740.

Once there are no additional cohort threads (threads executing on the same cluster) waiting for the cluster-specific lock or the limit on the number of cohort threads has been reached, shown as the negative exit from 740, the method may include the thread that is holding the cluster-specific lock releasing the global shared lock and then the cluster-specific lock, as in 750. Note that the thread that releases the global shared lock (i.e. the thread that currently holds the cluster-specific lock) may or may not be the thread that originally acquired the global shared lock on behalf of its cohort (at 710), depending on whether the thread that originally acquired the global shared lock has passed ownership of the cluster-specific lock to another thread executing on the same cluster. In other words, as described herein, one thread executing on a given cluster may acquire the global shared lock, and another thread executing on the given cluster may release it for potential subsequent acquisition by a thread executing on the same or another cluster, in some embodiments.

In some embodiments, each of the local node-level locks may be implemented as a pair of MCS-style locks, such that at any given time one of the two locks would be the active lock (with an active queue of threads) and the other lock would be passive (with a passive queue of threads). In such embodiments, when handing off lock ownership, the current owner may draw threads from the queue of the active MCS-style lock. Arriving threads would enqueue on the list of threads maintained by the passive lock. In this example, when the list of threads in the active queue becomes empty, the owner may rotate or swap the active and passive lists, and may release the top-level lock.

Figure 8:
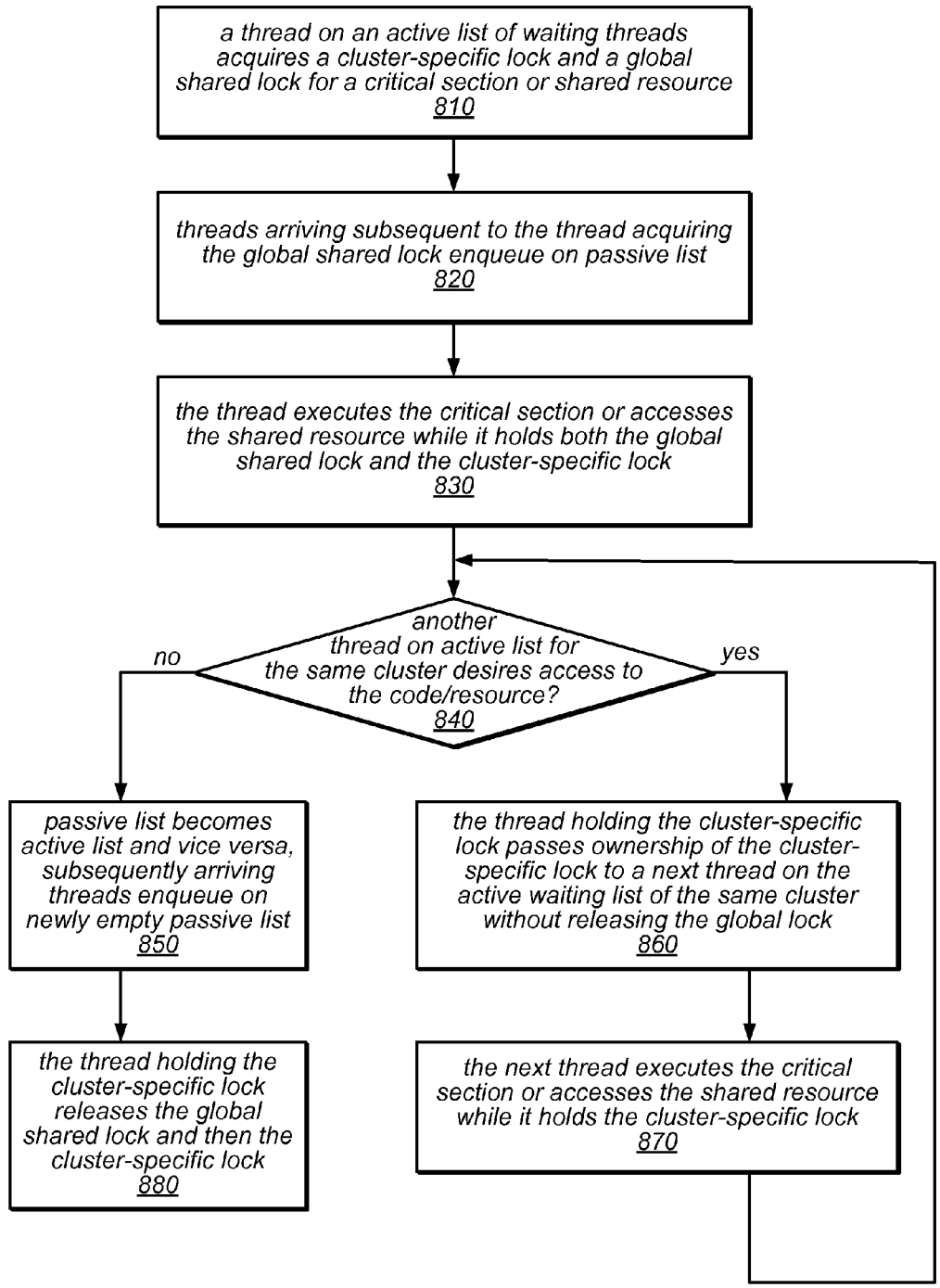
FIG. 8 is a flow diagram illustrating one embodiment of a method for managing access to a critical section of code or a shared resource using a NUMA-aware lock that includes active and passive lists of waiters.

One embodiment of a method for managing access to a critical section of code or a shared resource using a NUMA-aware lock that includes such active and passive lists of waiters is illustrated by the flow diagram in FIG. 8. As illustrated in this example, the method may include a thread on an active list of waiting threads (i.e. a list of threads waiting to acquire a cluster-specific lock for a critical section of code or shared resource) acquiring the cluster-specific lock and acquiring a global shared lock for the critical section of code or shared resource (as in 810). In this example, threads arriving at the cluster-specific lock subsequent to the thread acquiring the global shared lock may enqueue on a passive list of waiting threads (i.e. an alternate list of threads that are waiting to acquire the cluster-specific lock), as in 820. In other words, each cluster-specific lock associated with a critical section of code or shared resource may include two lists of waiting threads: an active list, and a passive list.

As illustrated in FIG. 8, the method may include the thread that acquired the global shared locked executing the critical section of code or accessing the shared resource while it holds both the global shared lock and the cluster-specific lock (as in 830). If there is another thread on the active waiting list for the same cluster (i.e. another thread waiting for the same cluster-specific lock that wishes to access the critical section of code or shared resource that is protected by the global shared lock), shown as the positive exit from 840, the method may include the thread that holds the cluster-specific lock passing ownership of the cluster-specific lock to a next thread on the active waiting list of the same cluster without releasing the global lock (as in 860). The next thread may then execute the critical section of code or access the shared resource while it holds the cluster-specific lock, as in 870. In this example, the operations illustrated as 840, 860, and 870 may be repeated until the active list of threads is empty. This is illustrated in FIG. 8 by the feedback from 870 to 840.

If there are no other threads on the active waiting list for the same cluster (or once the active list has been depleted), shown as the negative exit from 840, the method may include the passive list becoming active list and vice versa (as in 850). In this case, threads that arrive at the cluster-specific lock subsequent to this swap may enqueue on the newly empty passive list (i.e. the list that was formerly the active list, but that has been depleted). The method may also include the thread that holds the cluster-specific lock releasing the global shared lock and then releasing the cluster-specific lock, as in 880. In other words, once there are no additional threads waiting on the active list for the cluster-specific lock, the thread holding the cluster-specific lock may cause the active and passive lists to be swapped and may give up the global shared lock to enable the potential subsequent acquisition of the global shared lock by a thread executing on the same or another cluster. Note that if a thread executing on another cluster does not acquire the global shared lock, another thread executing on the cluster (e.g., a thread that enqueued on the passive list while ownership of the cluster-specific lock was being held by, and passed, to successive threads on the active list) may acquire the cluster-specific lock and the global lock. Note also that the thread that releases the global shared lock (i.e. the thread that currently holds the cluster-specific lock) may or may not be the thread that originally acquired the global shared lock on behalf of its cohort (at 810), depending on whether the thread that originally acquired the global shared lock has passed ownership of the cluster-specific lock to another thread executing on the same cluster. In other words, as described herein, one thread executing on a given cluster may acquire the global shared lock, and another thread executing on the given cluster may release it for potential subsequent acquisition by a thread executing on the same or another cluster, in some embodiments.

In addition to reducing lock migration, the techniques described herein may in some embodiments provide benefit over a simple centralized lock by reducing the number of threads that are contending for the top-level lock to at most N, where N is the number of NUMA nodes in the system. By restricting concurrency in this fashion, these techniques may often improve performance on the top-level lock, when compared to centralized forms in which all threads might compete for a lock. Specifically, the cohort locks described herein may diffuse or disperse contention over the node-level locks, and may throttle or restrict concurrent access to the top-level lock. In other words, the node-level locks may provide admission control and moderate concurrent access to the top-level lock.

Some existing locks can delegate work to threads that transiently take the role of critical section execution servers. With these locks, execution of a critical section of code requested by thread T2 might be delegated or dispatched to some thread T1 that runs the critical section of code on behalf of T2. Since the service thread is likely to stay resident on a single node while processing these requests, the data accessed by that service while running these critical sections of code may also be likely to stay resident in the caches of the node on which thread T1 runs. As such, these locks may decrease the frequency of lock migration and improve performance. However, these existing techniques require that the critical section of code be presented as a closure or "lambda" instead of as a traditional block of code between a lock and unlock operation, which can greatly complicate conversion of existing code to use these techniques. One of these existing locks is a centralized lock in that all threads attempting to enter the critical section of code arrive at and access key central read-write mutable variables. This decreases the scalability of the technique because of coherence traffic on the lock metadata. By contrast, the NUMA-aware cohort locks described herein may use a conventional programming model, may avoid many of the constraints of these existing delegating locks, and may be more scalable than these existing delegating locks. For other existing locks, including the HBO lock, CLH lock and HCLH locks described above, significant overhead may be incurred in maintaining a central queue, ordering the queue, and/or transferring elements from a local queue to a central queue. In addition, the queue of threads itself (i.e. the lock metadata) can be a significant source of coherence traffic. However, in various embodiments, the NUMA-aware cohort locks described herein (e.g., the NUMA-aware MCS lock described above), never manipulate non-local queue data.

As previously noted, a NUMA-aware composite lock may in some embodiments be constructed by modifying one or more non-NUMA-aware locks so that they collectively exhibit the thread-obliviousness and cohort detection properties described above, if they do not already exhibit them. Some several existing locks are thread oblivious. For example, the BO and various ticket locks may have this property, and since the global lock may not be expected to be highly contended, one of these types of locks may be suitable for implementing the global lock, in some embodiments. With respect to the cohort detection property, locks such as the MCS queue lock have cohort detection built in, in that each spinning thread's record in the queue includes a pointer installed by its successor. Therefore, as described in some of the examples above, MCS-style queue locks may be suitable for implementing the node-level (or cluster-specific) locks of a NUMA-aware composite lock. In order to use some other locks at the node or cluster level, (e.g., BO locks), a cohort detection mechanism may need to be added to the lock to allow releasing threads to determine whether other cohort threads are accessing the lock. In some embodiments, additional modifications may need to be made to various existing locks when the algorithms are required to be abortable. In an abortable lock, simply detecting that there is a successor node may not be sufficient to allow a thread to release the local lock but not the global lock. Instead, the releasing thread may need to make sure that there is a viable successor, i.e. one that will not abort after the thread releases the local lock, as this might leave the global lock deadlocked. In some embodiments, the BO lock (which is abortable by design) and the abortable CLH lock may be converted into abortable, NUMA-aware cohort locks.

Various lock cohorting mechanisms, constructed using the lock cohorting transformation described herein, were tested on a 256-way 4-socket multicore machine. These tests showed that several variations of cohort NUMA-aware locks outperform all prior algorithms, and in some situations are over 60% more scalable than the most scalable NUMA-aware lock in the literature. Furthermore, the cohort lock designs tested were found to be less complex to implement and to require significantly less space than previous NUMA-aware locks. An example abortable NUMA-aware cohort lock was found to outperform the HBO lock (which is abortable by definition) and the abortable CLH lock by about a factor of six. Various experiments demonstrated that, in some configuration settings, cohort locks can improve the performance of a multithreaded application by over 25% without degrading performance on all other settings. Other experiments demonstrated how cohort locks can directly affect memory utilization patterns of multi-threaded programs and significantly boost their reference locality. In experiments conducted on a memory allocator stress test benchmark, the cohort locks enabled scaling the benchmark to about a factor of 2.3, while all other reported locks failed to scale even beyond single thread runs.

In various embodiments, the mutual exclusion property of any cohort lock may be guaranteed. In other words, the cohort locking transformation described herein may be guaranteed to provide mutual exclusion. In some embodiments, a cohort lock may be guaranteed to provide deadlock freedom. In such embodiments, the cohort lock implementation may ensure that an exiting thread can release just the local lock only if there is a guarantee that there exists another thread that is waiting to acquire the local lock (which eliminates the possibility of a deadlock).

In some embodiments, the starvation freedom and/or fairness properties of a cohort lock transformation may depend on the starvation-freedom and fairness properties of the locks chosen for the implementation and on the choice of the may-pass-local method. For example, a typical may-pass-local method may count the number of consecutive lock acquisitions, and may make sure it is short enough to allow threads from another cluster to access the lock.

Although many, if not most, types of existing locks can be used in the cohort locking transformation, in different embodiments, six example constructions are described in detail herein. The first four example constructions are non-abortable locks (i.e. they do not support timeouts), while the last two are abortable (i.e. timeout capable) locks. Of the non-abortable locks, the first presented is a simple test-and-test-and-set backoff lock based cohort lock that employs a test-and-test-and-set backoff lock (or BO) lock globally, and local BO locks for each NUMA cluster. This composite lock may be referred to as the C-BO-BO lock. The second lock presented is a combination of ticket locks, referred to as the C-TKT-TKT lock. The third lock presented is a combination of a global BO lock and local MCS locks for each NUMA cluster. The last non-abortable lock presented includes MCS locks both globally and locally. The first abortable lock presented is an abortable variant of the C-BO-BO lock, referred to herein as the A-C-BO-BO lock. Finally, an abortable cohort lock comprising an abortable global BO lock and abortable local CLH locks is presented, which may be referred to as the A-C-BO-CLH lock.

In the C-BO-BO lock, the local and global locks are both simple BO locks. The BO lock is typically thread-oblivious by design, and may be modified to enable cohort detection, e.g., using the "alone?" method described above. In order to implement the "alone?" method, the BO locks used as node-level locks may be modified to add an indication of whether a successor exists. For example, a new successor-exists Boolean field may be added to the lock whose value is initially false, and is set to true by a thread immediately before it attempts to modify the test-and-test-and-set lock state (e.g., using a compare-and-swap type operation). Once a thread succeeds in the modifying the state and acquiring the local lock, it may write a value of false to the successor-exists field, effectively resetting it. In this example, the "alone?" method will check the successor-exists field, and if it is true, a successor must exist since it was set after the reset by the local lock winner.

In this example, the lock releaser may use the "alone?" method to determine whether it can correctly release the local lock in local release state. If it does so, the next lock owner of the local lock may implicitly "inherit" the ownership of the global BO lock. Otherwise, the local lock may be in the global release state, in which case, the new local lock owner must acquire the global lock as well. Note that it is possible that another successor thread executing the lock method exists even if the field is false, simply because the post-acquisition reset of successor-exists by the local lock winner could have overwritten the successor's setting of the successor-exists field. This type of false-negative result may be allowed in some embodiments, since it will at worst cause an unnecessary release of the global lock, but not affect correctness of the algorithm. However, false-negatives can result in greater contention at the global lock. In some embodiments, to avoid this potential issue, a thread that spins on the local lock may also check the successor-exists flag, and may sets it back to true if it observes that the flag has been reset (by the current lock owner). This may lead to extra contention on the cache line containing the flag, but most of this contention does not lie in the critical path of the lock acquisition operation. Furthermore, the low latency interconnect on the cluster may significantly mitigate the ill-effects of contention on cache lines modified by threads on the same cluster.

The C-TKT-TKT lock includes ticket locks for both the local (node-level) locks and the global lock. A traditional ticket lock consists of two counters: request and grant. In the C-TKT-TKT lock, a thread may first acquire the local ticket lock, and then the global ticket lock. Specifically, a thread intending to acquire the lock may first atomically increment the request counter, and then spin on the grant counter until it contains the incremented request value. The lock releaser may release the lock by incrementing the grant counter. Ticket locks are typically thread-oblivious by design (i.e. one thread can increment the request and another thread can correspondingly increment the grant counter). In some embodiments, cohort detection may be added to the ticket lock for its use at the local level. For example, in some embodiments, the "alone?" method may be used to determine whether the request and grant counters are the same. If not, this may indicate that there are additional requests for the lock posted by waiting threads in the cohort. In that case, the lock owner may inform the next local thread in line that it has inherited the global lock by setting a special top-granted field that is resident in the local ticket lock. Note that the top-granted flag may first be reset by the thread that acquires the local ticket lock. The lock owner may then release the local ticket lock by incrementing the grant counter. If the request and grant counters are the same, the owner may release the global ticket lock and then the local ticket lock (without setting the top-granted field).

The top-level lock of the C-BO-MCS lock, which is depicted in FIGS. 4A-4E, is a simple test-and-test-and-set lock with backoff, and is therefore thread oblivious by design (i.e. any thread can release a lock that was acquired by another thread). An MCS lock consists of a list of records, one per thread, ordered by their arrival at the locks tail variable. Each thread adds its record to the lock by performing a swap on a shared tail. It then adds a successor pointer from the record of its predecessor to its record in the lock. The predecessor, upon releasing the lock, will follow the successor pointer and notify the thread of the lock release by writing to a special state field in the successor's record. In some embodiments, such MCS locks may be modified for use as local cohort detecting locks as follows. The "alone?" method may be implemented by determining whether a thread's record has a non-null successor pointer. The release state may be modified so that instead of simple busy and released states, the state field may have values of busy or release local or release global, as described herein. Each thread may initialize its record state to a value of busy unless it encounters a null tail pointer, indicating it has no predecessor, in which case it is in the release global state and will access the global lock. With these modifications, the cohort lock protocol may be applied to the composite global BO lock and local modified MCS locks to create a NUMA-aware lock.

The C-MCS-MCS lock comprises a global MCS lock and local MCS locks. The cohort detection mechanism of the local MCS locks may be the same as that for the C-BO-MCS lock described above. However, the MSC lock is not thread-oblivious, and must be modified for use as the top-level lock. Note that a property of MCS locks is what is referred to as local spinning, in which a thread spin-waits on its MCS queue node, and is informed by its predecessor thread that is has become the lock owner. Thereafter, the thread may enter the critical section of code, and may release the lock by transferring lock ownership to its node's successor. The releasing thread may subsequently do whatever it wants with its MCS queue node (it typically deallocates it). In order to make the global MCS lock thread-oblivious, the thread that enqueues its MCS queue node in the global MCS lock's queue cannot always get its node back immediately after it releases the C-MCS-MCS lock. Instead, the node has to be preserved in the MCS queue in order to let another cohort thread release the lock. In some embodiments, this feature may be enabled by using thread-local pools of MCS queue nodes. In such embodiments, a thread that posts a request node in the queue of the global MCS lock must get a free node from its local pool. Upon releasing the global lock, the lock releaser may return the node to the original thread's pool. This circulation of MCS queue nodes may be done very efficiently and may not significantly impact performance of the lock. With this modification, a thread-oblivious MCS lock may be created, which may then be combined with the local MCS locks that have been modified to include cohort detection to create a NUMA-aware C-MCS-MCS lock.

The property of abortability in a mutual exclusion lock may enable threads to abandon their attempt at acquiring the lock while they are waiting to acquire the lock. Abortability can in some case be difficult to incorporate in cohort lock construction. For example, even if the "alone?" method, which indicates that a cohort thread is waiting to acquire the lock, returns false (which indicates that there exists at least one cohort thread waiting to acquire the lock), all the waiting cohort threads may subsequently abort their attempts to acquire the lock. This case, if not handled correctly, can easily lead to a deadlock situation in which the global lock is in the acquired state, and the local lock has been handed off to a cohort thread that no longer exists, and may not appear in the future. In some embodiments, in order to avoid this deadlock situation, the requirements of the lock cohorting transformation with respect to the cohort detection property may be strengthened. For example, the requirements may be modified such that if the "alone?" method returns true, then some thread concurrently executing the local lock method may not be allowed to abort before completing the local lock method call. Note that a thread that completed acquiring the local lock with the release local lock state cannot be aborted since by definition it is in the critical section of code.

In some embodiments, the A-C-BO-BO lock may be similar to the C-BO-BO lock described earlier, with the difference being that aborting threads may also reset the successor-exists field in the local lock to inform the local lock releaser that a waiting thread has aborted. Each spinning thread may read this field while spinning, and may set it in case it was recently reset by an aborting thread. Like in the C-BO-BO lock, in an A-C-BO-BO lock, the local lock releaser may check to see if the successor-exists flag was set (which indicates that there exists at least one thread in the local cluster that is spinning to acquire the lock). If the successor-exists flag was set, the releaser may release the local BO lock by writing release local into the BO lock. However, at this point, the releaser must double-check the successor-exists field to determine whether it was cleared during the time the releaser released the local BO lock. If so, the releaser may conservatively assume that there are no other waiting threads in its cohort, may atomically change the local BO lock's state to global release, and may then release the global BO lock.

The A-C-BO-CLH lock implements a BO lock for its global lock (which is typically abortable by design), and an abortable variant of the CLH lock (A-CLH) for its local locks. Like the MCS lock, the A-CLH lock also consists of a list of records, one per thread, ordered by the arrival of the threads at the lock's tail. To acquire the A-C-BO-CLH lock, a thread first must acquire its local A-CLH lock, and then explicitly or implicitly acquire the global BO lock. The A-CLH lock leverages the property of "implicit" CLH queue predecessors, where a thread that enqueues its node in the CLH queue spins on its predecessor node to determine whether it has become the lock owner. An aborting thread marks its CLH queue node as aborted by simply making its predecessor explicit in the node (i.e. by writing the address of the predecessor node to the prev field of the thread's CLH queue node). The successor thread that is spinning on the aborted thread's node immediately notices the change and starts spinning on the new predecessor found in the aborted node's prev field. The successor also returns the aborted CLH node to the corresponding thread's local pool.

In some embodiments, the local lock in the A-C-BO-CLH cohort lock may build on the A-CLH lock. In such embodiments, for local lock hand-offs, the A-C-BO-CLH may leverage the A-CLH queue structure in its cohort detection scheme. For example, a thread may identify the existence of cohorts by checking the A-CLH lock's tail pointer. If the pointer does not point to the thread's node, this may indicate that a subsequent request to acquire the lock was posted by another thread. However, now that threads can abort their lock acquisition attempts, this simple check may not be sufficient to identify any "active" cohorts, because the ones that enqueued their nodes may have aborted, or may still abort prior to acquiring the lock. In some embodiments, in order to address this problem, a new successor-aborted flag may be introduced into the A-CLH queue node. In some embodiments, this successor-aborted flag may be co-located with the prev field of each node in order to ensure that both are read and modified atomically. Each thread may set this flag to false and may set its node's prev field to busy before enqueuing the node in the CLH queue. An aborting thread may atomically (e.g. with a compare-and-swap type operation) set its node's predecessor's successor-aborted flag to true to inform its predecessor that it has aborted. The thread may subsequently update its node's prev field to make the predecessor explicitly visible to the successor. While releasing the lock, a thread may first check its node's successor-aborted flag to determine whether the successor may have aborted. If not, the thread may release the local lock by atomically (e.g., using a compare-and-swap type operation) setting its node's prev field to the release local state. This use of a compare-and-swap type operation coupled with the co-location of the prey and successor-aborted fields may ensure that the successor thread cannot abort at the same time. The successor may then determine that it has become the lock owner. If the successor did abort (as indicated by the successor-aborted flag value being true), the thread may release the global BO lock, and may then sets its node's state to release global. Note that another embodiment of this lock (one that avoids compare-and-swap-based local lock hand offs) separates the prey and successor-aborted fields. This variant may use strict orderings of updates and checks of these fields to ensure correctness in the lock hand off operation without using a compare-and-swap type instruction.

Note that the locks described above may be deeply unfair, and with even modest amounts of contention may lead to thread starvation. In some embodiments, in order to address this potential problem, a "may-pass-local" method may be added to these locks. The may-pass-local method may increment a simple count of the number of times threads in a single cohort have consecutively acquired the lock in a release local state. If the count crosses a threshold (e.g., 64), the lock releaser may release the global lock, and then may release the local lock, transitioning it to the release global state. This solution appears to work very effectively for all of the cohort locks described herein.

The performance of various locking schemes was investigated on a 256-way 4-socket multicore machine. Compared to existing locks, the NUMA-aware cohort locks described herein yielded superior performance on a concurrency benchmark. In these experiments, cohort locks were compared with the traditional, as well as the more recent NUMA-aware locks, on multiple levels. First several experiments were conducted on microbenchmarks that stress test these locks in several ways. Second, the locks were integrated in a popular key-value data store application to study their impact on real world workload settings. Third, a standard memory allocator was modified to study the effects of cohort locks on memory intensive multi-threaded applications.

The microbenchmark evaluation clearly demonstrated that cohort locks outperform all prior locks by at least 60%. As previously noted, the abortable cohort locks scale vastly better (e.g., by a factor of six) than the state-of-the-art abortable locks. Furthermore, cohort locks improved the performance of the key-value data store application by about 25% for write-heavy workloads. Finally, the memory allocator experiments demonstrated how cohort locks can directly affect memory utilization patterns of multi-threaded programs and significantly boost the reference locality of NUMA clusters.

Reader-writer locks are a class of mutual exclusion locks that permit simultaneous acquisition by more than one thread that intends to access the data protected by the locks in read-only mode. The use of reader-writer locks may enable significantly greater concurrency (as compared to traditional mutual exclusion locks) between threads that acquire a reader-writer lock in read-only mode, and may thus result in much better scalability than can be achieved using traditional mutual exclusion locks. None of the existing approaches to the creation and use of reader-writer locks take into account the effects of NUMA architectures on reader-writer locks.

Reader-writer locks are another one of the fundamental primitives used traditionally in parallel programs that may be adapted for use on NUMA machines. In some embodiments, by modifying reader-writer locks for better scaling on NUMA machines, the performance of multithreaded applications on such architectures may be further improved. In some embodiments, NUMA-aware reader-writer locks may leverage the lock cohorting techniques described above to band together the writer requests coming from a single NUMA node. As with the lock cohorting techniques described above, a hierarchical approach may be taken in building a NUMA-aware reader-writer lock. For example, in some embodiments, threads may contend on local structures (e.g., node-level or cluster-specific locks) to get permission to acquire a top-level (globally shared) reader-writer lock. In some such embodiments, writer threads may follow the lock cohorting strategy of handing off the lock to a local thread (i.e. one executing on the same NUMA node or in the same cluster of processor cores), whereas reader threads may follow an "all readers get in" strategy (in which all reader threads from all NUMA nodes can simultaneously acquire the lock in read mode). In other embodiments, only reader threads executing on a single NUMA node can simultaneously acquire the lock in read mode.

In the example descriptions included herein, it may be assumed that the system scheduler is fair and that the system is otherwise unloaded. It may also be assumed that the arrival rate at a lock is approximately uniform over the nodes in a system. In addition, it may be assumed that some amount of temporal reuse locality exists between critical section activations for the same lock. In other words, acquiring a lock L may be assumed to be a good predictor that the critical section that runs under lock L will access much of the same data as recent previous activations of critical sections that ran under lock L.

Broadly, reader-writer locks may be thought of in terms of a packing problem in which time passing is indicated on the X-axis and critical section occupation by process (e.g., CPU) count is indicated on the y-axis. For a given reader-writer lock, for any given point or time interval, a goal may be to maximize the number of active reader threads. In this example, the area under the curve may reflect the throughput of the system. A goal may be to maximize throughput, while taking into account some constraints on fairness. Note that maximizing throughput may be thought of as equivalent to minimizing execution time. For example, if there is a backlog of pending read and write requests, a goal may be for the lock algorithm to schedule operations so that the backlog, plus any new requests that arrive, will be completed as soon as possible. In some embodiments, this may be achieved by "packing" reader threads so that multiple reader threads can run at the same time.

Since a lock manages short-term scheduling, the lock's latitude to reorder threads (i.e. its temporal elasticity) may be leveraged to manage the trade-off between fairness and packing density. In the discussions that follow, "fairness" may be thought of as the difference between arrival order and admission (entry) order over some interval. For example, may represent a measure of how far a lock deviates from strict FIFO ordering. As described above, cohort locks may determine when a thread runs based on both the arrival time of the thread relative to other threads (e.g., its age), and the NUMA origin of the invoking thread. In some embodiments, a cohort reader-writer lock may also take in account the type of operation (e.g., whether the thread intends to perform a read operation or a write operation) when determining when to allow admission relative to other requests. In other words, the scheduling criteria used by a cohort reader-writer lock may in some embodiments include relative age, NUMA origin, and/or operation type. In general, a reader-writer cohort lock may attempt to reduce lock migration (as with other types of cohort locks), but in addition, it may also attempt to increase parallelism between reader threads.

In the descriptions that follow, an "R-group" may be defined as a set of active reader threads that execute concurrently. More precisely, an R-group may be defined as the transitive closure of a set of active reader threads that overlap in time. Increasing parallelism between reader threads (sometimes referred to herein as "reader-reader parallelism", or simply "R-R parallelism") may be equivalent to increasing R-group sizes. A write-after-read (WAR) event occurs when an R-group finishes (i.e. when all of the reader threads in the R-group complete execution) and a writer thread executes. Note that each WAR event corresponds to an adjoining read-after-write (RAW) event. However, without loss of generality, the discussions that follow are restricted to the consideration of RAW events. High RAW rates may tend to decrease R-group sizes and limit R-R parallelism, since RAW alternation can disrupt strings of pending reader threads that could potentially run concurrently. Therefore, in some embodiments, for better performance, the rates of read-to-write and write-to-read alternation should be reduced. For the purposes of the discussions below, the following may be considered to be equivalent (i.e. to be equally beneficial to performance): increasing the size of an R-group, increasing R-R parallelism, and decreasing the read-after-write RAW alternation rate.

In some embodiments, a reader-writer lock implementation may incorporate policies that promote or otherwise encourage large R-group formation. For example, one tactic employed by these locks may be to allow a bounded number of reader threads to bypass or overtake writer threads that are blocked by an active R-group. In such embodiments, a newly arriving reader thread may be allowed to "jump over" the pending writer threads and join an active R-group. For example, if the arrival order at a RW lock is as follows: Reader1, Writer1, Reader2, Writer2, Reader3, Writer3, Reader4, Writer4, Reader5, Writer5. In this example, the reader-writer lock may opt to reorder or reschedule the admission order as follows: Writer1, Writer2, Writer3, Writer4, Writer 5, (Reader1, Reader2, Reader3, Reader4, Reader5), and the ReaderX read operations may be able to run concurrently. As illustrated in this example, in some embodiments, a reader-writer lock may intentionally introduce and leverage unfairness in order to improve aggregate throughput.

As noted above, in some embodiments, a hierarchical approach may be taken toward the construction of NUMA-aware reader-writer locks. These NUMA-aware reader-writer locks (sometimes referred to herein as NUMA-RW locks) may contain two levels of structures. The top (globally accessible) level may be implemented as a reader-writer lock. In different embodiments, this may be any existing type of reader-writer lock that has been augmented to include the property of "thread obliviousness", as described above. For example, one thread may be able acquire the top-level lock in a read-only mode or in a write mode, and another thread may be able to release it. In some embodiments, the lower level structure may be a per NUMA node structure (e.g., a node-level or cluster-specific structure or lock). To acquire a NUMA-RW lock, a thread must first manipulate its local structure (e.g., its node-level or cluster-specific structure) to get permission to try to acquire the top-level reader-writer lock.

Figure 9:
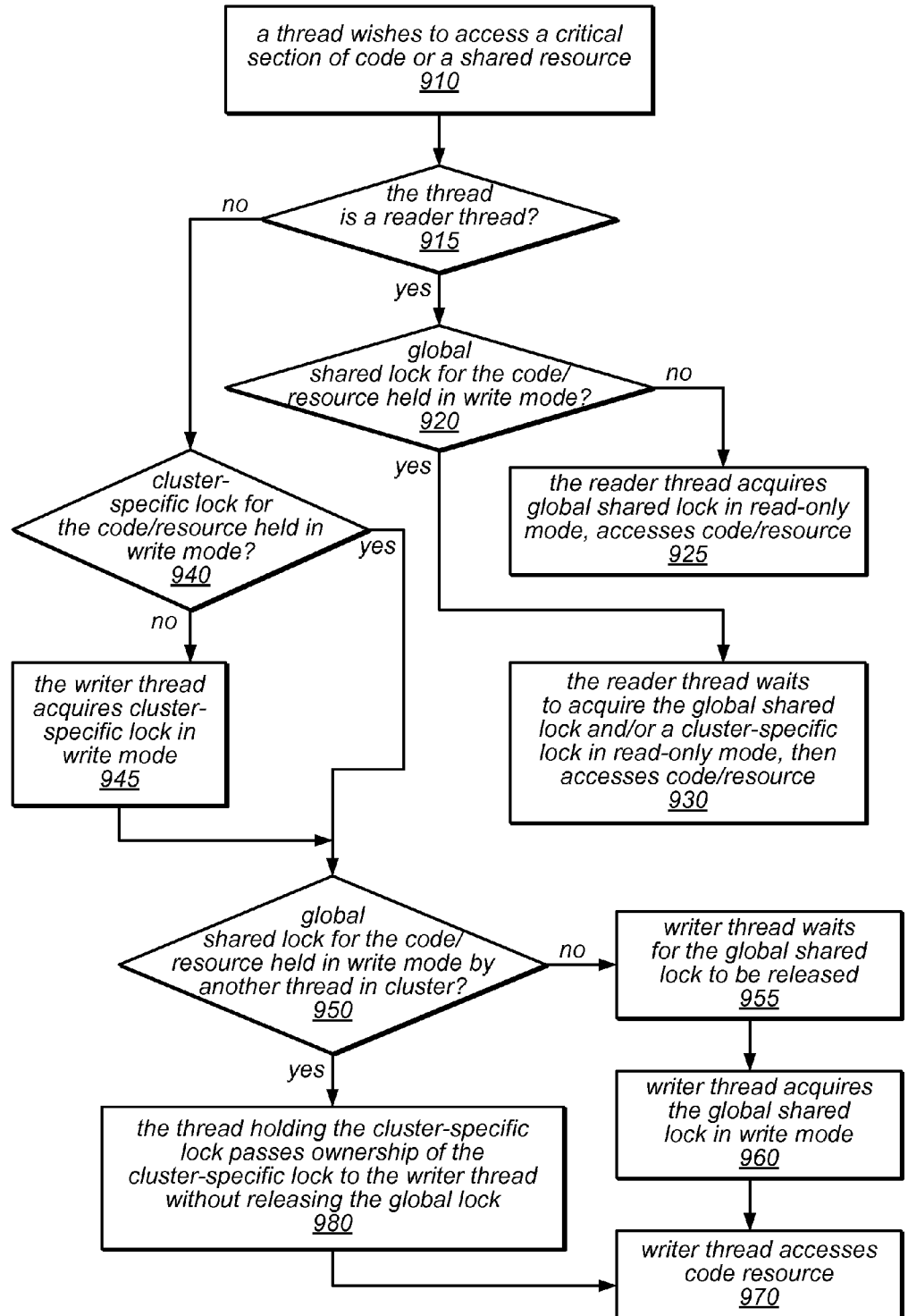
FIG. 9 is a flow diagram illustrating one embodiment of a method for implementing a NUMA-aware reader-writer lock.

One embodiment of a method for implementing a NUMA-aware reader-writer lock is illustrated by the flow diagram in FIG. 9. As illustrated in this example, a thread may wish to access a critical section of code or a shared resource that is protected by a NUMA-aware reader-writer lock (as in 910). If the thread is a reader thread (shown as the positive exit from 915), and if the global shared lock for the critical section of code or shared resource is not held in write mode (shown as the negative exit from 920), the global shared lock may be held in read-only mode or may not be held at all, and the method may include the reader thread acquiring the global shared lock in read-only mode, and accessing the critical section of code or shared resource, as in 925. If the thread is a reader thread (shown as the positive exit from 915), and if the global shared lock for the critical section of code or shared resource is held in write mode (shown as the positive exit from 920), the method may include the reader thread waiting to acquire the global shared lock and/or a cluster-specific lock for the critical section of code or shared resource in read-only mode, and then accessing the critical section of code or shared resource, as in 930.

If the thread is not a reader thread (shown as the negative exit from 915), and if the cluster-specific lock for the critical section of code or shared resource is not held in write mode (shown as the negative exit from 940), the method may include the writer thread acquiring the cluster-specific lock in write mode, as in 945. If the thread is not a reader thread (shown as the negative exit from 915), and if the cluster-specific lock for the critical section of code or shared resource is held in write mode (shown as the positive exit from 940 or the exit from 945), and if the global shared lock for the critical section of code or shared resource is held in write mode by another thread in cluster (shown as the positive exit from 950), the method may include the thread that holds the cluster-specific lock passing ownership of the cluster-specific lock to the writer thread without releasing the global lock (as in 980). The writer thread may then access the critical section of code or shared resource, as in 970.

If the writer thread holds the cluster-specific lock (shown as the positive exit from 940 or the exit from 945), but the global shared lock for the critical section of code or shared resource is not held in write mode by another thread in the cluster (shown as the negative exit from 950), the global shared lock may be held in write mode by a thread executing on another cluster, or may be held in read-only mode, and the method may include the writer thread waiting for the global shared lock to be released, as in 955. The writer thread may then acquire the global shared lock in write mode (as in 960) and may access the critical section of code or shared resource (as in 970). Note that if the global shared lock is not held at all, the writer thread may not have to wait for the global shared lock to be released before acquiring the global shared lock in write mode.

Note that in some embodiments, the lower level structure (e.g. the node-level or cluster-specific structure) may also be implemented as a reader-writer lock. In such embodiments, each thread may first have to acquire its lower level reader-writer lock, and then attempt to acquire the top-level reader-writer lock. If the thread is a reader, it may acquire the lower level reader-writer lock along with other local reader threads, and then one or more of these reader threads may attempt to acquire the top-level reader-writer lock in read-only mode. In some embodiments, in order to minimize global traffic on the interconnect due to accesses to the top-level reader-writer lock, the number of reader threads in a given NUMA node that attempt to acquire the top-level lock may be minimized. In some embodiments, this may be achieved using existing reader-writer locks by only allowing the first reader the right to attempt to acquire the top-level lock. (e.g., on behalf of all of the local reader threads). Once this reader has acquired the top-level lock (in read-only mode), it may inform all other local waiting reader threads that the lock has been acquired in read-only mode. In some embodiments, this may be done using a local "readers-go-ahead" flag, which may initialized to false, and may be set to true by the first reader when it acquires the top-level lock. After all the local reader threads are finished executing their critical sections of code, the last reader that releases the local reader-writer lock may also reset the local readers-go-ahead flag, and then may release the top-level lock (in that order). In this example, all but one of the reader threads may implicitly acquire the top-level lock by acquiring the lower level lock. In some embodiments, this approach may significantly reduce contention on the top-level lock.

In some cases, the approach described above may result in a race between the last reader thread and any incoming new reader threads. Therefore, in some embodiments (to avoid such races), the last reader thread may enable a barrier that prevents any new reader threads from acquiring the local reader-writer lock, reset the readers-go-ahead flag, release the top-level lock, release the local reader-writer lock, and finally release the barrier (in that order).

Figure 10:
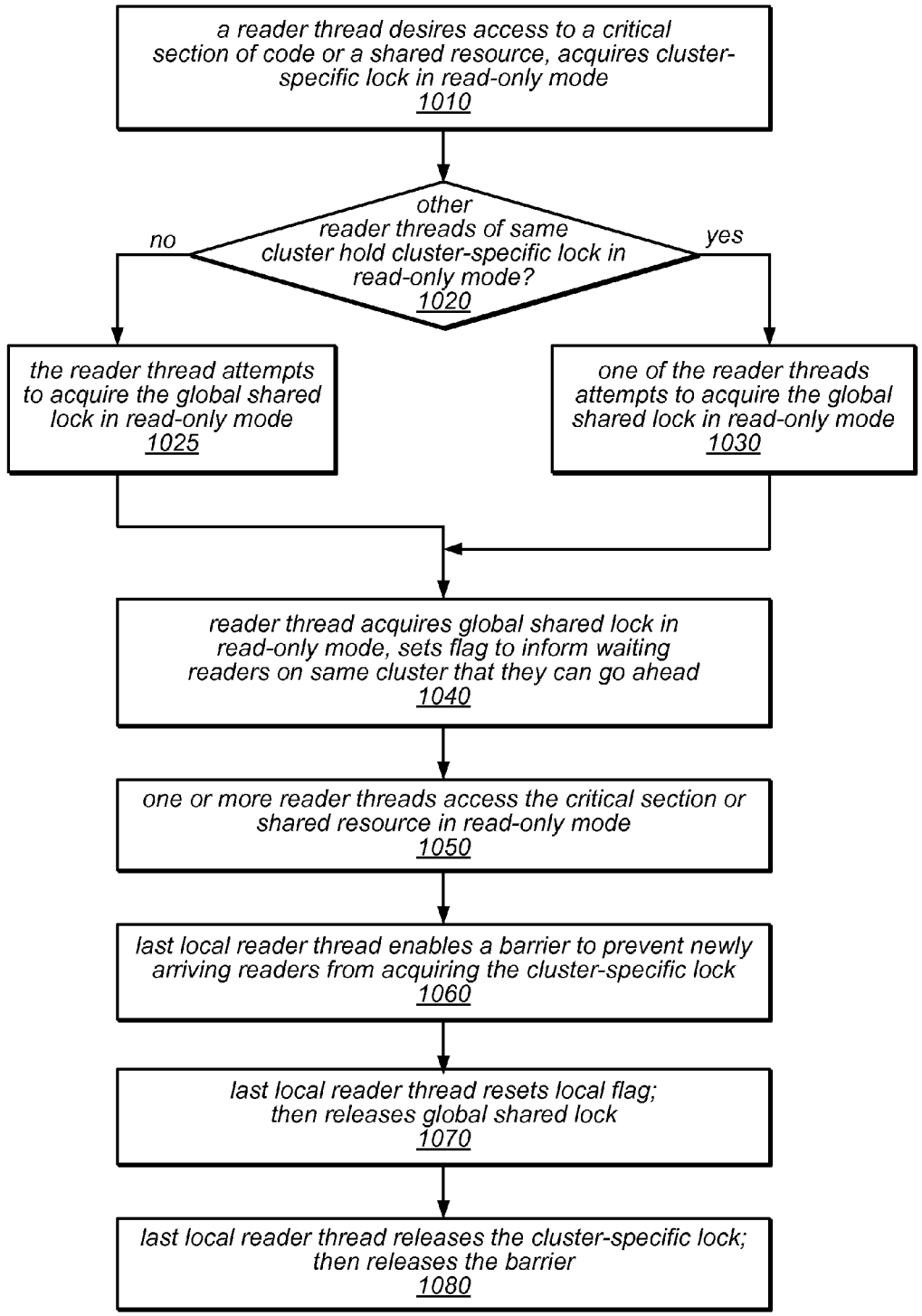
FIG. 10 is a flow diagram illustrating one embodiment of a method for a reader thread to access a critical section of code or shared resource protected by a NUMA-aware reader-writer lock.

One embodiment of a method for a reader thread to access a critical section of code or shared resource protected by a NUMA-aware reader-writer lock is illustrated by the flow diagram in FIG. 10. As illustrated in this example, the method may include a reader thread that desires access to a critical section of code or a shared resource acquiring a cluster-specific lock associated with the critical section of code or shared resource in read-only mode (as in 1010). If there are no other reader threads executing on the same cluster that also hold the cluster-specific lock in read-only mode (shown as the negative exit from 1020), the method may include the reader thread attempting to acquire the global shared lock in read-only mode (as in 1025). In other words, in some embodiments, if the reader thread is the first reader thread in its cluster to acquire the cluster-specific lock in read-only mode, the thread may attempt to acquire the global shared lock in read-only mode. If there are other reader threads executing on the same cluster that also hold the cluster-specific lock in read-only mode (shown as the positive exit from 1020), the method may include any one of the reader threads attempting to acquire the global shared lock in read-only mode (as in 1030). For example, in some embodiments, the first reader thread to acquire the cluster-specific lock may repeatedly attempt to acquire the global shared lock on behalf of the reader threads executing on the cluster. In other embodiments, the reader threads may compete for the opportunity to attempt to acquire the global shared lock, may take turns attempting to acquire the global shared lock, or may all attempt to acquire the global shared lock. Note that attempting to acquire the global shared lock may in some embodiments include a reader thread enqueuing on the global shared lock while waiting for a writer thread to release the global shared lock.

In this example, the reader thread eventually acquires the global shared lock in read-only mode (as in 1040). For example, the reader thread may acquire the global shared lock in read-only mode while a thread of another cluster holds the global shared lock in read-only mode or the reader thread may acquire the global shared lock in read-only mode after a writer thread of the same cluster or a different cluster releases the global shared lock. Once the reader thread acquires the global shared lock in read-only mode, the method may include the reader thread setting a flag (e.g., a cluster-specific "readers-go-ahead" flag) to inform any other waiting reader threads executing on the same cluster that they can go ahead and access the critical section of code or shared resource. As illustrated in this example, one or more reader threads may then access the critical section of code or shared resource in read-only mode (as in 1050). Note that at this point, there may be other reader threads executing on other clusters that hold the global shared lock in read-only mode and/or that are also accessing the critical section of code or shared resource in read-only mode.

Once all of the reader threads executing on the cluster have exited the critical section of code or no longer require access to the shared resource, the method may include the last local reader enabling a barrier to prevent newly arriving readers from acquiring the cluster-specific lock (as in 1060). Once the barrier has been enabled, the method may include the last local reader thread resetting the local (i.e. cluster-specific) "readers-go-ahead" flag, and then releasing the global shared lock (as in 1070). Again note that there may still be other reader threads executing on other clusters that hold the global shared lock in read-only mode and/or that are accessing the critical section of code or shared resource in read-only mode. As illustrated in this example, after the last local reader thread resets the cluster-specific "readers-go-ahead" flag and releases the global shared lock, it may release the cluster-specific lock, and then release the barrier (as in 1080). Again note that there may still be other reader threads executing on other clusters that hold the global shared lock in read-only mode and/or that are accessing the critical section of code or shared resource in read-only mode.

Note that if a thread acquiring a lower level lock is a writer thread, it may attempt to acquire the top-level lock in write mode. As previously noted, in order to enhance locality of reference for writer threads, the lock cohorting technique described above may be applied to the top-level reader-writer lock, in some embodiments. For example, in some embodiments, writer thread, while releasing the lock, may hand it off preferentially to the next writer (if there is one) that is waiting on the same NUMA node (i.e. within the same cohort). This local lock handoff may improve the locality of reference for the writer threads, and thus has the potential to significantly improve the scalability of NUMA-RW locks, as compared to existing reader-writer locks. In some embodiments, if the next locally waiting thread is a reader thread, the writer thread may release the top-level reader-writer lock and the lower level lock (in that order).

Figure 11:
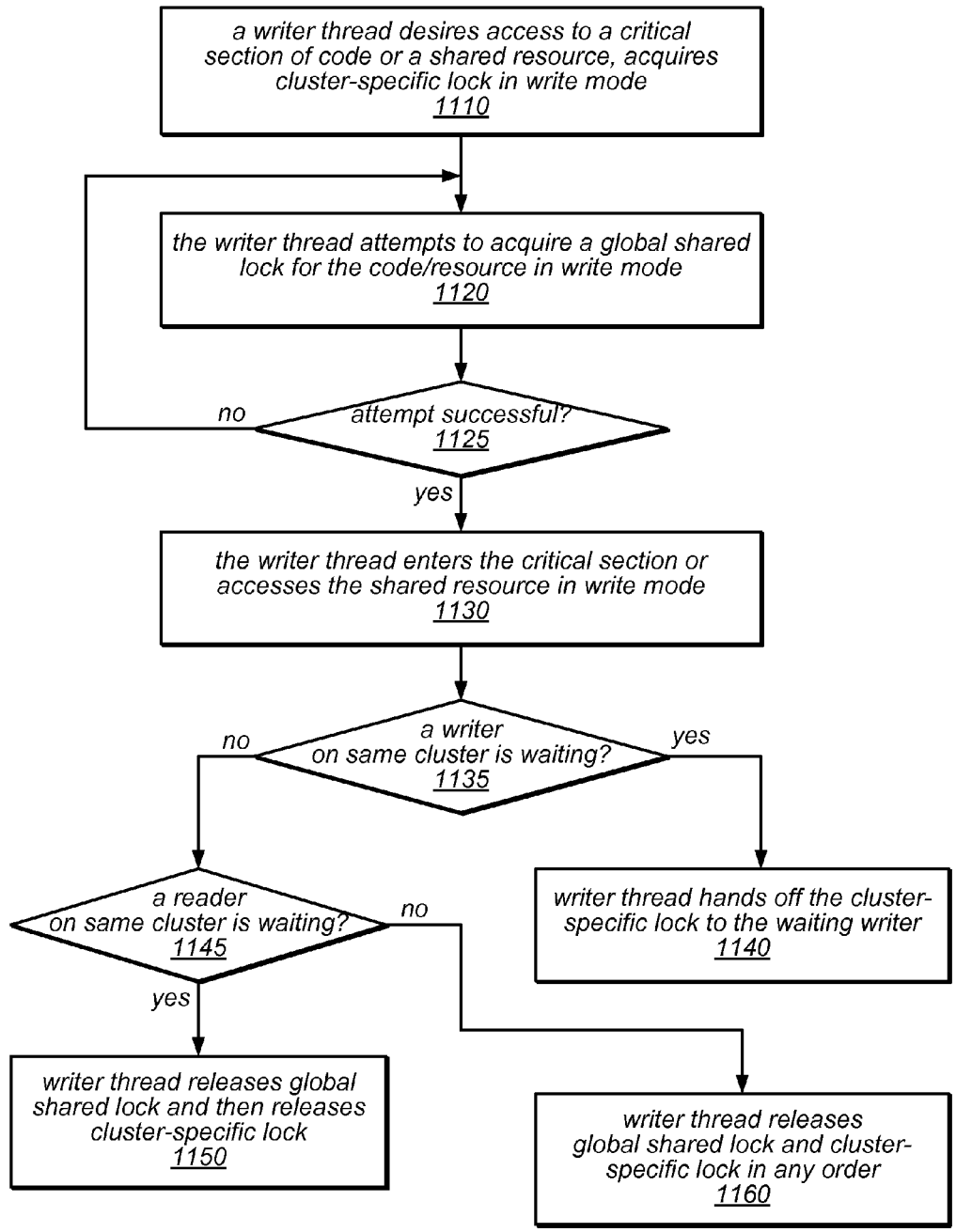
FIG. 11 is a flow diagram illustrating one embodiment of a method for a writer thread to access a critical section of code or shared resource protected by a NUMA-aware reader-writer lock.

One embodiment of a method for a writer thread to access a critical section of code or shared resource protected by a NUMA-aware reader-writer lock is illustrated by the flow diagram in FIG. 11. As illustrated in this example, the method may include a writer thread that desires access to a critical section of code or a shared resource acquiring a cluster-specific lock associated with the critical section of code or shared resource in write mode (as in 1110). The method may also include the writer thread attempting to acquire a global shared lock for the critical section of code or shared resource in write mode (as in 1120). If the attempt to acquire the global shared lock is not successful (shown as the negative exit from 1125), the global shared lock may be owned by one or more other threads executing on another cluster in read-only mode or in write mode, and the method may include the writer thread repeating its attempt to acquire the global shared lock until it is successful (shown as the feedback from the negative exit of 1125 to 1120). For example, in various embodiments the writer thread may spin on the global lock, with or without a backoff, or enqueue on the global shared lock until the global shared lock is released by its previous owner(s) and the writer thread is able to acquire it in write mode.

Once the writer thread acquires the global shared lock, it may enter the critical section of code or access the shared resource in write mode (as in 1130). Thereafter (e.g., after the writer thread exits the critical section of code or no longer requires access to the shared resource in write mode), if another writer thread executing on the same cluster is waiting to access the critical section of code or shared resource (shown as the positive exit from 1135), the method may include the writer thread handing off the cluster-specific lock to the waiting writer thread (as in 1140). Note that in various embodiments, handing off the cluster-specific lock to the waiting writer thread may be performed using direct or indirect succession, and may involve the use of one or more lists or queues, or any of a variety of other mechanisms to pass ownership to a successive thread executing on the same node or cluster, including any of those described herein.

As illustrated in this example, if no other writer threads executing on the same cluster are waiting to access the critical section of code or shared resource in write mode (shown as the negative exit from 1135), but a reader thread executing on the same cluster is waiting to access the critical section of code or shared resource in read-only mode (shown as the positive exit from 1145), the method may include the writer thread releasing the global shared lock and then releasing the cluster-specific lock (as in 1150). In this example, if no other writer threads executing on the same cluster are waiting to access the critical section of code or shared resource in write mode (shown as the negative exit from 1135), and no reader threads executing on the same cluster are waiting to access the critical section of code or shared resource in read-only mode (shown as the negative exit from 1145), the method may include the writer thread releasing the global shared lock and the cluster-specific lock in any order (as in 1160).

In some embodiments, a different approach may be taken for implementing the structures for the lower level of a NUMA-RW lock, e.g., one that more closely adheres to the lock cohorting style described above. For example, instead of implementing the node-level or cluster-specific structure as a reader-writer lock, reader threads and writer threads may maintain disjoint structures per node (or cluster). In one such embodiment, the reader threads executing on a given node (or cluster) may maintain a reader counter, and the writer threads executing on the given node (or cluster) may maintain an MCS-style queue lock. In this example, both the reader threads and writer threads may concurrently compete to acquire the top-level lock. In some embodiments, in order to minimize the contention on the top-level lock, the number of reader threads (and writer threads) that are permitted to acquire the top-level lock may be throttled. Using this approach, the writer threads, which have an independent local structure (e.g., an MCS queue), may act in lock cohorting fashion, with the lock releaser preferentially handing off the lock to a waiting writer from the same NUMA node.

In various embodiments, two issues that may be addressed using different approaches in the above NUMA-RW lock implementations are starvation and fairness. To address starvation, several different techniques may be applied. For example, in some embodiments, the system may implement an approach in which the number of local reader threads and/or writer threads that acquired the lock are counted, and then the top-level lock is released once a threshold count value (e.g., a pre-determined count threshold for the maximum number of reader threads or writer threads) is reached, after which the counters are reset. This approach may at least eliminate starvation that may be caused by the hierarchical structure. In some embodiments, however, the ultimate starvation freedom guarantee may rest on the implementation of the top-level lock.

Figure 12:
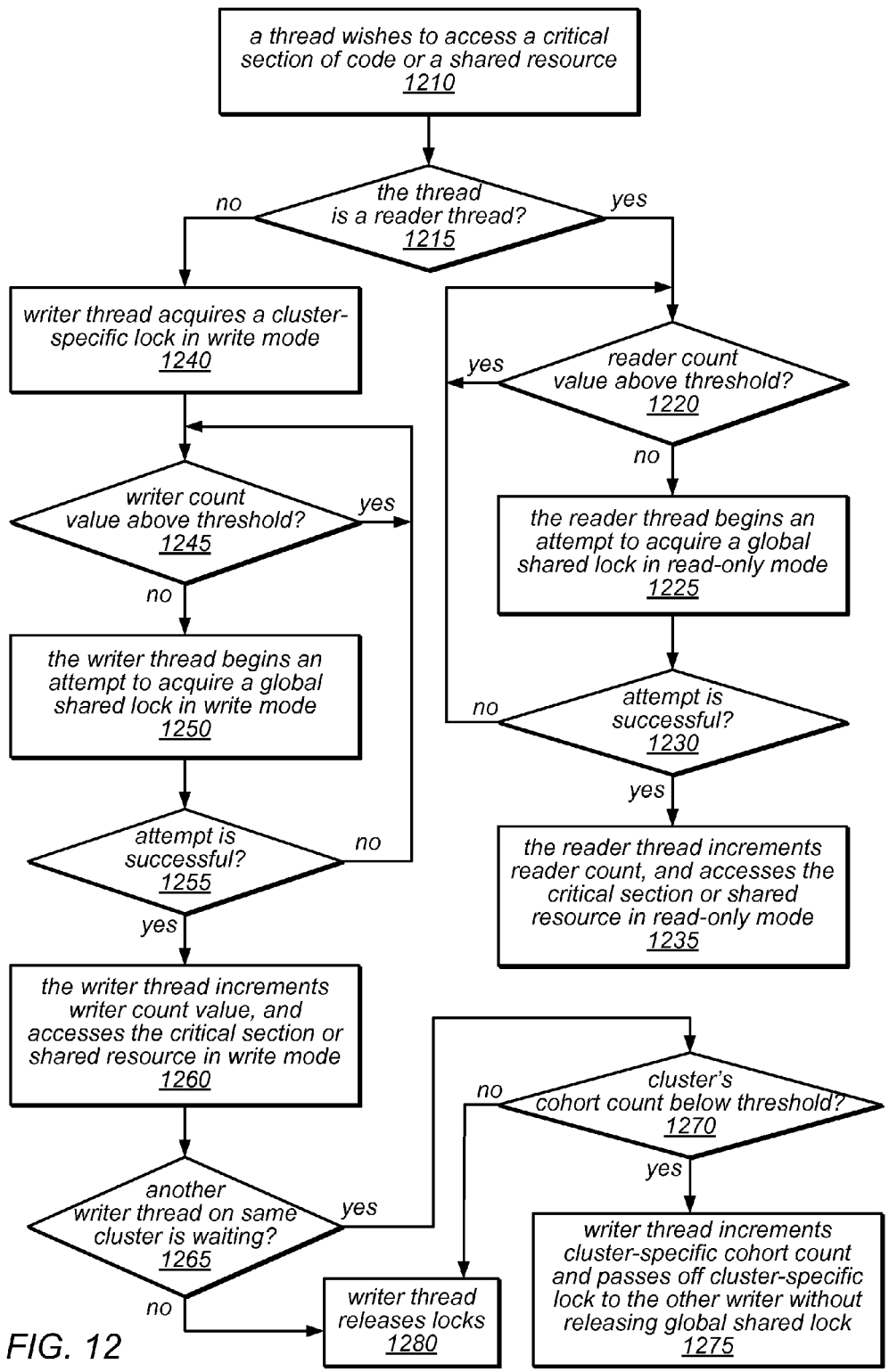
FIG. 12 is a flow diagram illustrating one embodiment of a method for managing access to a critical section of code or a shared resource using a NUMA-aware reader-writer lock that employs throttling.

One embodiment of a method for managing access to a critical section of code or a shared resource using a NUMA-aware reader-writer lock that employs throttling is illustrated by the flow diagram in FIG. 12. As illustrated in this example, a thread may wish to access a critical section of code or a shared resource that is protected by a NUMA-aware reader-writer lock (as in 1210). In this example, if the thread is a reader thread (shown as the positive exit from 1215), the method may include the reader thread attempting to acquire a global shared lock for the critical section of code or shared resource in read-only mode. Attempting to acquire the global shared lock in read-only mode may in some embodiments include determining whether a global (or cluster-specific) reader count value is above or below a pre-determined threshold value. For example, this pre-determined threshold value may be a configurable value that represents the maximum number of reader threads from any cluster (or from a particular cluster) that can acquire the global shared lock before one or more subsequent attempts by reader threads from any cluster (or from a particular cluster) to acquire the global shared lock in read-only mode are refused in order to allow one or more writer threads to attempt acquire the global shared lock in write mode.

If the reader count value is not above the pre-determined threshold value (shown as the negative exit from 1220), the reader thread may begin its attempt to acquire the global shared lock in read-only mode (as in 1225). If the attempt to acquire the global shared lock in read-only mode is successful (shown as the positive exit from 1230), the method may include the reader thread incrementing the reader count and accessing the critical section of code or shared resource in read-only mode (as in 1235). If the reader count value is above the pre-determined threshold value (shown as the positive exit from 1220) or if the attempt to acquire the global shared lock in read-only mode is unsuccessful (shown as the negative exit from 1230), the method may include the reader thread retrying its attempt to acquire the global shared lock in read-only mode one or more times (with or without a backoff) until it is successful. This is illustrated in FIG. 12 by the feedback from the positive exit of 1220 to 1220 and the feedback from the negative exit of 1230 to 1220. In either case, once the reader thread eventually succeeds in acquiring the global shared lock in read-only mode (shown as the positive exit from 1230), the method may include the reader thread incrementing the value of the reader count and accessing the critical section of code or shared resource in read-only mode (as in 1235).

As illustrated in this example, if the thread is not a reader thread (i.e. if it is a writer thread), shown as the negative exit from 1215, the method may include the writer thread acquiring the cluster-specific lock associated with the critical section of code or shared resource in write mode (as in 1240). The writer thread may then attempt to acquire the global shared lock for the critical section of code or shared resource in write mode. Attempting to acquire the global shared lock in write mode may in some embodiments include determining whether a global (or cluster-specific) writer count value is above or below a pre-determined threshold value. For example, this pre-determined threshold value may be a configurable value that represents the maximum number of writer threads on any cluster (or executing on a particular cluster) that can acquire the global shared lock in write mode before subsequent attempts to acquire the global shared lock in write mode are refused in order to allow one or more reader threads to attempt to acquire the global shared lock in read-only mode.

In the example illustrated in FIG. 12, if the global (or cluster-specific) writer count value is not above a pre-determined threshold (shown as the negative exit from 1245), the writer thread may begin its attempt to acquire the global shared lock in write mode (as in 1250). If the attempt to acquire the global shared lock is successful (shown as the positive exit from 1255), the method may include the writer thread incrementing the value of the writer count and accessing the critical section of code or shared resource in write mode (as in 1260). If the global (or cluster-specific) writer count value is above a pre-determined threshold (shown as the positive exit from 1245) or the attempt to acquire the global shared lock is unsuccessful (shown as the negative exit from 1255), the method may include the writer thread retrying its attempt to acquire the global shared lock in write mode one or more times (with or without a backoff) until it is successful. This is illustrated in FIG. 12 by the feedback from the positive exit of 1245 to 1245 and the negative exit of 1255 to 1245. In either case, once the writer thread eventually succeeds in acquiring the global shared lock in write mode (shown as the positive exit from 1255), the method may include the writer thread incrementing the value of the writer count and accessing the critical section of code or shared resource in write mode (as in 1260).

As illustrated in FIG. 12, if (at some point after the writer thread exits the critical section of code or no longer requires access to the shared resource in write mode) another writer thread executing on the same cluster is waiting to access the critical section of code or shared resource (shown as the positive exit from 1265), and if (as shown by the positive exit from 1270) a cohort count associated with the cluster is below a pre-determined threshold value (e.g., a threshold value that represents a pre-determined maximum number of successive writer threads executing on a single cluster that are allowed to hold their cluster-specific lock without releasing the global shared lock) the method may include the writer thread incrementing the cluster-specific cohort count value and passing off the cluster-specific lock to the waiting writer thread without releasing the global shared lock (as in 1275). Note that in various embodiments, handing off the cluster-specific lock to the waiting thread may be performed using direct or indirect succession, and may involve the use of one or more lists or queues, or any of a variety of other mechanisms to pass ownership to a successive thread executing on the same node or cluster, including any of those described herein. However, if (after the writer thread exits the critical section of code or no longer requires access to the shared resource in write mode) no other writer threads executing on the same cluster are waiting to access the critical section of code or shared resource (shown as the negative exit from 1265), the method may include the writer thread releasing the global shared lock and the cluster-specific lock associated with the critical section of code or shared resource (as in 1280).

Note that any of all of the operations illustrated in FIG. 12 may be repeated as necessary when and if additional threads arrive (not shown). Note also that in other embodiments, the system may be configured to throttle the total number of writer threads and/or reader threads that may acquire (or attempt to acquire) the NUMA-aware reader-writer lock. Finally, note that in various embodiments, more, fewer, or different types of counters for global or local reader threads and/or writer threads may be implemented in the system to avoid starvation and/or enforce fairness policies, depending on an expected or previously observed workload, an expected or previously observed distribution of read-only and/or write accesses, or other information.

In some cases, achieving fairness when employing NUMA-aware reader-writer locks may require additional modification of the locks. For example, once the top-level reader-writer lock is acquired in read-only mode, reader threads from all the NUMA nodes may keep arriving, even after writer threads have arrived on a single NUMA node. In some embodiments, in order to be able to guarantee fairness for writer threads, each writer thread may have to be able to immediately inform all of the NUMA nodes of its existence. In some embodiments, this may be done by adding a "writer-waiting" flag (or a group of such flags, one per NUMA node) at the top-level lock. In such embodiments, a writer thread may set this flag when it arrives. Each reader, before acquiring the local lock in read-only mode, may check this flag to determine whether there are any waiting writer threads, and may avoid acquiring the lock in cases in which there is at least one waiting writer thread. Thus, the writer thread may get an opportunity to acquire the top-level lock once the reader threads that have already acquired the lock "drain" out (e.g., once they release the local and top-level locks). The writer thread may clear the writer-waiting flag once it acquires the top-level lock. Then the reader threads may proceed in their attempts to acquire the local and top-level locks.

In some embodiments, a similar "reader-waiting" flag may be introduced into a NUMA-aware reader-writer lock in order to guarantee fairness for reader threads. Alternately, based on the application's requirements, writer threads may be allowed to be somewhat unfair to reader threads, and may use the lock cohorting strategy to release the top-level lock once in a while (to allow reader threads to proceed).

Figure 13:
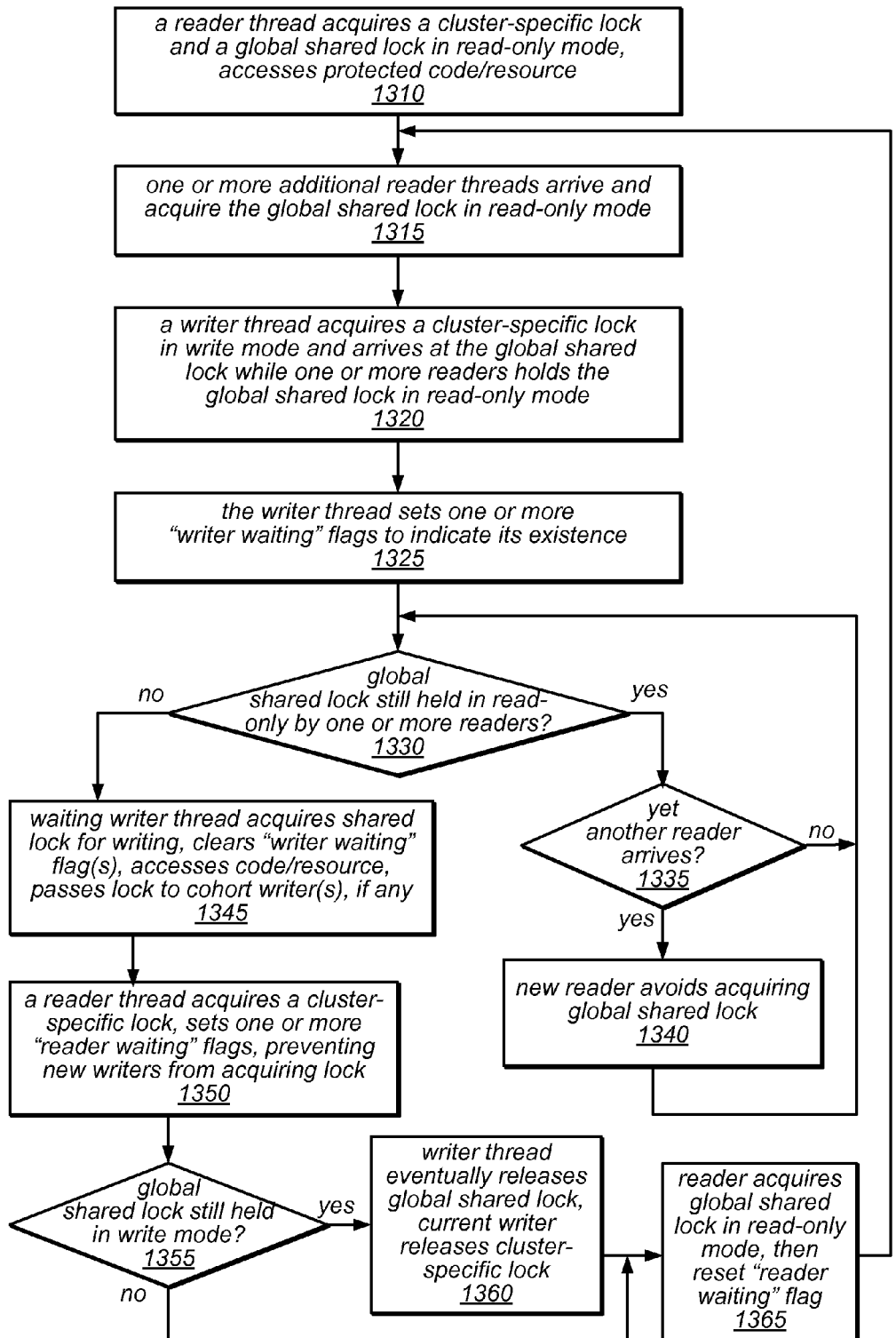
FIG. 13 is a flow diagram illustrating one embodiment of a method for managing access to a critical section of code or a shared resource using a NUMA-aware reader-writer lock that employs one or more flags.

One embodiment of a method for managing access to a critical section of code or a shared resource using a NUMA-aware reader-writer lock that employs one or more such flags is illustrated by the flow diagram in FIG. 13. As illustrated in this example, a reader thread may acquire a cluster-specific lock structure and a global shared reader-writer lock that are associated with a critical section of code or a shared resource in read-only mode, and then may access the protected code/resource in read-only mode (as in 1310). Note that, in various embodiments, acquiring a local (cluster-specific) lock structure in read-only mode may include acquiring a cluster-specific reader-writer lock in read-only mode, or may include acquiring or utilizing a cluster-specific lock or other structure for managing reader threads of the cluster that is separate from a cluster-specific lock or other structure for managing writer threads of the cluster. As illustrated in this example, the method may include one or more additional reader threads (from the same cluster or from a different cluster) arriving at the global shared lock and these additional reader threads may also acquire the global shared lock in read-only mode (as in 1315). Each of the additional reader threads may also access the code/resource in read-only mode. Subsequently, a writer thread (e.g., a writer thread from a different cluster) may acquire its cluster-specific lock structure that is associated with the critical section of code or shared resource in write mode and may arrive at the global shared lock while one or more of the reader threads still hold the global shared lock in read-only mode (as in 1320). As illustrated in this example, the writer thread may set one or more "writer waiting" flags (e.g., a global "writer waiting" flag and/or a cluster-specific "writer waiting" flag) to indicate the existence of a writer thread (i.e. a thread that wishes to acquire the global shared lock in write mode) to other threads executing in the system (as in 1325).

In this example, while the global shared lock is still held in read-only by one or more reader threads (shown as the positive exit from 1330) and the "writer waiting" flag is still set, if yet another reader arrives from the same cluster or from any other cluster (shown as the positive exit from 1335), the newly arrived reader avoids acquiring global shared lock (as in 1340). As illustrated in FIG. 13, this scenario may continue while the global shared lock remains held by at least one reader thread in read-only mode. Note that any additional writer threads that arrive at the global shared lock will not be able to acquire the global shared lock while it is held in read-only mode by one or more reader threads. A new writer thread may, however, set a cluster-specific "writer waiting" flag (if such cluster-specific flags are implemented in the system) to indicate that a writer thread from yet another cluster is also waiting to acquire the global shared lock in write mode. Once the global shared lock is no longer held by any reader threads in read-only mode (shown as the negative exit from 1330), the waiting writer thread may acquire the global shared lock in write mode, may clear the global and/or cluster-specific "writer waiting" flag(s) that were set on its behalf, and may access the critical section of code or shared resource in write mode (as in 1345). In other words, once any reader threads that were holding the global shared lock in read-only mode when the "writer waiting" flag(s) were set have drained away, the waiting writer thread may acquire the global shared lock in write mode. As illustrated in this example, after accessing the protected code/resource, the writer thread may pass ownership of the lock to a pending writer in the same cluster (i.e. in its cohort), if there are any, using any suitable direct or indirect succession mechanism, including those described herein.

As illustrated in this example, subsequent to the waiting writer thread acquiring the global shared lock, a reader thread may acquire a cluster-specific lock in read-only mode, and may set one or more "reader waiting" flags (e.g., a global "reader waiting" flag and/or a cluster-specific "reader waiting" flag) to indicate the existence of a reader thread (i.e. a thread that wishes to acquire the global shared lock in read-only mode) to other threads executing in the system (as in 1350). As illustrated in this example, setting the "reader waiting" flag may in some embodiments prevent newly arriving writers from acquiring the global shared lock in write mode. If, at this point, the global shared lock is no longer held in write mode (shown as the negative exit from 1355), or after the writer thread (and/or another writer thread to whom lock ownership was passed) releases the global shared lock and the cluster-specific lock (as in 1360), the reader thread may acquire the global shared lock in read-only mode (as in 1365), and may reset (or clear) the "reader waiting" flag(s) that were set on its behalf. Having acquired the global shared lock in read-only mode, the reader thread may then access the code/resource in read-only mode (not shown). As illustrated in FIG. 13, any or all of the operations illustrated as 1315-1365 may be repeated as more reader threads arrive and as they drain to allow writer threads to acquire the global shared lock in write mode.

Note that in various embodiments, there may be different methods for performing the polling of the "writer waiting" and/or "reader waiting" flags described above, some of which may prevent the potential loss of benefits due to maintaining locality of the global shared lock. For example, in one embodiment, the "writer waiting" and/or "reader waiting" flags described above may be polled each time another read or writer thread arrives at the global shared lock. In another embodiment, the "writer waiting" and/or "reader waiting" flags described above may only be polled after a substantial number of readers or writers have been serviced in the current read/write acquired state (i.e. in read-only mode or in write mode). In some embodiments, the number of reader threads or writer threads that are serviced before polling the "writer waiting" and/or "reader waiting" flags may be configurable by the programmer (e.g., as a default value) and/or may be configurable by the user (e.g., at run time).

In some embodiments, in addition to per NUMA node writer threads being considered as cohorts, the reader threads from a NUMA node may also be considered as cohorts. For example, reader threads of a NUMA node may "band together" to concurrently acquire the reader-writer cohort lock in read-only mode. Moreover, in some embodiments, all of the NUMA node reader cohorts may simultaneously acquire the reader-writer cohort lock in read-only mode, giving an impression of a system-wide cohort of reader threads.

Note that in the embodiments described above, reader threads may be required to explicitly or implicitly acquire the top-level lock in the reader-writer cohort lock. This may entail some extra work for reader threads to ensure that the top-level lock is acquired by at least one reader in the local reader threads' cohort in read-only mode. In other embodiments, an alternative approach may avoid reader threads "visiting" the top-level lock. Instead, reader threads may need to acquire their local lock structure in read-only mode, and the writer threads may have to do the extra work to ensure that concurrent reader threads do not exist when the writer acquires the top-level reader-writer cohort lock. In some embodiments, this may be achieved by enforcing some coordination between writers and reader threads. For example, in the embodiment described in detail above (in which reader threads increment a local reader counter, and each NUMA node contains a local writer-waiting flag), a writer thread may first need to set the writer-waiting flags of all the NUMA nodes, and then wait for the reader counter on each node to go down to 0. The reader threads, on the other hand, in their acquire operation, may first ensure that the local writer-waiting flag is not set, and may increment the lock only if the flag is clear. This approach (and its variants, some of which are described below) may reduce the amount of work done by reader threads at the cost of extra work for the writer threads.

Figure 14:
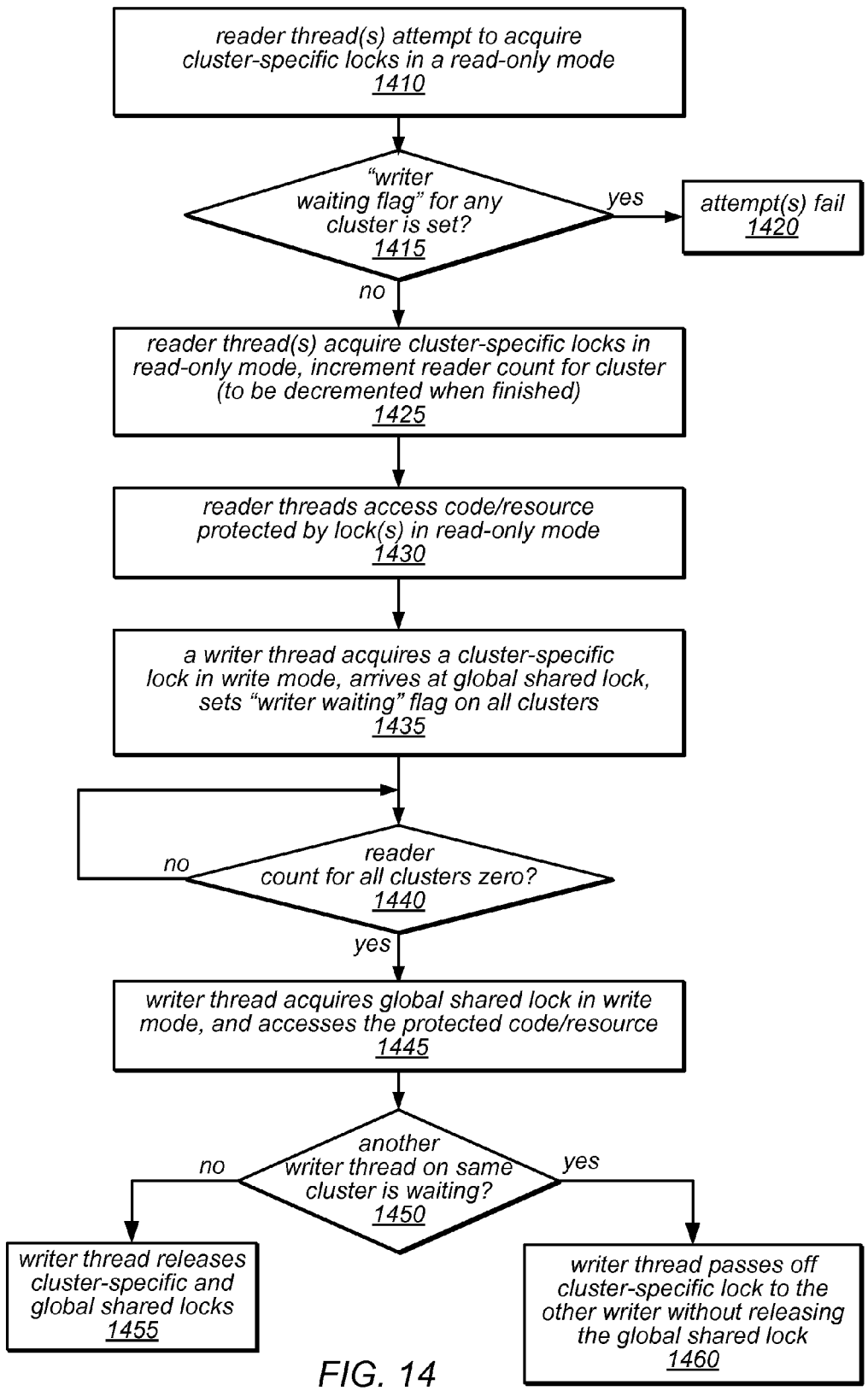
FIG. 14 is a flow diagram illustrating one embodiment of a method for managing access to a critical section of code or a shared resource using a NUMA-aware reader-writer lock in which reader threads do not need to acquire a global shared lock.

One embodiment of a method for managing access to a critical section of code or a shared resource using a NUMA-aware reader-writer lock in which reader threads do not need to acquire a global shared lock is illustrated by the flow diagram in FIG. 14. As illustrated in this example, one or more reader thread(s) may attempt to acquire cluster-specific lock structures associated with a critical section of code or a shared resource in read-only mode (as in 1410). Note that, in various embodiments, acquiring a local (cluster-specific) lock structure in read-only mode may include acquiring a cluster-specific reader-writer lock in read-only mode, or may include acquiring or utilizing a cluster-specific lock or other structure for managing reader threads of the cluster that is separate from a cluster-specific lock or other structure for managing writer threads of the cluster. If a "writer waiting" flag for any of the clusters is set (i.e. is true), shown as the positive exit from 1415, any attempt(s) to acquire the corresponding cluster-specific lock structure in read-only mode will fail, as in 1420. However, if none of the "writer waiting" flags for any of the clusters is set (i.e. if all of the "writer waiting" flags have a value of "false"), shown as the negative exit from 1415, the reader thread(s) may acquire the corresponding cluster-specific lock structures in read-only mode, and may increment a reader count for the cluster (which will be decremented when the reader thread exits the critical section of code or no longer requires access to the shared resource), as in 1425. As illustrated in this example, any reader threads that acquire the appropriate cluster-specific lock structure for the critical section of code or shared resource may access the critical section of code or shared resource that is protected by the NUMA-aware reader-writer lock (i.e. the combination of a global shared lock and one or more cluster-specific locks) in read-only mode, as in 1430.

As illustrated in this example, at some point subsequent to the reader thread(s) acquiring the cluster-specific lock structures for the critical section of code or shared resource in read-only mode, a writer thread (from any one of the clusters) may acquire its cluster-specific lock structure in write mode, may arrive at a global shared lock for the critical section of code or shared resource, and may set a cluster-specific "writer waiting" flag on all clusters (as in 1435) to indicate to other threads executing in the system that a writer thread wishes to access the critical section of code or shared resource in write mode. If the cluster-specific reader count for any of the clusters is non-zero (shown as the negative exit from 1440), the writer thread may wait for all reader threads to drain away before attempting to acquire the global shared lock in write mode. This is illustrated by the feedback from the negative exit of 1440 back to 1440. For example, the writer thread may spin on the global shared lock and/or poll the reader count (which is decremented by each of the reader threads when they no longer require access to the protected code/resource) until there are no reader threads holding any of the cluster-specific lock structures in read-only mode. As described above, in some embodiments, no newly arriving reader threads can acquire a cluster-specific lock structure in read-only mode once a writer thread has indicated that it is waiting to access the critical section of code or shared resource that is protected by the locks in write mode.

In this example, it is assumed that there is a cluster-specific reader count for each cluster. If the cluster-specific reader count for all clusters is zero (shown as the positive exit from 1440), the writer thread may acquire the global shared lock in write mode, as in 1445, and may access the code/resource protected by the lock. Subsequently (e.g., after the writer thread exits the critical section of code or no longer requires access to the shared resource in write mode), if another writer thread executing on the same cluster is waiting to access the critical section of code or shared resource (shown as the positive exit from 1450), the writer thread may pass ownership of the cluster-specific lock structure in write mode to the other writer without releasing the global shared lock (as in 1460). As in other examples described herein, passing the cluster-specific lock to the waiting writer thread may be performed using direct or indirect succession, and may involve the use of one or more lists or queues, or any of a variety of other mechanisms to pass ownership to a successive thread executing on the same node or cluster, including any of those described herein. If there are no other writer threads executing on the same cluster that are waiting to access the critical section of code or shared resource (shown as the negative exit from 1450), the writer thread may release the cluster-specific lock and the global shared lock for the critical section of code or shared resource, as in 1455. Note that any of all of the operations illustrated in FIG. 14 may be repeated as necessary when and if additional threads arrive (not shown).

Note that a variety of approaches may be taken for implementing the local structures of a NUMA-RW lock. The choice of which approach will perform better for a given multithreaded application may be dependent on various characteristics of the system and/or the application (e.g., its aggregate workload and/or the distribution of accesses by the threads to a critical section of code or shared resource protected by the lock).

As described above, one type of local structure that may be used to manage cohorts of reader threads is a counter that has been augmented with extra flags to coordinate between the reader threads and writer threads. In other embodiments, such a counter may be replaced by a pair of counters (e.g., "ingress" and "egress" counters). In such embodiments, a newly arriving reader thread may increment the ingress counter in the process of acquiring the reader-writer cohort lock, and it may increment the egress counter while releasing the reader-writer cohort lock. When the values of the two counters are equal, this may indicate that there are no reader threads executing the related critical section of code. In some embodiments, splitting a single counter into two counters may significantly reduce contention, which may improve performance.

In some embodiments, each ingress/egress pair may be sequestered on a private cache line. This sequestration may in some embodiments reduce inter-node coherence traffic and false sharing. Using a split ingress/egress counter instead of single counter word may also reduce failures of intra-node compare-and-swap type operations. In some embodiments, writer threads may acquire a top-level reader-writer lock in write mode to resolve conflicts between writer threads (sometimes referred to herein as W-W conflicts) and then may wait for the effective reader count to diminish to zero in order to resolve conflicts between writer threads and reader threads (sometimes referred to herein as W-R conflicts). In other words, after a writer thread acquires the top-level reader-writer lock in write mode it may wait for all the extant reader threads to drain away. In this example, reader threads may increment the effective reader count by increasing the ingress count associated with their current node, and then may determine whether the top-level reader-writer lock is held in write mode (i.e. whether the write mutex of the NUMA-aware reader-writer lock is held). If so, they may back off and defer to the writer threads by waiting until the top-level reader-writer lock is no longer held in write mode (i.e. for the write mutex to become unlocked), and then retrying their attempt to acquire the top-level reader-writer lock in read-only mode as necessary.

In other embodiments, a NUMA-aware reader-writer lock may employ a byte-lock array for managing reader threads of a NUMA node. In such embodiments, each reader thread may make use of a dedicated byte-wide slot in an array of reader byte-locks. The reader thread may posts its lock acquisition request by simply setting its byte in the local byte-lock array to a non-zero value. The byte-lock implementation may greatly reduce contention between concurrent reader threads, but some extra work may be required to peruse the byte-lock array during a release of the reader-writer lock in read-only mode and/or during acquisition of the reader-writer lock in write mode.

In still other embodiments, a NUMA-aware reader-writer lock may employ scalable-non-zero-indicator (SNZI) structures for managing requests from reader threads. In various embodiments, these could be implemented using a system-wide single SNZI structure, or using per-NUMA-node SNZI structures. The SNZI approach for managing reader threads may in some embodiments significantly reduce contention between reader threads from the same NUMA node. Furthermore, the SNZI based approach may be relaxed to let more than one local reader to go to the top-level lock (in some embodiments) to eliminate blocking in the SNZI operation.

In various embodiments, a NUMA-aware reader-writer lock may operate under reader-writer lock policies that favor reader threads or writer threads to varying degrees. Both strict reader-preference (RP) and strict writer-preference (WP) reader-writer lock policies may allow threads to starve in undesirable ways, particularly if there are threads dedicated to certain roles, as is often the case in modern software. For example, some threads may only update the values of variables, while others may only lookup such values. Therefore, in some systems that employ a writer-preference policy, provisions may be made such that impatient or starving reader threads could eventually make progress. In such embodiments, any of a variety of remedial actions may be taken to ensure eventual progress by reader threads, including, but not limited to, those described below.

One remedial action that may be employed to ensure the progress of reader threads in a system that operates under a writer-preference lock policy would be to force languishing reader threads to acquire the internal write lock (i.e. to acquire the top-level reader-writer lock in write mode). For example, this approach may be implemented using a C-TKT-MCS cohort lock. As described in more detail later, this type of lock, which includes a top-level ticket lock and node-level (or cluster-specific) MCS-style queue locks has some properties that are useful for implementing NUMA-aware reader-writer locks. In some embodiments, once a reader thread acquires the top-level reader-writer lock in write mode, it may increment the effective reader count, release the write lock, and then enter the critical section of code for reading. Note that in this example, reader threads may hold the write lock for an extremely short period of time. While it may seem counterintuitive for reader threads to acquire the write lock, this approach may provide a convenient way for reader threads to break into a stream of writer threads when the workload is write-heavy. In some embodiments, there may also be some coherence benefit in taking this approach, since the cohort lock sorts the reader threads by node. For example, if a chain of reader threads resides on the same node as the previous writer thread, coherence traffic may be avoided.

Figure 15:
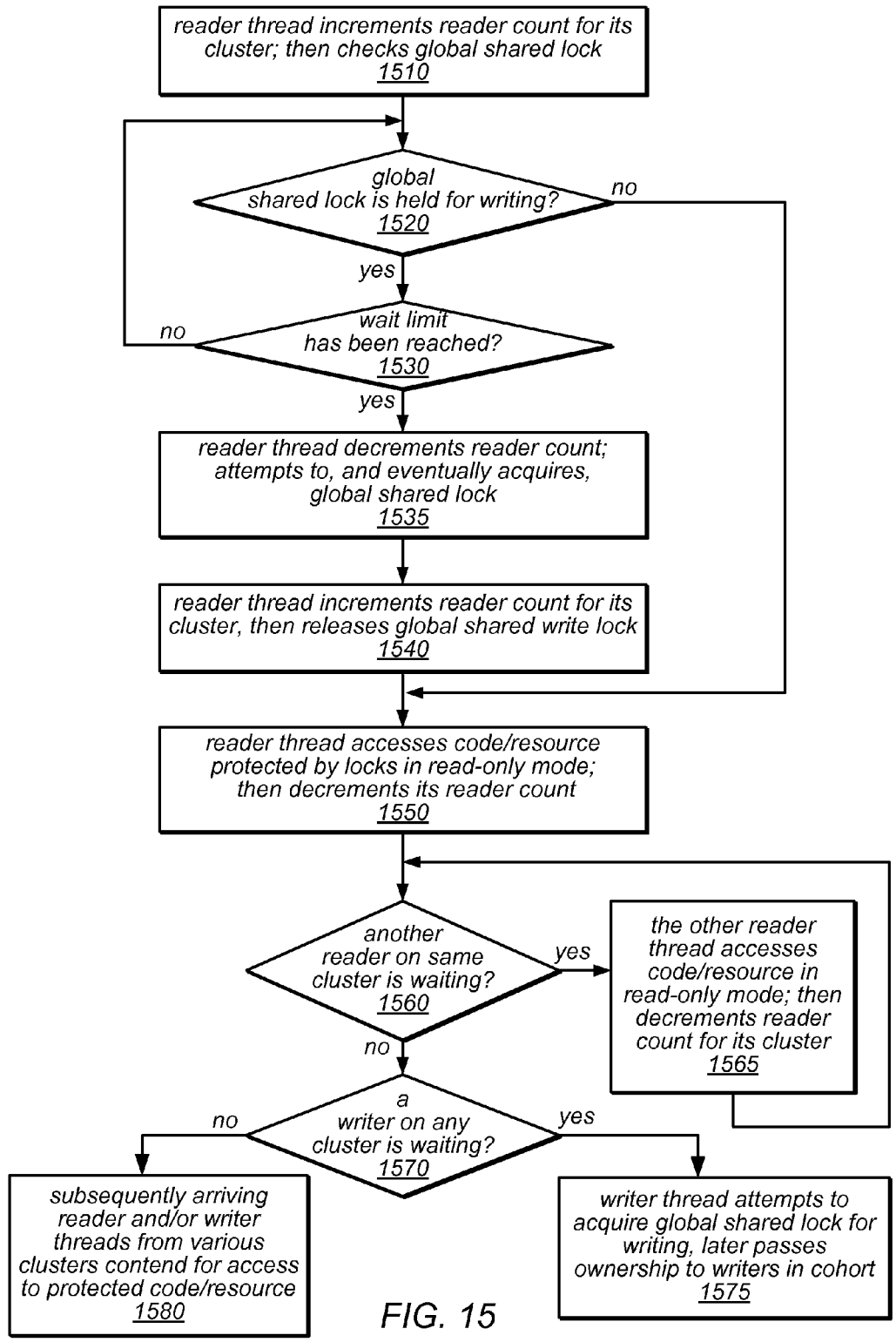
FIG. 15 is a flow diagram illustrating one embodiment of a method for reader threads to avoid languishing indefinitely under a writer-preference policy.

One embodiment of a method for reader threads to avoid languishing indefinitely under a writer-preference policy is illustrated by the flow diagram in FIG. 15. As illustrated in this example, the method may include a reader thread executing on a particular cluster that wishes to access a critical section of code or shared resource in read-only mode incrementing a reader count for its cluster, and then checking the state of a global shared lock that manages access to the code/resource for writers and/or readers (as in 1510). In some embodiments, the global shared lock may be implemented as a reader-writer cohort lock, while in other embodiments the global shared lock may be implemented as a cohort lock for managing writer threads only (e.g., as a cohort-based write mutex). If the global shared lock is not currently held for writing (shown as the negative exit from 1520), the reader thread may access the code/resource protected by the global shared lock in read-only mode, and may then decrement the reader count for its cluster (as in 1550).

On the other hand, if the global shared lock is already held for writing (shown as the positive exit from 1520), but a limit on waiting for the global shared lock to be released by a writer thread has not yet been reached (shown as the negative exit from 1530), the method may include the reader thread waiting for the global shared lock to be released by a writer thread (the current writer thread or another writer thread in the same cluster to whom the writer thread has passed ownership of the lock). This is illustrated in FIG. 15 by the feedback from the negative exit of 1530 to 1520. Note that the wait limit may, in different embodiments, be expressed in terms of the number of readers waiting, the number of writers served while readers wait, or the amount of time that a reader waits for the global shared lock to be released by a writer thread that holds the global shared lock in write mode. In various embodiments, the wait limit may be configurable by the programmer (e.g., as a default value) and/or may be configurable by the user (e.g., at run time).

Once the wait limit has been reached (shown as the positive exit from 1530), the reader thread may decrement the reader count, and may attempt to, and eventually acquire, the global shared lock in write mode (as in 1535). In other words, the reader thread may give up waiting for the global shared lock to be free, instead contending with one or more other writer threads to acquire the global shared lock (as if it were a writer), and may eventually be successful. Note that in this example, it is assumed that a thread ownership of the global shared lock can be passed from one writer thread to another writer thread in the same cluster. In some embodiments, a writer thread may need to acquire the global shared lock and then determine that none of the reader counts are non-zero before it can access the critical section of code or shared resource. As illustrated in this example, in some embodiments, a reader thread may need to acquire the global shared lock in write mode (or at least ascertain that the global shared lock is not already held in write mode) before it can access the critical section of code or shared resource (in read-only mode).

Once the reader thread acquires the global shared lock (as in 1535), the reader thread may increment the reader count for its cluster, and then may release the global shared write lock (as in 1540). At this point, i.e. after the reader thread increments the appropriate reader count, the reader thread may access the critical section of code or shared resource protected by the global shared lock in read-only mode, and then decrement the reader count (as in 1550).

As illustrated in this example, if one or more other reader threads (executing on the same cluster) are waiting to access the critical section of code or shared resource, i.e. if the reader count for the cluster is non-zero (shown as the positive exit from 1560 and the feedback from 1565 to 1560), the method may include the other reader thread(s) accessing the critical section of code or shared resource in read-only mode, and then decrementing the reader count for the cluster (as in 1565). Note that the reader thread, any of the one or more reader threads in the same cluster that were waiting (if there were any) may execute concurrently (e.g., in parallel on different processor core of the same cluster), and may access the protected code/resource in read-only mode. In addition, one or more reader threads in other clusters may also execute concurrently, and may access the protected code/resource in read-only mode (not shown).

As illustrated in FIG. 15, once the reader thread and the one or more other waiting reader threads of the same cluster (if there were any) no longer require access to the critical section of code or shared resource (shown as the negative exit from 1560), if there is a writer thread executing on the same cluster that is waiting to access the critical section of code or shared resource (shown as the positive exit from 1570), the writer thread may attempt to acquire the global shared lock in write mode (as in 1575). If successful, the writer thread may have to wait for any reader threads from other clusters to drain away before accessing the protected code/resource in write mode (not shown). If there are no writer threads executing on the same cluster that are waiting to access the critical section of code or shared resource (shown as the negative exit from 1570), any subsequently arriving reader threads and/or writer threads may contend for the global shared lock that protects the critical section of code or shared resource (as in 1580).

Note that in some embodiments, a lemming or cascade effect may be observed when using the approach described above. For example, once reader threads begin acquiring and passing through the write lock, there may be positive feedback encouraging the system to remain in this mode. However, since the cohort write lock is efficient and the critical section used by reader threads is extremely short, the system may in many embodiments exhibit good throughput even if reader threads occasionally acquire the write lock. In some embodiments, the decision to become "impatient" (i.e. the decision by one or more reader threads to attempt to acquire the reader-writer lock in write mode) may be collective (e.g., voted upon) by all blocked reader threads, while in other embodiments, this may be a reader-local decision. The latter approach may incur less administrative overhead and may generate less metadata coherence traffic.

In some embodiments, another remedial action that may be employed to ensure the progress of reader threads in a system that operates under a writer-preference lock policy would be to implement an explicit reader-writer lock mode flag whose value can be either READ or WRITE. In such embodiments, by convention, a thread may change the mode flag only when that thread holds the internal write lock. For example a writer thread may acquire the write lock and check the value of the reader-writer lock mode flag. If the value of the flag is already WRITE, then the writer thread may skip the check for extant reader threads. The writer thread may then execute the critical section of code, after which it may release the write lock. A reader thread may first check the value of the reader-writer lock mode flag. If the value of the flag is set to READ, the reader thread may optimistically increment the effective reader count, validate that the value of the flag remains READ, enter and run the critical section of code (for reading), and then decrement the effective reader count. If the value of the mode flag happened to be WRITE, the reader thread may acquire the write lock, change the value of the mode flag to READ, increment the effective reader count, release the write lock, and then enter the reader critical section of code. Finally, the reader may decrement the effective reader count. In this example, the first reader thread after a write must acquire the write lock in order to change the value of the mode flag from READ to WRITE. This approach may in some ways be considered a variation on the previously described approach for ensuring the progress of reader threads under a writer-preference policy.

Yet another remedial action that may be employed to ensure the progress of reader threads in a system that operates under a writer-preference lock policy, in some embodiments, would be for languishing reader threads to erect a barrier that stalls new incoming writer threads before those writer threads attempt to acquire the write lock. In such embodiments, the stream of writer threads passing through the write lock will eventually dry up, after which the reader threads can make progress.

Figure 16:
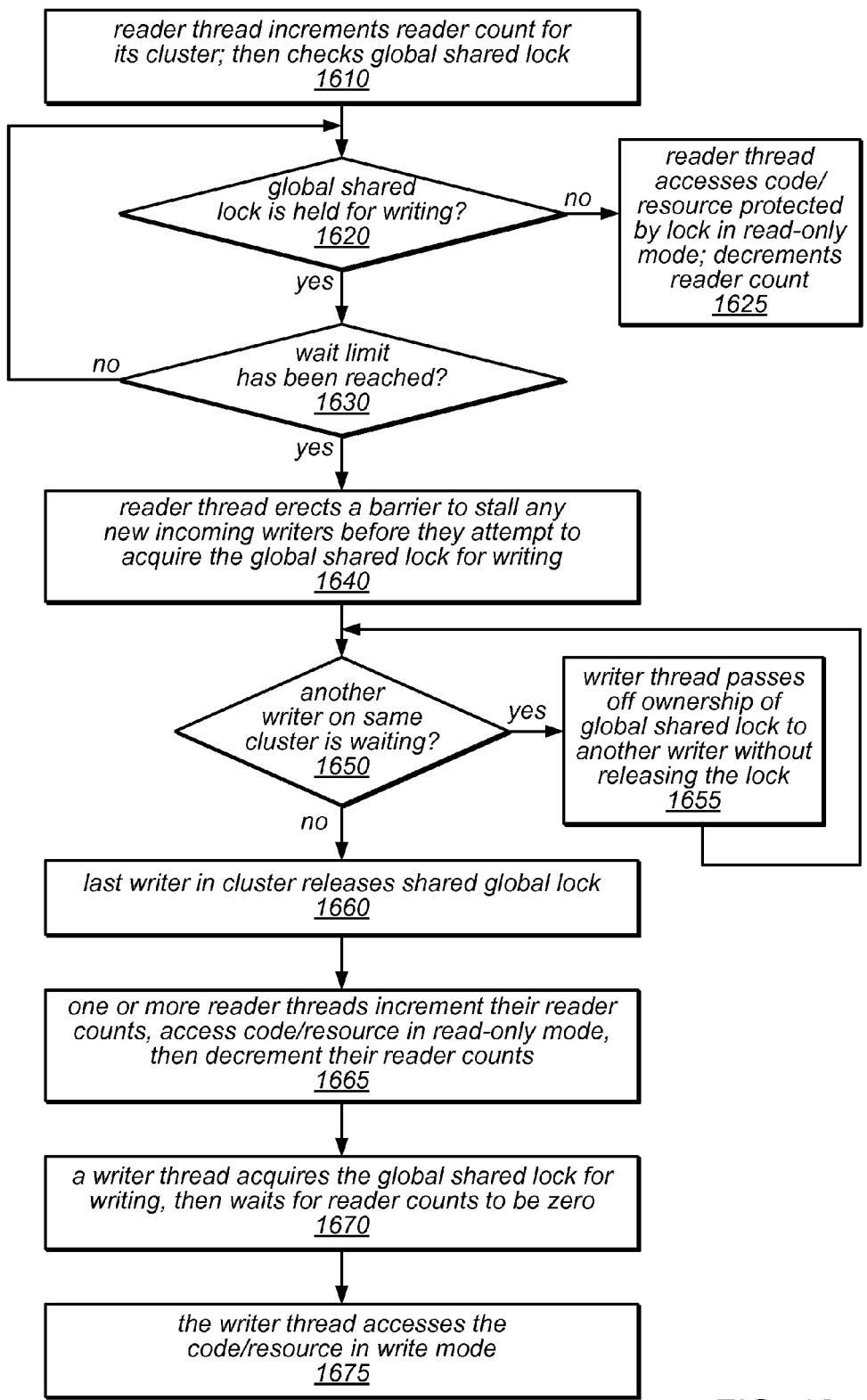
FIG. 16 is a flow diagram illustrating another embodiment of a method for reader threads to avoid languishing indefinitely under a writer-preference policy.

This other embodiment of a method for reader threads to avoid languishing indefinitely under a writer-preference policy is illustrated by the flow diagram in FIG. 16. As illustrated in this example, the method may include a reader thread executing on a particular cluster that wishes to access a critical section of code or shared resource in read-only mode incrementing a reader count for its cluster, and then checking the state of a global shared lock that manages access to the code/resource for writers and/or readers (as in 1610). In some embodiments, the global shared lock may be implemented as a reader-writer cohort lock, while in other embodiments the global shared lock may be implemented as a cohort lock for managing writer threads only (e.g., as a cohort-based write mutex). If the global shared lock is not currently held for writing (shown as the negative exit from 1620), the reader thread may access the critical section of code or shared resource protected by the lock in read-only mode, then may decrement the reader count for its cluster (as in 1625).

If, on the other hand, the cluster-specific lock is already held for writing (shown as the positive exit from 1620), but a limit on waiting for the global shared lock to be released by a writer thread has not yet been reached (shown as the negative exit from 1630), the method may include the reader thread (and one or more subsequently arriving reader threads, if there are any) waiting for the global shared lock to be released by a writer thread (the current writer thread or another writer thread in the same cluster to whom the writer thread has passed ownership of the lock). This is illustrated in FIG. 16 by the feedback from the negative exit of 1630 to 1620. Note that the wait limit may, in different embodiments, be expressed in terms of the maximum number of reader threads that are allowed to wait on writer threads before making progress, the number of writers served while readers wait, or the amount of time that a reader waits for the global shared lock to be released by a writer thread that holds the global shared lock in write mode. In various embodiments, the wait limit may be configurable by the programmer (e.g., as a default value) and/or may be configurable by the user (e.g., at run time).

As illustrated in this example, if (or once) the wait limit has been reached (shown as the positive exit from 1630), the method may include the reader thread erecting a barrier to stall incoming writer threads before they attempt to acquire the global shared lock in write mode (as in 1640). Subsequently, while any other previously pending writer threads on same cluster are waiting (shown as the positive exit from 1650), the writer thread may pass off ownership of the global shared lock to the other writer thread(s) without releasing the global shared lock (as in 1655). If there are no other pending writer threads (or once any pending writer threads have been cleared out), the pending reader threads may be able to make progress. This is illustrated in FIG. 16 following the negative exit from 1650. As illustrated in this example, once there are no more previously pending writer threads, the last writer thread in the cluster may release the shared global lock that was held in write mode (as in 1660). Subsequently, one or more pending reader threads may increment the reader count for their cluster, may access the critical section of code or shared resource in read-only mode, and then may decrement their reader counts (as in 1665).

In this example, at some point, another writer thread (executing on the same cluster or another cluster) that desires access to the critical section of code or shared resource may acquire the global shared lock for writing (as in 1670), and may wait for the reader counts for all clusters to be zero (i.e. for all pending reader threads to be drained away). The writer thread may then access the critical section of code or shared resource (as in 1675).

Note that all of the approaches described above may be effective in ensuring that reader threads make progress under a writer-preference policy, in different embodiments, under a variety of workloads and for applications that exhibit a variety of distributions of reader threads and writer threads originating on different nodes (or clusters). Each of these approaches may effectively allow the lock to transiently toggle from operating under a writer-preference policy to either a reader-preference policy or a "cohort-order" policy, where "cohort-order" is the order imposed by the cohort-based write mutex. In other embodiments, a hybrid approach may also be effective. For example, a hybrid approach that employs a combination of the techniques illustrated in FIGS. 15 and 16 may work well in many systems, although the system may suffer some latency in this variation as the fast paths become more cluttered. In such embodiments, reader threads may be thought of as having a fast path in which they can increment the effective reader count, validate there are no writer threads, and gain read permission. The fast path may experience low latency and may not touch much metadata, but under this approach, writer threads may be able to hold off reader threads to an extreme degree. In some embodiments, to compensate for this possibility, starving reader threads may elect to take a slow path that involves either acquiring the write lock or throttling the flow of arriving writer threads (as described above). This approach may be thought of as one in which there is a writer-preference policy, but the policy may vary or be transiently changed to a reader-preference policy when reader threads are starving. In fact, in some embodiments, simply alternating between a reader-preference policy and a writer-preference policy may provide a good balance between performance and fairness, but this approach may require additional administrative overhead.

As noted above, a C-TKT-MCS lock may have properties that make it a good choice for use in moderating write access in a reader-writer lock implementation, in some embodiments. For example, it may provide cohort lock benefits for chains of writer threads. In addition, if there happens to be a stream of pending writer threads, the lock may be held continuously until all of those writer threads vacate. Ignoring reader starvation, this may be generally good for performance, as reader threads interrupting strings of writer threads may decrease the level of potential parallelism between reader threads. In some embodiments, it may be beneficial to complete execution of the writer threads as quickly as possible (while letting pending reader threads accumulate), and then ultimately executing the reader threads in parallel (with more reader threads in the R-group than if some were executed in between writer threads). In some embodiments, a C-TKT-MCS lock may enable an optimization whereby only the first writer in a string of writer threads needs to check for the existence of reader threads, and potentially wait for such reader threads to drain away. Subsequent writer threads in the same unbroken string of writer threads may then skip the check for reader threads. In some embodiments, this may be accomplished by modifying the C-TKT-MCS acquire( ) operator to return a Boolean indicating whether the thread acquired the lock via hand-off or "actively" acquired the lock. In the former case, there may be no need to check for reader threads after having acquired the lock, since it is known that another writer in the string of writers (e.g., the first writer) has already taken care of resolving any conflicts between writer threads and reader threads (i.e. any W-R conflicts). In such embodiments, this information may be provided essentially free by virtue of the lock design.

In some embodiments, if reader progress is ensured by having starving reader threads acquire the write lock, the decision about whether to skip the check for reader threads may be augmented to use a per-lock flag to indicate whether the prior holder of the write lock was a reader thread or a writer thread. Note that, not surprisingly, using a cohort lock to control write permission may confers all of the benefits of a cohort NUMA lock when the write rate is relatively high.

In some embodiments, the reader-writer lock may be augmented with the following optimization that may make it more reader-friendly and which may improve R-group formation. In this example, in the write path, but before a writer thread acquires the write lock, a brief bounded spin may be inserted while there are local reader threads executing on the node (or cluster) on which the writer thread is running This may allow new incoming reader threads to bypass (or jump over) the pending writer thread and join an extant R-group (e.g., allowing bounded local bypass). For example, in one embodiment, the C-TKT-MCS lock may be configured to have a fairness bound of 100 local handoffs, after which a writer thread must be allowed to acquire the reader-writer lock in write mode. In some embodiments, this approach (which may result in a modest performance benefit) may be a strictly local decision. In other embodiments, this idea may be extended such that writer threads check for reader threads on any (all) nodes. However, this may cause coherence cross-node NUMA traffic when checking for those reader threads.

While several of the examples described herein involve the implementation of a NUMA-aware reader-writer lock based on a C-TKT-MCS lock, other types of reader-writer locks may be suitable for use in implementing NUMA-aware reader-writer locks. Some of those reader-writer locks are described below.

One family of reader-writer locks is implemented as an array of sub reader-writer locks, one per node. With these reader-writer locks, to acquire read permission, a thread may simply acquire read permission on the sub-lock for the node on which it is running. To acquire write permission, a thread may need to acquire write permission on all of the sub-locks. In some embodiments, those sub-locks may be acquired in canonical order in order to avoid deadlock. This ordering may impose a degree of unfairness as the write locks may be held for longer periods for the lower numbered nodes, while reader threads may tend to make more progress on the higher numbered nodes. This family of reader-writer locks may be well suited for implementing the shared top-level reader-writer lock of a NUMA-aware reader-writer lock when the workload is read-dominated and writes are infrequent.

In some embodiments, a NUMA-aware reader-writer lock may implement such an array of sub-locks (e.g., including one sub-lock for each node or cluster) in which each sub-lock consists of a reader counter and a writer flag whose value indicates whether a writer holds (or is waiting to acquire) the write lock. The sub-locks may be sequestered to unique cache lines in order to avoid false sharing. To acquire read permission on a sub-lock, a thread may first atomically increment the reader count and then check for the existence of a writer. If there is none, the reader may enter the critical section of code protected by the lock. Otherwise, the reader thread may defer to one or more writer threads. For example, the reader thread may reduce the reader count, spin politely while a writer exists, and then repeat and retry its attempt to acquire read permission as necessary. In this example, in order to acquire write-permission, writer threads may try to atomically change the writer flag from a value of zero (which may indicate that no writer threads hold the write lock) to a non-zero value (which may indicate that a writer thread holds or is attempting to acquire the write lock). This step may resolve conflicts between writer threads (i.e. W-W conflicts). After having set the writer flag, the writer threads may wait for the reader count to drain to zero in order to resolve conflicts between writer threads and reader threads (i.e. W-R conflicts).

Another type of lock maps both read lock requests and write lock requests to a C-TKT-MCS cohort mutual exclusion lock. This type of lock does not allow any parallelism between reader threads. As expected, this type of lock exhibits good performance for applications with a 100% write rate. However, it may also be competitive with true RW locks even when the write ratio is less extreme, e.g., when the read/write ratio is low or moderate and/or if the critical sections of code are very short. Some of the benefit may arise due to reduced NUMA lock migration. Note that this type of lock may not be suitable for use in building a NUMA-aware reader-writer lock in systems in which two threads acquire read permission and expect to be able to communicate with each other in a back-and-forth nature from within the read critical section of code, however.

Experiments have been performed in an attempt to determine whether it is possible to create a NUMA-aware reader-writer lock that performs well in cases in which critical sections of code are very short as well as in cases in which there are long critical sections of code, or whether multiple flavors of reader-writer locks may need to be implemented in a NUMA-aware reader-writer lock in order to achieve good results in both cases. For example, if the critical sections of code are relatively long and there is high concurrency, one may assume that it makes sense to use reader-writer lock algorithms that are better at scheduling operations to increase parallelism between reader threads. Such algorithms may in some embodiments require more centralized structures, incur more coherence traffic, and potentially have longer latency paths. However, if the critical sections of code are short and the arrival rate is high, then more sophisticated schemes may require more metadata and higher administrative overhead, which may not be recovered through improved performance. In other words, the extra overhead inherent in scheduling for higher parallelism between reader threads may not be profitable.

Some aspects of the assumptions described above were reflected and supported in the data collected. For example, a NUMA-aware reader-writer lock for which the shared top-level reader-writer lock uses highly central metadata structures to represent pending and active read and write operations may be able to achieve better parallelism between reader threads, but may tend to perform poorly when the critical sections of code are short. Long critical sections of code may amortize the overhead associated with the centralized metadata structures, but are not always commensurate with the benefit. This illustrates a trade-off between the quality of reader thread "packing" and overhead.

In some embodiments, example reader-writer forms that use decentralized per-node indicators of the existence of reader threads tend to scale well when the read critical sections of code are short and read intensity is high. However, central read indicators may perform better when the read critical sections of code are relatively long, i.e. sufficiently long to overcome the overhead associated with the use of the central indicator. Using centralized structures to represent lock state may allow a more coherent view of the system, and may enable better lock scheduling decisions.

Note that mutual exclusion cohort locks may in various embodiments implement a relaxed collection of pending threads using distributed per-node queues. In other words, there may be no explicit central list. Depending on the type of underlying locks, the per-node queues may be explicit lists or implicit lists. A set of threads spinning on a simple spin lock would be considered an implicit list. As such, cohort locks may be considered to maintain decentralized lists of pending writer threads.

As previously noted, some existing mutual exclusion locks can delegate work to threads that transiently take the role of critical section execution servers. One embodiment of a NUMA-aware reader-writer lock may implement such a lock for managing write operations (e.g., at the top-level lock), but the lock may be augmented with an array of per-node reader count variables. In such embodiments, reader threads may increment the count associated with their node and may check the top-level lock-word. If the top-level lock is not held, the reader threads may proceed into the read critical section of code. Otherwise, reader threads may back-off, reduce the reader count value, wait for the top-level lock to become unlocked, and loop, retrying the entry protocol. In this example, writer threads that acquire the top-level lock may check the reader counts and wait for any extant reader threads to complete before the writer thread can enter the write critical section of code.

In another embodiment, a NUMA-aware reader-writer lock may be created by making different modifications to such a lock (i.e. an existing mutual exclusion lock that can delegate work to threads that transiently take the role of critical section execution servers). In this example, both reader threads and writer threads may try to acquire the top-level lock or, if the lock is found to be held, may enqueue on the top-level lock. The lock owner, acting transiently as a server, may detach the list of pending operations and may sort the list into a local read-list and a local write-list. The lock owner may then orchestrate the execution of pending read operations by writing a field in the closure structure that informs each thread that posted a pending read request that it is safe to execute the critical section of code. The pending reader threads on the read-list may then operate concurrently to execute the critical section of code. In this example, once all the reader threads have finished executing the critical section of code, the owner may execute the pending write operations from the write-list, one at a time, on behalf of the threads that posted them. In other words, in such embodiments, enqueued read operations may be orchestrated by the top-level lock owner, but may be executed in parallel by the thread that posted the request, while enqueued write operations may be performed serially by the top-level lock owner on behalf of the posting threads.

Figure 17:
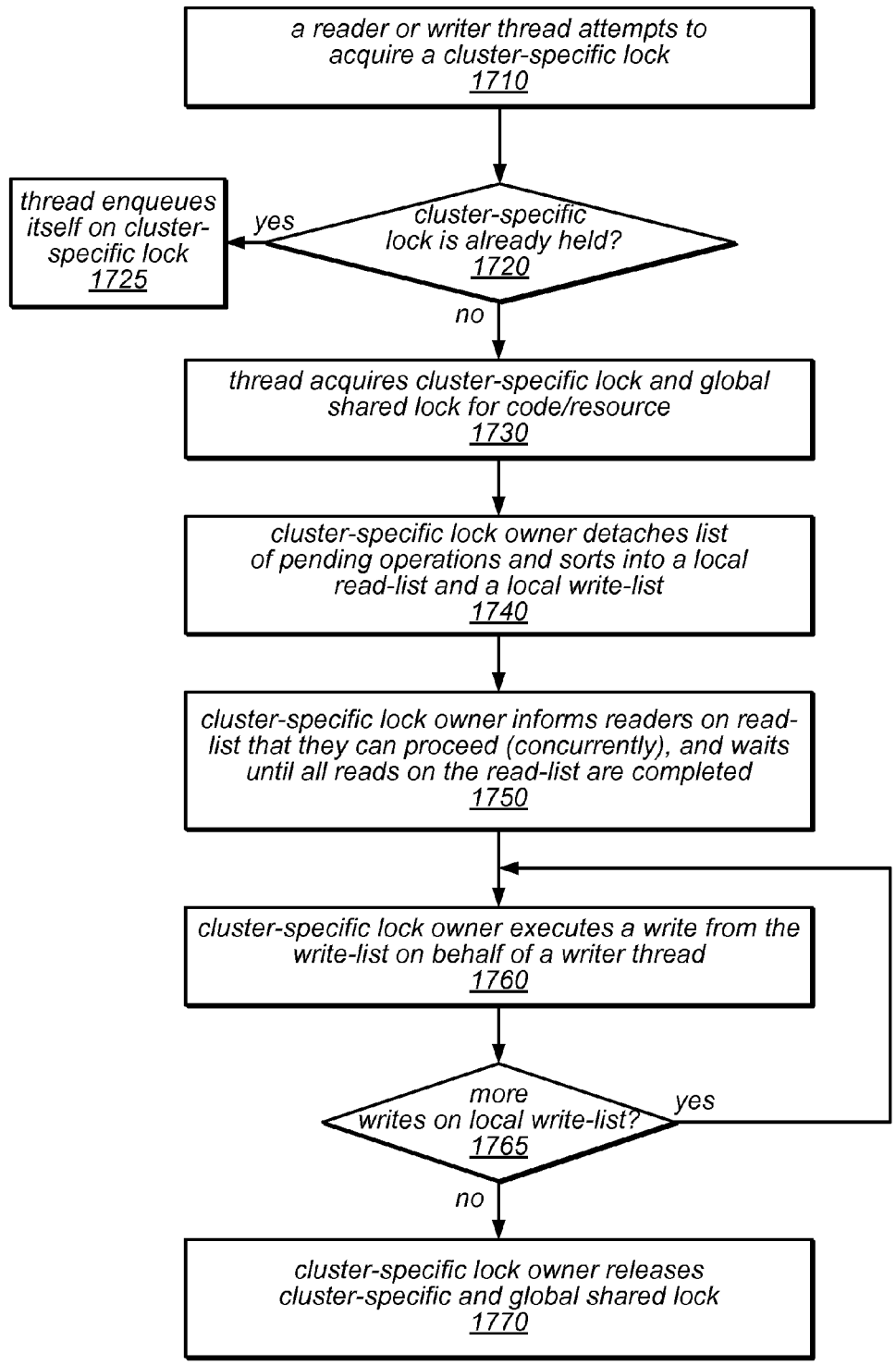
FIG. 17 is a flow diagram illustrating one embodiment of a method for executing pending local reads and writes under a NUMA-aware reader-writer lock.

One embodiment of a method for executing pending local reads and writes under a NUMA-aware reader-writer lock is illustrated by the flow diagram in FIG. 17. As illustrated in this example, the method may include a reader thread or a writer thread attempting to acquire a cluster-specific lock on a critical section of code or shared resource (as in 1710). If the cluster-specific lock is already held by another thread (shown as the positive exit from 1720), the thread may enqueue itself on the cluster-specific lock (as in 1725). Note that in this case, any read and/or write operations of the thread that target the critical section of code or shared resource may not yet be added to a local (cluster-specific) read-list or write-list.

As illustrated in this example, if the cluster-specific lock is not already held by another thread (shown as the positive exit from 1720), the thread may acquire the cluster-specific lock and the global shared lock for the critical section of code or shared resource (as in 1730). The cluster-specific lock owner may then detach a list of pending operations (e.g., read operations and write operations of threads that were enqueued on the cluster-specific lock while some other thread held the cluster-specific lock and thus are pending at the time the cluster-specific lock was acquired, and that target the critical section of code or shared resource), and may sort them into a local read-list and a local write-list (as in 1740). Note that in some embodiments, any read or write operations of subsequently arriving threads may not be added to the read-list or write-list that is detached by the cluster-specific lock owner. In other words, the operations of threads that arrive at the cluster-specific lock subsequent to its acquisition may not be included in the active list of pending operations whose execution is to be managed by the cluster-specific lock owner.

As illustrated in this example, the method may include the cluster-specific lock owner informing the reader threads whose operations are included on the local read-list that they can proceed to access the critical section of code or shared resource (concurrently), as in 1750. Once all of the read operations on the local read-list have been completed, the cluster-specific lock owner may execute a write operation from the local write-list on behalf of a pending writer thread (as in 1760). In other words, once the pending read operations have been executed (by their own threads), pending write operations may be executed by the cluster-specific lock owner, acting as a "server" thread. As illustrated in FIG. 17, as long as there are more write operations on the local write-list (shown as the positive exit from 1765), the cluster-specific lock owner may continue to execute them on behalf of the writer threads from which they originated (shown as the feedback to 1760). Once there are no additional write operations on the local write-list (shown as the negative exit from 1765), the cluster-specific lock owner may release the cluster-specific lock and the global shared lock for the critical section of code or shared resource (as in 1770).

The protocol described above for orchestrating reader threads may involve a lot of back-and-forth communication and coherence traffic. In addition, the server thread may be idle and unoccupied while orchestrating reader threads. Furthermore, the protocol may prevent incoming reader threads that arrive while the top-level lock is held from joining an active R-group, which may fail to leverage available parallelism between reader threads. In an alternate embodiment, the lock word may be implemented as a reader count with a write-pending bit to enable more parallelism between reader threads, but this change may add complexity in critical paths and/or additional overhead that may outweigh the benefit.

Each of the approaches for implementing NUMA-aware reader-writer locks described herein may have different performance tradeoffs and may perform best under different system and/or application settings and workloads. In all of the above approaches, the coordination between reader threads and writer threads is somewhat orthogonal, and may be organized using various flags (as in some of the approaches described above) or using more sophisticated synchronization techniques (as described in other one of the approaches).

Note that it may sometimes be the case that an uncontended mutual exclusion lock may have a faster fast-path than the fast-path of some types of reader-writer locks. For example, in some cases, short read-only critical sections of code may be better served by such mutexes than by reader-writer locks. Again, there may essentially be a trade-off between parallelism and latency trade-off. While it may be impossible to make a general claim, it may sometimes be the case that mutexes are superior even for known read-only critical sections of code. Therefore, in some embodiments, it may be beneficial to implement a reader-writer lock that begins a mode in which both acquire-for-read methods and acquire-for-write methods simply acquire the underlying write permission mutex (assuming there is such a thing in the particular implementation). In this mode, requests for read permission may be automatically commuted to requests for write permission. In this example, if a subsequent "false" reader-reader contention is encountered on the mutex, the system may respond by revoking write-permission from the owner and converting the reader-writer lock to normal operation, at least for a while. In some such embodiments, there may be a potential for a race between the revocation of write permission and the path in which the lock owner releases the lock. In some embodiments, the added path to handle modality and revocation may outweigh any benefit. However, commuting the lock to normal reader-writer mode when the current logical read owner calls the unlock( ) method may not be safe.

For example, it is not uncommon in commercial code to find communication (via some independent channel) happening under locks. In one example, a thread T1 may acquire a reader-writer lock L for reading and then wait for a message from a thread T2. Thread T2 may acquire reader-writer lock L for reading and may post the message that unblocks thread T1. If the read request from thread T1 had been converted to a request for writing (i.e. a request to hold the reader-writer lock exclusively), thread T2 would have hung while trying to acquire read permission, and thread T1 would stall indefinitely waiting for a message that will never come (since thread T2 is stalled). In other embodiments, thread T2 may expeditiously demote the access mode of thread T1 (which is, logically, a read access) from an actual write access to an actual read access, which may then allow T2 to enter the critical section of code and post the message to T1.

As previously noted, both strict reader-preference (RP) and strict writer-preference (WP) reader-writer lock policies may allow threads to starve in undesirable ways, particularly if threads are dedicated to certain roles. As described above, under a writer-preference policy, reader threads may pass through the write lock of the reader-writer lock to ensure progress, or may erect a "barrier" to block the flow of new incoming writer threads, which may subsequently provide the reader threads an opportunity to run when all the extant writer threads (i.e. those that arrived before the barrier was erected) vacate. In a sense, these approaches may be thought of as transiently shifting the lock policy from a writer-preference policy to a reader-preference policy when reader threads are starving or languishing. In some embodiments, similar remedial actions may be applied to a basic reader-preference policy to ensure that writer threads are eventually able to run. In general, it may be the case that any viable general-purpose reader-writer lock may either need to alternate between a writer-preference policy and a reader-preference policy, or implement a reader-preference policy with writer remediation or a writer-preference policy with reader remediation. Again, one feature of a high-throughput reader-writer lock may be that it promotes reader-reader parallelism. That is, the lock algorithm may promote the formation of large R-groups. Another feature of a high-throughput reader-writer lock may be that it minimizes alternating from servicing reader threads to servicing writer thread or alternating from servicing writer threads to servicing reader threads.

For an application workload that is read-dominated, one might naively implement a reader-writer lock policy that favors reader threads over writer threads, unless there was an extreme different between the length of the path for acquiring the reader-write lock in read-only mode and the path for acquiring the reader-writer lock in write mode (with the write path being much longer). One might also naively expect a reader-writer lock policy that favored reader threads over writer threads to be superior to a reader-preference policy because the reader-preference policy would seem to allow the formation of larger R-groups. In practice, however, it has been found that reader-writer locks that implement a reader-preference policy typically do not perform as well as writer-preference-based locks except in extreme cases in which there are almost no writer threads.

The discussion above may be further illustrated by way of the following examples. In each of these examples, there are a fixed number of threads N, and the aggregate throughput of those N threads is measured and report over a fixed time interval. Each thread loops, and for each loop, the thread randomly (e.g., as if tossing a Bernoulli coin) decides whether to acquire read permission or write permission on a central lock. In these examples, the coin may biased so that more read acquisitions are selected than write operations. Under a simplified model, there may be no non-critical work period, and all threads are either reading, writing, stalled trying to gain read permission or stalled trying to gain write permission. In these examples, it is assumed that there is conservation of threads during the measurement interval. Using this model and these assumptions, examples of the execution of a multithreaded application on a NUMA machine when applying different priority policies may be plotted on a timeline, as shown in FIGS. 18A and 18B.

Figure 18A:
FIGS. 18A-18B illustrate examples of the use of NUMA-aware reader-writer locks that employ different priority policies, according to various embodiments.
Figure 18B:
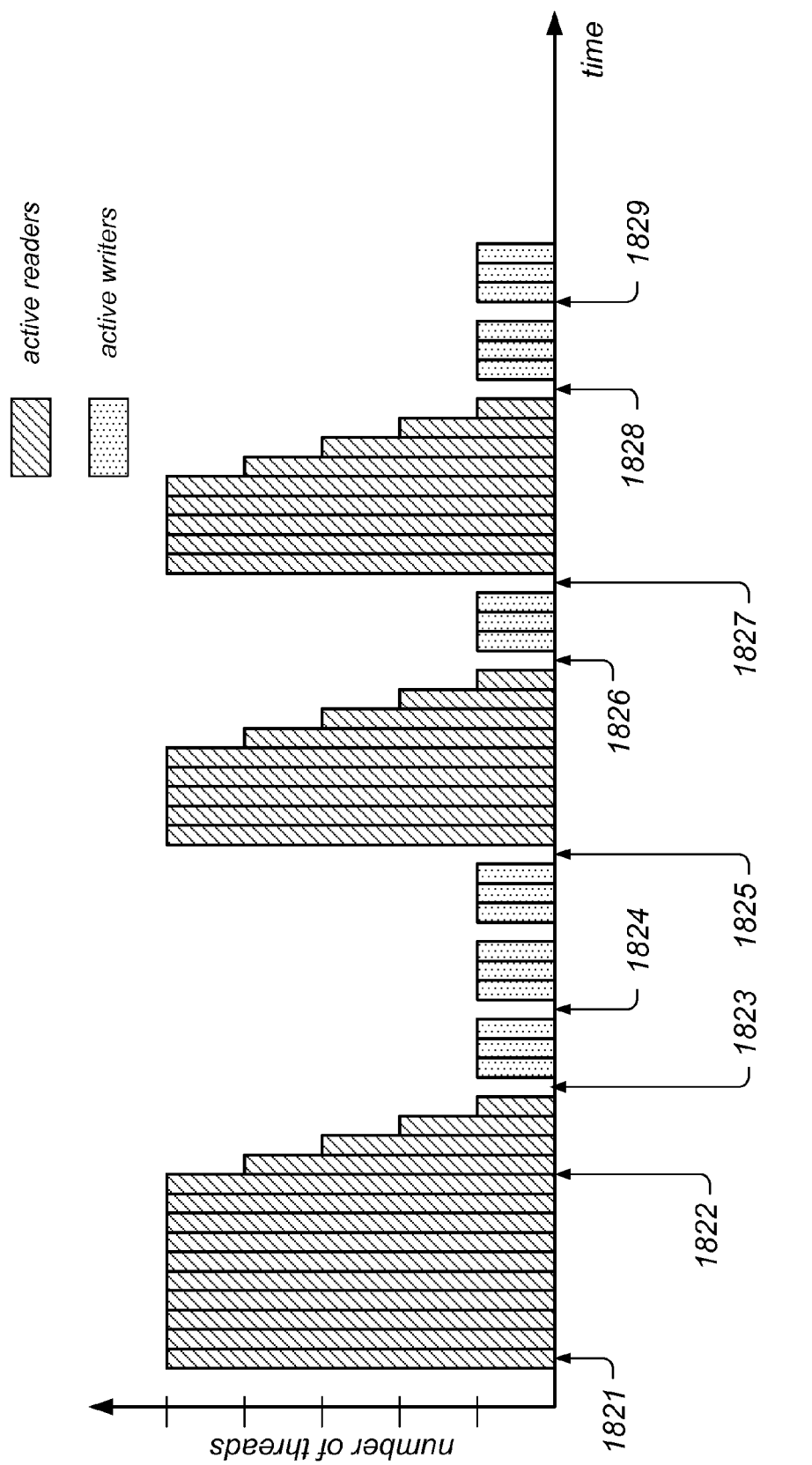

FIGS. 18A-18B illustrate the use of NUMA-aware reader-writer locks that employ different priority policies, according to various embodiments. More specifically, FIG. 18A illustrates the use of a NUMA-aware reader-writer lock that employs a reader-preference policy (i.e. a policy in which pending writer threads defer to any pending reader threads, and newly arriving reader threads can bypass or overtake older pending/stalled writer threads), while FIG. 18B illustrates the use of a NUMA-aware reader-writer lock that employs a writer-preference policy (i.e. a policy in which pending reader threads defer to pending writer threads and newly arriving writer threads can bypass or overtake older stalled reader threads). In these illustrations, the height of the hatched bars (i.e. the value on the y-axis for the hatched bars) represents the number of reader threads executing on a given cluster that are active at a given point in time, and the height of the dotted bars (i.e. the value on the y-axis for the dotted bars) represents the number of writer threads executing on a given cluster that are active at a given point in time (i.e. threads that are executing in the critical section of code in write mode). In these illustrations, time is increasing from left to right on the x-axis.

As illustrated in FIG. 18A, as this example execution begins, all threads are reader threads (e.g., at time 1801 in FIG. 18A). Eventually, those reader threads (via the stochastic Bernoulli coin) become writer threads. In this example (which illustrates the use of a reader-preference policy), those writer threads may block immediately, since there are still active reader threads. This is illustrated in FIG. 18A as the ramp-down phase in the interval between time 1802 and 1803, during which reader threads decay into writer threads over time. Eventually, there are no remaining reader threads and all N threads are pending writer threads, at which point one of the pending writer threads, a thread T1, can finally acquire the reader-writer lock in read mode and run. This is illustrated in FIG. 18A as a state/phase change and switch from executing one or more reader threads at a time to executing one writer thread at a time (e.g., beginning at time 1803). In this example, at time 1804, the first writer thread (T1) releases the write lock and identifies a thread T2 as the next writer thread. Note that in this example, even though thread T2 is designated as the next writer, it cannot enter the writer critical section of code until it has resolved any reader-writer conflicts. After releasing the write lock, thread T1 will toss the Bernoulli coin and become either a reader thread or a writer thread. In this example, it is assumed that it becomes a reader thread. Note that it may be possible that T1 can cycle into reading so quickly that it races thread T2 for acquisition of the reader-writer lock and wins, blocking thread T2, but this may be an extreme case and is not illustrated in FIG. 18A. Instead, FIG. 18A assumes that thread T2 checks for extant reader threads, finds none, gains entry to the write critical section of code, and becomes an active writer (at time 1804).

In this example, after releasing the write lock, T1 tries to acquire the reader-writer lock in read-only mode, but is blocked as there is an active writer, thread T2. However, since the system is operating under a reader-preference policy, when thread T2 retires and vacates the reader-writer lock (at time 1805), T1 will then immediately gain read permission and enter the read critical section of code even if there happen to be one or more pending writer threads. In this example, it is assumed that thread T2 next turns into a reader, so that shortly after thread T1 acquires the reader-writer lock in read-only mode there are two concurrent active reader threads, threads T1 and T2. Following inductively, the system starts to ramp up the number of active reader threads beginning at time 1805. However, a large complement of the N threads are still trapped, stalled as pending writer threads, so the number of potential reader threads is restricted well below N, at this point. Here, the more reader threads there are, the less likely it is for another pending writer to become active, so the flow of threads out of the write lock is self-limiting. Furthermore there is a decay aspect over time, as some of those active reader threads will transmute into writer threads and block. Therefore, the number of reader threads start to ramp down (e.g., between the time the number of reader threads peaks and time 1806), and the cycle will repeat. In this example, writer threads begin executing in series again (e.g., at 1806 and 1807), and then reader threads begin ramping up again after time 1808 (peaking at time 1809). In this example, after the reader threads ramp back down to zero, writer threads again execute in series (between time 1810 and 1811), and then reader threads begin ramping up again after time 1811. This mode is stable but may be undesirable.

In FIG. 18B, an example is illustrated in which a reader-writer lock employs a writer-preference policy. As in the previous example, it is assumed that there are N threads and that there is conservation of threads during the illustrated time period. As illustrated in FIG. 18B, as this example execution begins (at time 1821), all threads are concurrently executing as reader threads. At time 1822, a first writer thread T1 appears and stalls waiting for the extant active reader threads to drain and depart. While T1 is either waiting or active, subsequently arriving reader threads must block or stall and not bypass thread T1. By time 1823, all reader threads have departed and one or more writer threads can be run. By this time, multiple writer threads might be pending, and they will all be run in sequence. Each writer finishes in turn (e.g., the first writer passes write ownership off to a next writer at time 1824), after which most threads transmute into reader threads and then stall, waiting for the string of writer threads to finish. Eventually (at time 1825), all of the writer threads are finished. At that point, in this example, there is a large collection of pending reader threads, which can be released en-mass for concurrent execution (at time 1825). The cycle then repeats with the number of reader threads ramping down until time 1826, after which newly arrived writer threads execute (one at a time). Once the last writer thread finishes (at 1827), additional reader threads are released to run (concurrently). After the number of reader threads ramps down to zero (at time 1828), successive writer threads again begin executing (e.g., at time 1828 and at time 1829).

In these examples, the reader-writer lock that employed a writer-preference policy actually admitted much more reader-reader parallelism than did the reader-writer lock that employed a reader-preference policy. Note also that in practice, such writer-preference policies have also been observed to deliver better performance than their reader-preference-based counterparts. However, as discussed in detail herein, the performance achieved for any particular execution of a multithreaded application running on a NUMA machine may be dependent on the particular system characteristics, as well as the characteristics of the application and its workload.

Figure 19:
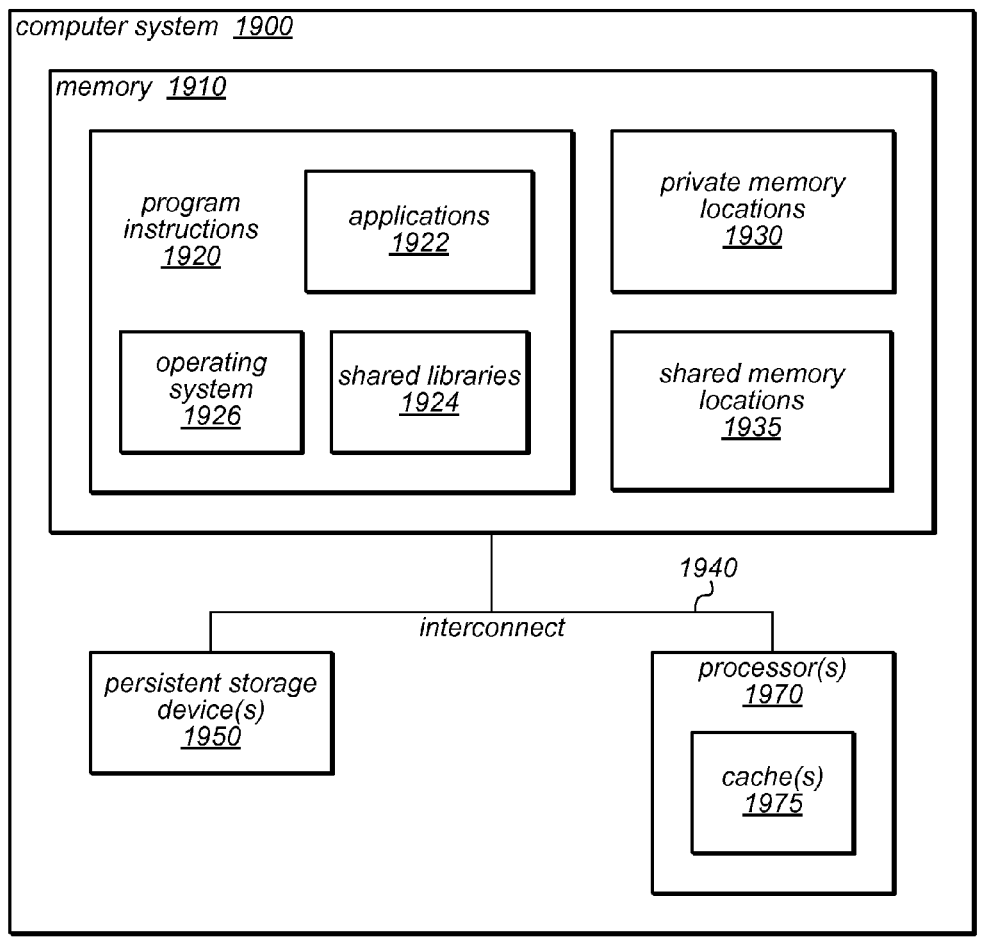
FIG. 19 illustrates a computing system configured to implement NUMA-aware lock cohorting and/or reader-writer locks that employ NUMA-aware lock cohorting, according to various embodiments.

FIG. 19 illustrates a computing system configured to implement the methods described herein, according to various embodiments. The computer system 1900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing NUMA-aware cohort locking and/or NUMA-aware reader-writer locks, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1900 may include one or more processors 1970; each may include multiple cores, any of which may be single or multi-threaded. For example, as illustrated in FIGS. 2A-2B, multiple processor cores may included in a single processor chip (e.g., a single processor 1970, processor chip 210, or socket 260), and multiple processor chips/sockets may be included on a CPU board, two or more of which may be included in computer system 1900. Each of the processors 1970 may include a hierarchy of caches, in various embodiments. For example, as illustrated in FIGS. 2A-2B, each processor chip 1970 may include multiple L1 caches (e.g., one per processor core) and one or more other caches (which may be shared by the processor cores on the processor chip/socket). The computer system 1900 may also include one or more persistent storage devices 1950 (e.g. optical storage, magnetic storage, hard drive, tape drive, solid state memory, etc) and one or more system memories 1910 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 19 (e.g., video cards, audio cards, additional network interfaces, peripheral devices, a network interface such as an ATM interface, an Ethernet interface, a Frame Relay interface, etc.)

The one or more processors 1970, the storage device(s) 1950, and the system memory 1910 may be coupled to the system interconnect 1940. One or more of the system memories 1910 may contain program instructions 1920. Program instructions 1920 may be executable to implement one or more applications 1922 (which may include one or more accesses to a critical section of code or shared resource protected by a NUMA-aware cohort lock or a NUMA-aware reader-writer lock, as described herein), shared libraries 1924, or operating systems 1926. In some embodiment, program instructions 1920 may be executable to implement a contention manager (not shown). Program instructions 1920 may be encoded in platform native binary, any interpreted language such as Java™ byte-code, or in any other language such as C/C++, Java™, etc or in any combination thereof. The program instructions 1920 may include functions, operations and/or other processes for implementing NUMA-aware cohort locking and/or NUMA-aware reader-writer locks, as described herein. Such support and functions may exist in one or more of the shared libraries 1924, operating systems 1926, or applications 1922, in various embodiments. The system memory 1910 may further comprise private memory locations 1930 and/or shared memory locations 1935 where data may be stored. For example, shared memory locations 1935 may store data accessible to concurrently executing threads, processes, or transactions, in various embodiments. In addition, the system memory 1910 and/or any of the caches of processor(s) 1970 may, at various times, store lock metadata (e.g., lock state information, identifiers of successor threads, and/or various counters or flags, as described herein), threshold values, policy parameter values, maximum count values, lists or queues of pending, active, and/or passive threads (including reader threads and/or writer threads), and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of locks and structures and particular locking algorithms and policies, it should be noted that the techniques and mechanisms disclosed herein for implementing NUMA-aware lock cohorting and NUMA-aware reader-writer locks may be applicable in other contexts in which critical sections of code and/or shared resources may be protected by other types of locks/structures under different locking algorithms/policies, or in which cohort locks or NUMA-aware reader-writer locks are constructed from different types of locks and structures than those described in the examples herein. It is intended that the following claims be interpreted to embrace all such variations and modifications.

What is claimed:

1. A method, comprising:
performing by a computer:
beginning execution of a multithreaded application that comprises one or more requests to acquire a shared lock, wherein the shared lock controls access to a critical section of code or a shared resource by concurrently executing threads of the application, and wherein only one thread can hold the shared lock at a time;
a thread of the application acquiring the shared lock, wherein the thread is executing on one of a plurality of processor cores in a cluster of processor cores that share a memory, and wherein the cluster of processor cores is one of a plurality of clusters of processor cores on which threads of the multithreaded application are executing;
in response to acquiring the shared lock, the thread:
accessing the critical section of code or shared resource; and
subsequent to said accessing:
determining whether any other threads of the application that are executing on a processor core in the cluster of processor cores are waiting to access the critical section of code or shared resource; and
in response to determining that at least one other thread of the application that is executing on a processor core in the cluster of processor cores is waiting to acquire the shared lock, passing ownership of a cluster-specific lock that is associated with the critical section of code or shared resource to another thread of the application that is executing on a processor core in the cluster of processor cores and that is waiting to access the critical section of code or shared resource without releasing the shared lock, wherein said passing allows the other thread to gain access to the critical section of code or shared resource.

2. The method of claim 1,
wherein the method further comprises, prior to acquiring the shared lock, the thread acquiring ownership of the cluster-specific lock; and
wherein said acquiring the shared lock is performed in response to the thread acquiring ownership of the cluster-specific lock.

3. The method of claim 1, further comprising, subsequent to said passing, the other thread accessing the critical section of code or shared resource.

4. The method of claim 1, further comprising, subsequent to said passing, the other thread releasing the cluster-specific lock.

5. The method of claim 1, further comprising, subsequent to said passing, the other thread releasing the shared lock.

6. The method of claim 1, further comprising a thread executing on a processor core in another cluster of processor cores acquiring the shared lock and accessing the critical section of code or shared resource.

7. The method of claim 1, wherein said passing comprises updating an indicator to indicate that the other thread is the owner of the cluster-specific lock.

8. The method of claim 1, further comprising, subsequent to said passing, the other thread passing ownership of the cluster-specific lock to yet another thread of the application that is executing on a processor core in the cluster of processor cores and that is waiting to access the critical section of code or shared resource without releasing the shared lock.

9. The method of claim 1, wherein said acquiring the shared lock comprises:
   attempting to acquire the shared lock; and
   in response to failing to acquire the shared lock:
      acquiring ownership of the cluster-specific lock; and
      in response to acquiring ownership of the cluster-specific lock, repeating said attempting to acquire the shared lock one or more times until an attempt to acquire the shared lock is successful.

10. The method of claim 1, wherein at least one of the shared lock and the cluster-specific lock comprises a spin-type lock, a ticket-based lock, a queue-based lock, a test-and-test-and-set lock, or a back-off lock.

11. The method of claim 1, wherein the shared lock and one or more cluster-specific locks comprise non-NUMA-aware locks that collectively implement a NUMA-aware composite lock usable to manage access to the critical section of code or shared resource.

12. A system, comprising:
   a plurality of processor core clusters, each of which comprises two or more processor cores that support multi-threading and that share a local memory;
   a system memory coupled to the plurality of processor core clusters;
   wherein the system memory stores program instructions that when executed on one or more processor cores in the plurality of processor core clusters cause the one or more processor cores to perform:
      beginning execution of a multithreaded application that comprises one or more requests to acquire a shared lock, wherein the shared lock controls access to a critical section of code or a shared resource by concurrently executing threads of the application, and wherein only one thread can hold the shared lock at a time;
      a thread of the application acquiring the shared lock, wherein the thread is executing on one of a plurality of processor cores in a cluster of processor cores that share a memory, and wherein the cluster of processor cores is one of two or more clusters of processor cores on which threads of the multithreaded application are executing;
      in response to acquiring the shared lock, the thread:
         accessing the critical section of code or shared resource; and
         subsequent to said accessing:
            determining whether any other threads of the application that are executing on a processor core in the cluster of processor cores are waiting to access the critical section of code or shared resource; and
            in response to determining that at least one other thread of the application that is executing on a processor core in the cluster of processor cores is waiting to acquire the shared lock, passing ownership of a cluster-specific lock that is associated with the critical section of code or shared resource to another thread of the application that is executing on a processor core in the cluster of processor cores and that is waiting to access the critical section of code or shared resource without releasing the shared lock, wherein said passing allows the other thread to gain access to the critical section of code or shared resource.

13. The system of claim 12,
   wherein when executed on the one or more processor cores in the plurality of processor core clusters, the program instructions further cause the one or more processor cores to perform, prior to acquiring the shared lock, the thread acquiring ownership of the cluster-specific lock; and
   wherein said acquiring the shared lock is performed in response to the thread acquiring ownership of the cluster-specific lock.

14. The system of claim 12, wherein when executed on the one or more processor cores in the plurality of processor core clusters, the program instructions further cause the one or more processor cores to perform, subsequent to said passing:
   the other thread performing one or more of:
      accessing the critical section of code or shared resource;
      releasing the shared lock; or
      releasing the cluster-specific lock.

15. The system of claim 12, wherein when executed on the one or more processor cores in the plurality of processor core clusters, the program instructions further cause the one or more processor cores to perform, subsequent to said passing, the other thread passing ownership of the cluster-specific lock to yet another thread of the application that is executing on a processor core in the cluster of processor cores and that is waiting to access the critical section of code or shared resource without releasing the shared lock.

16. The system of claim 12, wherein said acquiring the shared lock comprises:
   attempting to acquire the shared lock; and
   in response to failing to acquire the shared lock:
      acquiring ownership of the cluster-specific lock; and
      in response to acquiring ownership of the cluster-specific lock, repeating said attempting to acquire the shared lock one or more times until an attempt to acquire the shared lock is successful.

17. A non-transitory, computer-readable storage medium storing program instructions that when executed on one or more computers cause the one or more computers to perform:
   beginning execution of a multithreaded application that comprises one or more requests to acquire a shared lock, wherein the shared lock controls access to a critical section of code or a shared resource by concurrently executing threads of the application, and wherein only one thread can hold the shared lock at a time;
   a thread of the application acquiring the shared lock, wherein the thread is executing on one of a plurality of processor cores in a cluster of processor cores that share a memory, and wherein the cluster of processor cores is one of a plurality of clusters of processor cores on which threads of the multithreaded application are executing;
   in response to acquiring the shared lock, the thread:
      accessing the critical section of code or shared resource; and
      subsequent to said accessing:
         determining whether any other threads of the application that are executing on a processor core in the cluster of processor cores are waiting to access the critical section of code or shared resource; and
         in response to determining that at least one other thread of the application that is executing on a processor core in the cluster of processor cores is waiting to acquire the shared lock, passing ownership of a cluster-specific lock that is associated with the critical section of code or shared resource to another thread of the application that is executing on a processor core in the cluster of processor cores and that is waiting to access the critical section of code or shared resource without releasing the shared lock, wherein said passing allows the other thread to gain access to the critical section of code or shared resource.

18. The non-transitory, computer-readable storage medium of claim 17,
wherein when executed on the one or more computers, the program instructions further cause the one or more computers to perform, prior to acquiring the shared lock, the thread acquiring ownership of the cluster-specific lock; and
wherein said acquiring the shared lock is performed in response to the thread acquiring ownership of the cluster-specific lock.

19. The non-transitory, computer-readable storage medium of claim 17, wherein when executed on the one or more computers, the program instructions further cause the one or more computers to perform, subsequent to said passing:
the other thread performing one or more of:
accessing the critical section of code or shared resource;
releasing the shared lock; or
releasing the cluster-specific lock.

20. The non-transitory, computer-readable storage medium of claim 17, wherein when executed on the one or more computers, the program instructions further cause the one or more computers to perform, subsequent to said passing, the other thread passing ownership of the cluster-specific lock to yet another thread of the application that is executing on a processor core in the cluster of processor cores and that is waiting to access the critical section of code or shared resource without releasing the shared lock.

* * * * *